United States Patent
Yerramalli et al.

(10) Patent No.: US 10,051,660 B2
(45) Date of Patent: Aug. 14, 2018

(54) VIRTUAL CARRIERS FOR LTE/LTE-A COMMUNICATIONS IN A SHARED SPECTRUM

(71) Applicant: QUALCOMM Incorporated, San Diego, CA (US)

(72) Inventors: Srinivas Yerramalli, San Diego, CA (US); Tao Luo, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 14/490,503

(22) Filed: Sep. 18, 2014

(65) Prior Publication Data
US 2015/0098412 A1  Apr. 9, 2015

Related U.S. Application Data

(60) Provisional application No. 61/886,469, filed on Oct. 3, 2013, provisional application No. 61/948,399, filed on Mar. 5, 2014.

(51) Int. Cl.
*H04W 74/08* (2009.01)
*H04W 16/14* (2009.01)
(Continued)

(52) U.S. Cl.
CPC ....... *H04W 74/0808* (2013.01); *H04L 5/0033* (2013.01); *H04L 5/0044* (2013.01);
(Continued)

(58) Field of Classification Search
CPC .................................................. H04W 74/0808
See application file for complete search history.

(56) References Cited

U.S. PATENT DOCUMENTS

| 8,130,780 B2 * | 3/2012 | Lu ......................... H04L 5/0023 |
| | | 370/436 |
| 2006/0240780 A1 * | 10/2006 | Zhu .................... H04W 74/0808 |
| | | 455/63.4 |

(Continued)

FOREIGN PATENT DOCUMENTS

| GB | 2498988 A | 8/2013 |
| WO | WO-2010021902 A2 | 2/2010 |

(Continued)

OTHER PUBLICATIONS

ISA/EPO, International Search Report and Written Opinion of the International Searching Authority, Int'l. App. No. PCT/US2014/056431, dated Dec. 19, 2014, European Patent Office, Rijswijk, NL 13 pgs.

*Primary Examiner* — Derrick Ferris
*Assistant Examiner* — Kevin Lee
(74) *Attorney, Agent, or Firm* — Holland & Hart LLP

(57) ABSTRACT

Methods, systems, apparatuses, and devices are described for wireless communication. From a plurality of physical carriers associated with a clear channel assessment (CCA) performed by a device, one of the physical carriers for which the CCA was successful may be identified. A virtual carrier associated with a wireless data transmission by the device may be mapped to the identified one of the physical carriers.

46 Claims, 31 Drawing Sheets

(51) Int. Cl.
    *H04W 72/12*  (2009.01)
    *H04L 5/00*   (2006.01)
(52) U.S. Cl.
    CPC ........... *H04L 5/0062* (2013.01); *H04W 16/14* (2013.01); *H04W 72/1226* (2013.01); *H04L 5/001* (2013.01); *H04L 5/0048* (2013.01); *H04L 5/0064* (2013.01); *H04L 5/0094* (2013.01)

(56) References Cited

U.S. PATENT DOCUMENTS

| | | | | |
|---|---|---|---|---|
| 2008/0102846 | A1* | 5/2008 | Kim | H04W 72/085 455/450 |
| 2009/0323608 | A1* | 12/2009 | Adachi | H04W 48/18 370/329 |
| 2010/0046485 | A1 | 2/2010 | Merlin et al. | |
| 2010/0118835 | A1* | 5/2010 | Lakkis | H04B 7/0408 370/336 |
| 2012/0182957 | A1* | 7/2012 | Noh | H04L 5/0048 370/329 |
| 2014/0204891 | A1* | 7/2014 | Park | H04W 56/00 370/329 |
| 2014/0233445 | A1* | 8/2014 | Yang | H04W 52/38 370/311 |
| 2014/0241265 | A1* | 8/2014 | Pragada | H04W 72/04 370/329 |
| 2015/0341803 | A1* | 11/2015 | Kim | H04W 16/02 370/252 |

FOREIGN PATENT DOCUMENTS

| | | |
|---|---|---|
| WO | WO-2012167193 A2 | 12/2012 |
| WO | WO-2013071506 A1 | 5/2013 |

* cited by examiner

VIRTUAL CARRIERS FOR LTE/LTE-A COMMUNICATIONS IN A SHARED SPECTRUM

CROSS REFERENCES

The present application for patent claims priority to U.S. Provisional Patent Application No. 61/886,469 by Yerramalli et al., entitled "VIRTUAL CARRIERS FOR LTE-U," filed Oct. 3, 2013, and to U.S. Provisional Patent Application No. 61/948,399 by Yerramalli et al., entitled "VIRTUAL CARRIERS FOR LTE/LTE-A COMMUNICATIONS IN A SHARED SPECTRUM," filed Mar. 5, 2014, assigned to the assignee hereof, and expressly incorporated by reference herein.

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of a WLAN to offload some of the traffic and/or signaling of a cellular network. WLANs (or WiFi networks) are attractive because, unlike cellular networks that operate in a licensed spectrum, WiFi networks generally operate in an unlicensed spectrum.

When devices that communicate using different protocols (e.g., cellular and WLAN protocols) share a spectrum, a contention-based protocol may be used to determine what device(s) are able to transmit in different transmission intervals of the shared spectrum. When a transmitting device contends for access to the shared spectrum in a particular transmission interval, but loses to another device, the transmitting device may need to wait until a subsequent transmission interval to make a wireless data transmission.

SUMMARY

The described features generally relate to one or more improved methods, systems, apparatuses, and/or devices for wireless communication. More particularly, the described features relate to a transmitting device that contends for access to a number of physical carriers of a shared spectrum, which number of physical carriers is greater than a number of physical carriers needed to make a wireless data transmission. In this manner, the transmitting device may in some cases lose to another device when contending for access to one or more of the physical carriers, yet still obtain access to enough physical carriers to make the wireless data transmission.

According to a first set of illustrative embodiments, a method for wireless communications is described. In one configuration, and from a plurality of physical carriers associated with a clear channel assessment (CCA) performed by a first device, one of the physical carriers for which the CCA performed by the first device was successful may be identified. A virtual carrier associated with a wireless data transmission by the first device may be mapped to the identified one of the physical carriers.

In certain examples, the wireless data transmission may be received from the first device at a second device over the one of the physical carriers. In certain examples, signaling from the first device may be received at a second device, and the one of the physical carriers for which the CCA was successful may be identified by the second device based on the signaling from the first device. In such examples, the plurality of physical carriers may be monitored prior to the wireless data transmission by the first device; and the signaling from the first device may be received over the one of the physical carriers prior to the wireless data transmission. The signaling may include a channel usage beacon signal (CUBS), alternatively referred to as a channel usage pilot signal (CUPS), or a reference signal received from the first device over the one of the physical carriers.

In certain examples, a bitmap may be received from the first device at a second device. The one of the physical carriers for which the CCA was successful may be identified by the second device based on the bitmap from the first device. In some examples, the bitmap may be received over an unlicensed spectrum. In certain examples, the first device may select the plurality of physical carriers associated with the CCA based on a number of virtual carriers associated with the wireless data transmission.

In certain examples, the first device may perform CCA on a number of physical carriers that is greater than a number of virtual carriers associated with the wireless data transmission. In certain examples, the virtual carrier may include a first virtual carrier. The first device may refrain from mapping at least a second virtual carrier based on a determination that a number of the physical carriers for which the CCA was successful is less than a number of virtual carriers. The first device may determine to refrain from mapping the second virtual carrier based on a priority of the second virtual carrier with respect to a priority of the first virtual carrier. In such examples, the first device may transmit a channel usage beacon signal (CUBS) for a number of the physical carriers that is equal to or less than the number of virtual carriers.

In certain examples, the first device may receive an uplink grant for the virtual carrier, the uplink grant including the plurality of physical carriers associated with the CCA by the first device. In certain examples, a plurality of physical carriers associated with the CCA may be selected based on channel strength measurements of the plurality of physical carriers. Selecting the plurality of physical carriers associated with the CCA may be based on an age of channel strength measurements for at least a portion of the plurality of physical carriers associated with the CCA. Additionally or alternatively, selecting the plurality of physical carriers associated with the CCA may be based on a determination of whether the physical carriers are capable of supporting at least one of: a modulation and coding scheme associated with the wireless data transmission, a rank associated with the wireless data transmission, or a transport block size associated with the wireless data transmission.

In certain examples, the virtual carrier may be one of a plurality of virtual carriers associated with the wireless data transmission. In some such examples, a subset of the physical carriers for which the CCA by the first device was successful may be identified, and each of the virtual carriers may be mapped to one of the physical carriers of the subset based on a predetermined mapping scheme shared between the first device and a second device configured to receive the wireless data transmission. In certain examples, an identifier associated with the virtual carrier may be transmitted in a carrier identification field (CIF) of the one of the physical carriers.

In certain examples, the virtual carrier may include a downlink virtual carrier, the CCA performed by the first device may be a downlink CCA, and identifying the one of the physical carriers for which the CCA performed by the first device was successful may include identifying the one of the physical carriers for which the CCA performed by the first device was successful as a first physical carrier in a subset of physical carriers corresponding to the downlink virtual carrier. In these examples, at least a second physical carrier in the subset of physical carriers corresponding to the downlink virtual carrier may be identified as a candidate physical carrier for mapping to an uplink virtual carrier associated with an uplink wireless data transmission by a second device. The second physical carrier may be another physical carrier for which the CCA performed by the first device was successful. In some cases, radio resource control (RRC) signaling identifying the subset of physical carriers corresponding to the downlink virtual carrier may be received. In some cases, an uplink CCA for each candidate physical carrier may be performed by the second device; the second physical carrier may be identified as a physical carrier for which the uplink CCA performed by the second device was successful; and the uplink virtual carrier associated with the uplink wireless data transmission by the second device may be mapped to the second physical carrier.

In certain examples, the virtual carrier may include a first virtual carrier of a plurality of virtual carriers associated with the wireless data transmission. In these examples, a plurality of non-overlapping subsets of physical carriers may be identified. Each of the non-overlapping subsets of physical carriers corresponds to a respective one of the virtual carriers. Also, it may be determined, for each subset of physical carriers, whether the CCA performed by the first device was successful for at least one physical carrier of the subset of physical carriers; and for each subset of physical carriers having at least one physical carrier for which the CCA performed by the first device was successful, the virtual carrier corresponding to the subset of physical carriers may be mapped to at least one of the at least one physical carrier for which the CCA performed by the first device was successful.

In certain examples, the plurality of virtual carriers associated with the wireless data transmission may include a second virtual carrier, and it may be refrained from mapping at least the second virtual carrier to a physical carrier based on a determination that the CCA performed by the first device was unsuccessful for the physical carriers in the subset of physical carriers corresponding to the second virtual carrier.

In certain examples, resources may be reserved for a physical uplink control channel (PUCCH) on each of the virtual carriers, and the PUCCH may be transmitted over one of the virtual carriers mapped to one of the physical carriers for which the CCA performed by the first device was successful. In some cases, each of the virtual carriers may be associated with an index, and transmitting the PUCCH on one of the virtual carriers mapped to one of the physical carriers for which the CCA performed by the first device was successful may include transmitting the PUCCH over one of the virtual carriers having a lowest index. In some cases, the one of the virtual carriers over which the PUCCH is transmitted may be randomly selected. In some cases, RRC signaling including an initialization for a random number generator used for randomly selecting the one of the virtual carriers over which the PUCCH is transmitted may be received.

In certain examples, at least one additional physical carrier for which the CCA performed by the first device was successful may be identified from one of the subsets of physical carriers corresponding to the first virtual carrier, and a sounding reference signal (SRS) may be transmitted by the first device over each of the at least one additional physical carrier.

In certain examples, a CCA exempt transmission (CET) may be transmitted by the first device over at least one of the physical carriers in at least one of the subsets of physical carriers. In certain examples, at least one additional physical carrier for which the CCA performed by the first device was successful may be identified from one of the subsets of physical carriers corresponding to the first virtual carrier, and a CUBS may be transmitted by the first device over each of the at least one additional physical carrier.

In certain examples, at least one additional physical carrier for which the CCA performed by the first device was successful may be from one of the subsets of physical carriers corresponding to the first virtual carrier, and a channel state information reference signal (CSI-RS) may be transmitted by the first device over each of the at least one additional physical carrier.

In certain examples, a subset of physical carriers corresponding to the virtual carrier may be identified. The subset of physical carriers may include the one of the physical carriers to which the virtual carrier is mapped and at least one additional physical carrier. In these examples, at least one additional physical carrier for which the CCA performed by the first device was successful may be identified from the at least one additional physical carrier, and channel quality information (CQI) for each of the one of the physical carriers to which the virtual carrier is mapped and the at least one additional physical carrier for which the CCA performed by the first device was successful may be transmitted to the first device. In some cases, signaling may be received from the first device at a second device, and the one of the physical carriers to which the virtual carrier is mapped and the at least one additional physical carrier for which the CCA performed by the first device was successful may be identified by the second device based on the signaling from the first device. In some cases, a bitmap may be received from the first device at the second device. The one of the physical carriers to which the virtual carrier is mapped and the at least one additional physical carrier for which the CCA performed by the first device was successful may be identified by the second device based on the bitmap from the first device.

In certain examples, a PUCCH of the wireless data transmission may be transmitted by the first device over interlaced resource blocks of the identified one of the physical carriers.

According to at least a second set of illustrative embodiments, an apparatus for wireless communication may include means for identifying, from a plurality of physical carriers associated with a clear channel assessment (CCA) performed by a first device, one of the physical carriers for which the CCA performed by the first device was successful; and means for mapping a virtual carrier associated with a wireless data transmission by the first device to the identified one of the physical carriers.

In certain examples, the apparatus may include means for implementing one or more aspects described above with respect to the method of the first set of illustrative embodiments.

According to at least a third set of illustrative embodiments, an apparatus for wireless communications may include a processor; memory in electronic communication with the processor; and instructions stored in the memory. The instructions may be executable by the processor to identify, from a plurality of physical carriers associated with a clear channel assessment (CCA) performed by a first device, one of the physical carriers for which the CCA performed by the first device was successful; and map a virtual carrier associated with a wireless data transmission by the first device to the identified one of the physical carriers.

In certain examples, the instructions may be further executable by the processor to implement one or more aspects described above with respect to the method of the first set of illustrative embodiments.

According to at least a fourth set of illustrative embodiments, a computer program product for wireless communications may include a non-transitory computer-readable medium storing instructions executable by a processor to: identify, from a plurality of physical carriers associated with a clear channel assessment (CCA) performed by a first device, one of the physical carriers for which the CCA performed by the first device was successful; and map a virtual carrier associated with a wireless data transmission by the first device to the identified one of the physical carriers.

In certain examples, the instructions may be further executable by the processor to implement one or more aspects described above with respect to the method of the first set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
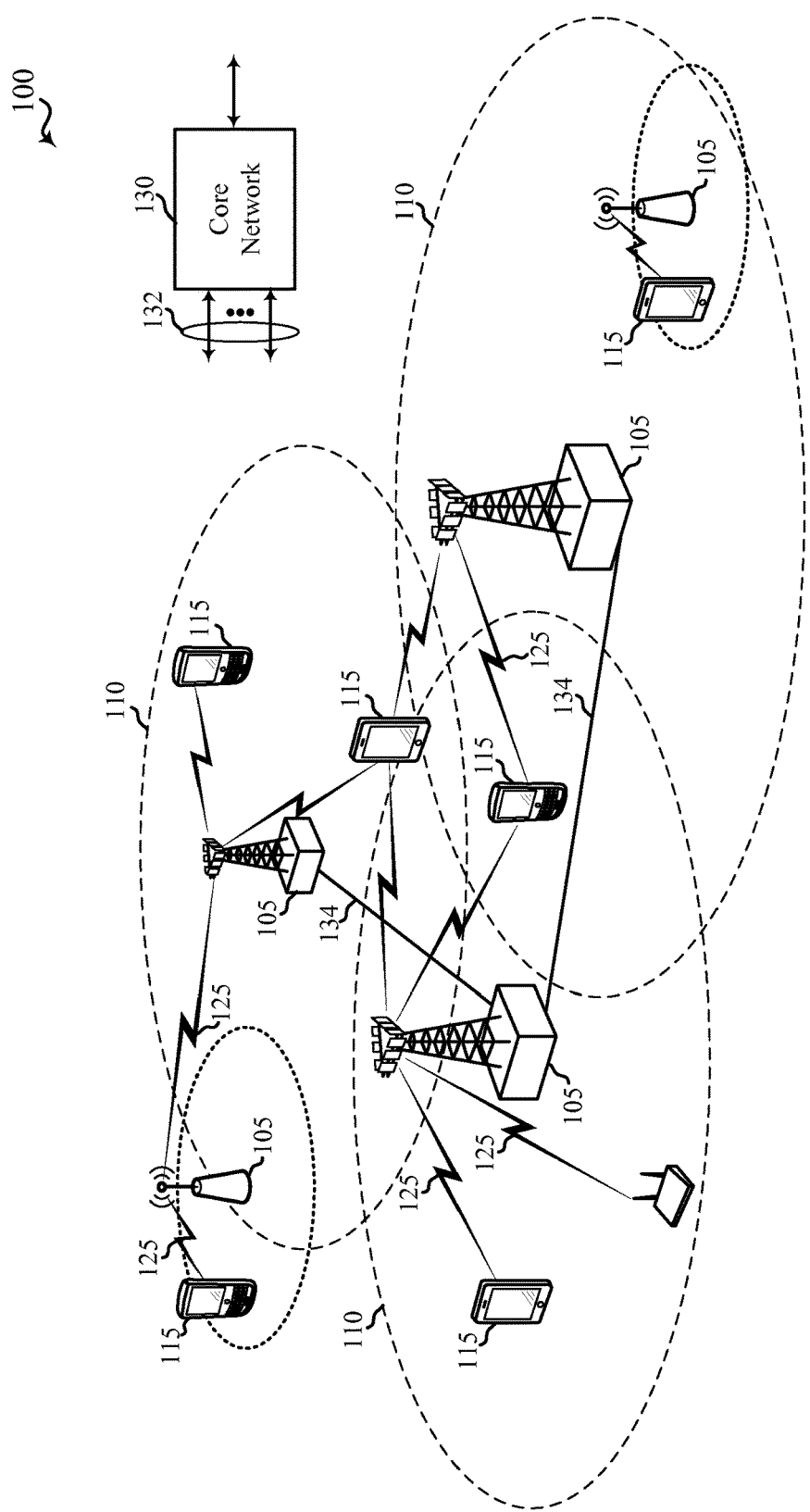
FIG. 1 shows a block diagram of a wireless communications system.

Methods, systems, apparatuses, and devices are described in which a transmitting device contends for access to a number of physical carriers of a shared spectrum, which number of physical carriers is greater than a number of physical carriers needed to make a wireless data transmission. In this manner, the transmitting device may in some cases lose to another device when contending for access to one or more of the physical carriers, yet still obtain access to enough physical carriers to make the wireless data transmission. More specifically, the transmitting device may identify a number of physical carriers to which it can gain access, and map a number of virtual carriers needed to make a data transmission to the number of physical carriers to which it can gain access. Physical carriers that the transmitting device does not need may be released. At a receiving device, the virtual-to-physical carrier mapping used by the transmitting device may in some cases be implicit, and determined in a dynamic manner by the receiving device.

In some cases, the methods, systems, apparatuses, and devices described herein may provide operators of cellular networks (e.g., operators of Long Term Evolution (LTE) or LTE-Advanced (LTE-A) communications networks) with a better opportunity to access a shared unlicensed spectrum (e.g., a WLAN spectrum typically used for WiFi communications). In other cases, the methods, systems, apparatus, and devices described herein may provide operators of cellular networks with a better opportunity to access a shared licensed spectrum.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

As used in the present description and the appended claims, the term "virtual carrier" refers to a proxy for a physical carrier during the encoding and decoding of data transmitted over a variable set of one or more physical carriers.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the system 100 may include an LTE/LTE-A communications system (or network), which LTE/LTE-A communications system may support one or more modes of operation or deployment scenarios for LTE/LTE-A communications in a shared and/or unlicensed spectrum. In other embodiments, the system 100 may support wireless communications using an unlicensed spectrum and an access technology different from LTE/LTE-A, or a licensed spectrum and an access technology different from LTE/LTE-A. In LTE/LTE-A communications systems, the term evolved NodeB or eNB may be generally used to describe the access points 105. The system 100 may be a heterogeneous network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum (e.g., a WLAN spectrum), or both. Similarly, the uplink transmissions may be made using a licensed spectrum (e.g., LTE), an unlicensed spectrum (e.g., a WLAN spectrum), or both.

In some embodiments of the system 100, various deployment scenarios for LTE/LTE-A communications in an unlicensed or shared spectrum may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum.

Figure 2A:
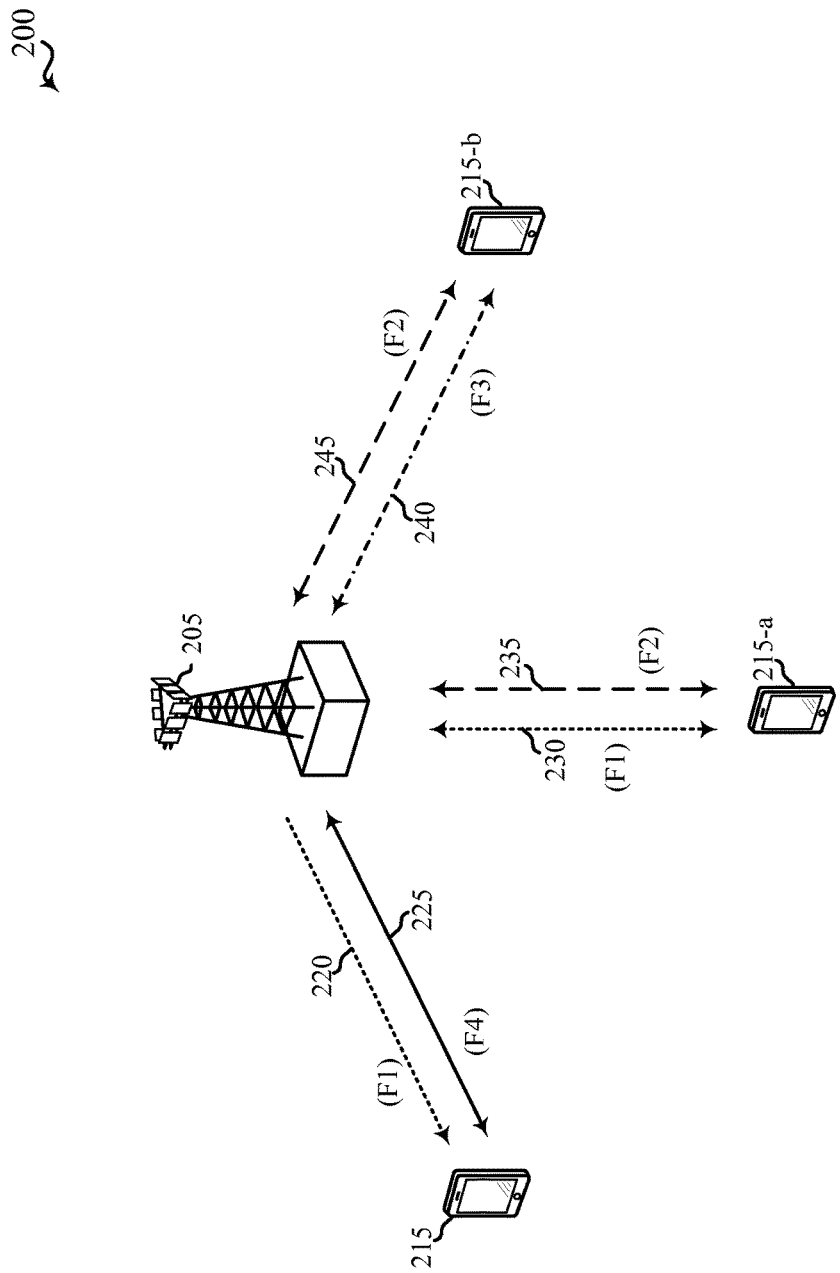
FIG. 2A shows a diagram that illustrates examples of deployment scenarios for using long term evolution (LTE) in an unlicensed spectrum according to various embodiments.

Turning next to FIG. 2A, a wireless communications system 200 illustrates examples of a supplemental downlink mode and a carrier aggregation mode for an LTE network that supports LTE/LTE-A communications in an unlicensed or shared spectrum. The system 200 may be an example of portions of the system 100 of FIG. 1. Moreover, the base station 205 may be an example of the base stations 105 of FIG. 1, while the UEs 215, 215-$a$, and 215-$b$ may be examples of the UEs 115 of FIG. 1.

In the example of a supplemental downlink mode in the system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in the system 200, the base station 205 may transmit OFDMA communications signals to a UE 215-$a$ using a bidirectional link 230 and may receive SC-FDMA communications signals from the same UE 215-$a$ using the bidirectional link 230. The bidirectional link 230 may be associated with the frequency F1 in the unlicensed spectrum. The base station 205 may also transmit OFDMA communications signals to the same UE 215-$a$ using a bidirectional link 235 and may receive SC-FDMA communications signals from the same UE 215-$a$ using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in the system 200, the base station 205 may transmit OFDMA communications signals to a UE 215-$b$ using a bidirectional link 240 and may receive SC-FDMA communications signals from the same UE 215-$b$ using the bidirectional link 240. The bidirectional link 240 may be associated with a frequency F3 in an unlicensed spectrum. The base station 205 may also transmit OFDMA communications signals to the same UE 215-*b* using a bidirectional link 245 and may receive SC-FDMA communications signals from the same UE 215-*b* using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE communications in both licensed and unlicensed spectrum for capacity offload.

As described above, the typical service provider that may benefit from the capacity offload offered by using LTE/LTE-A in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the carrier aggregation mode, data and control may generally be communicated in LTE/LTE-A over the licensed spectrum (e.g., bidirectional links 225, 235, and 245) while data may generally be communicated in LTE/LTE-A communications over the unlicensed or shared spectrum. The carrier aggregation mechanisms supported when using LTE/LTE-A over the unlicensed or shared spectrum may fall under a hybrid frequency division duplexing-time division duplexing (FDD-TDD) carrier aggregation or a TDD-TDD carrier aggregation with different symmetry across component carriers.

Figure 2B:
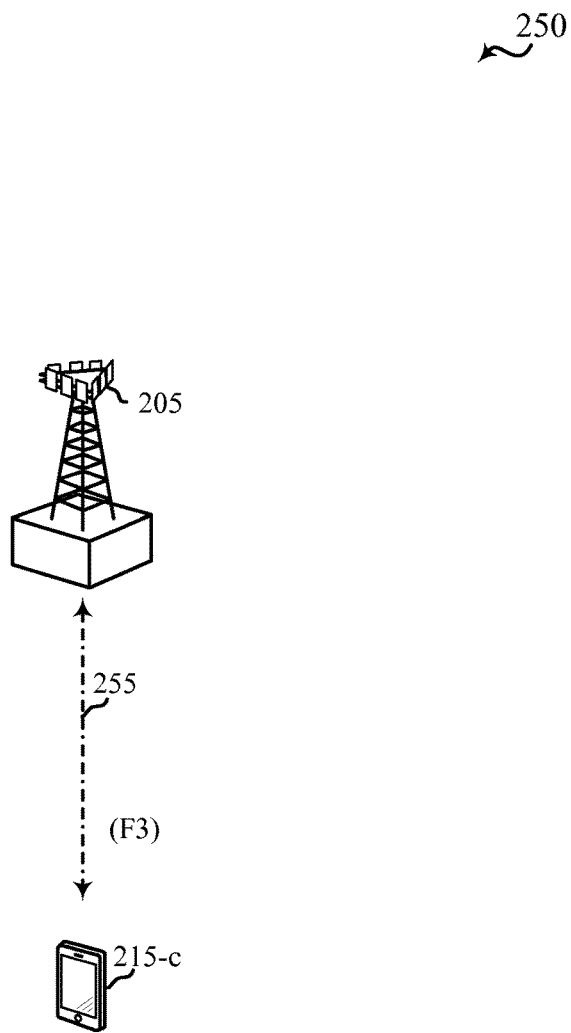
FIG. 2B shows a diagram that illustrates an example of a standalone mode using LTE in an unlicensed spectrum according to various embodiments.

FIG. 2B shows a wireless communications system 250 that illustrates an example of a standalone mode for LTE/LTE-A communications in an unlicensed or shared spectrum. The system 250 may be an example of portions of the system 100 of FIG. 1. Moreover, the base station 205 may be an example of the base stations 105 and/or 205 described with reference to FIGS. 1 and/or 2A, while the UE 215-*c* may be an example of the UEs 115 and/or 215 of FIGS. 1 and/or 2A.

In the example of a standalone mode in system 250, the base station 205 may transmit OFDMA communications signals to the UE 215-*c* using a bidirectional link 255 and may receive SC-FDMA communications signals from the UE 215-*c* using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some embodiments, a transmitting device such as an eNB 105 and/or 205 described with reference to FIGS. 1, 2A, and/or 2B, or a UE 115 and/or 215 described with reference to FIGS. 1, 2A, and/or 2B, may use a gating interval to gain access to a channel of the shared spectrum (e.g., to a physical channel of the licensed or unlicensed spectrum). The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA may indicate to the transmitting device whether a channel of the shared spectrum is available or in use. When the CCA indicates that the channel is available (e.g., "clear" for use), the gating interval may allow the transmitting device to use the channel—typically for a predefined transmission interval. When the CCA indicates that the channel is not available (e.g., in use or reserved), the gating interval may prevent the transmitting device from using the channel during the transmission interval.

In some cases, it may be useful for a transmitting device to generate a gating interval on a periodic basis and synchronize at least one boundary of the gating interval with at least one boundary of a periodic frame structure. For example, it may be useful to generate a periodic gating interval for a cellular downlink in a shared spectrum, and to synchronize at least one boundary of the periodic gating interval with at least one boundary of a periodic frame structure (e.g., LTE/LTE-A radio frame) associated with the cellular downlink. Examples of such synchronization are shown in FIG. 3.

Figure 3:
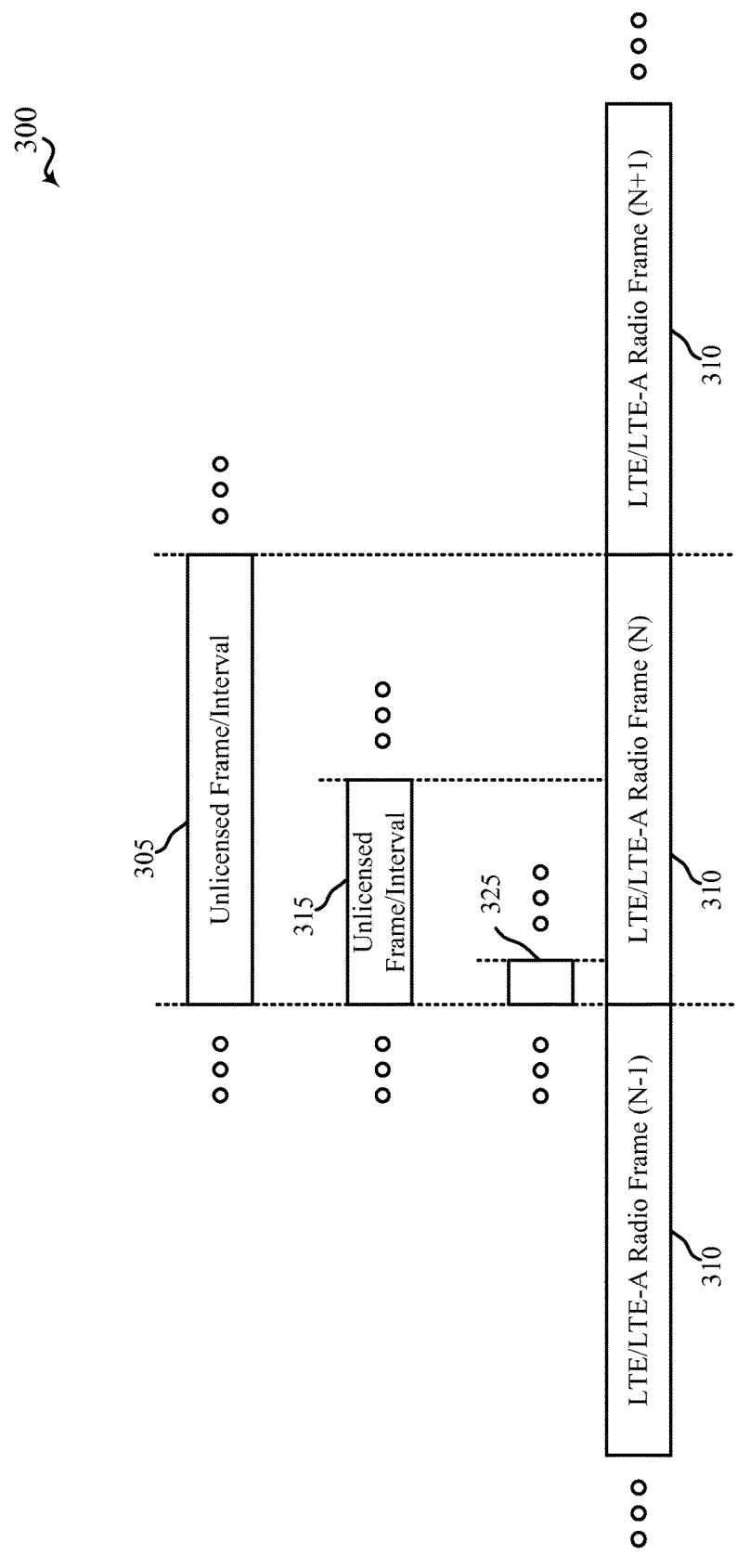
FIG. 3 shows various examples of unlicensed frames/intervals and their relationships to a periodic frame structure including, for example, LTE radio frames.

FIG. 3 illustrates examples 300 of an unlicensed frame/interval 305, 315, and/or 325 for a cellular downlink in an unlicensed spectrum. The unlicensed frame/interval 305, 315, and/or 325 may be used as a periodic gating interval by an eNB that supports LTE/LTE-A transmissions over the unlicensed spectrum (e.g., a WLAN spectrum). Examples of such an eNB may be the access points 105 and/or eNBs 205 described with reference to FIGS. 1, 2A, and/or 2B. The unlicensed frame/interval 305, 315, and/or 325 may be used with the system 100, 200, and/or 250 described with reference to FIGS. 1, 2A, and/or 2B.

By way of example, the duration of the unlicensed frame/interval 305 is shown to be equal to (or approximately equal to) a duration of an LTE/LTE-A radio frame 310 of a periodic frame structure associated with a cellular downlink. In some embodiments, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE/LTE-A radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the unlicensed frames/intervals 315 and 325 are shown to be sub-multiples of (or approximate sub-multiples of) the duration of the periodic frame structure associated with the cellular downlink. In some embodiments, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

Figure 4A:
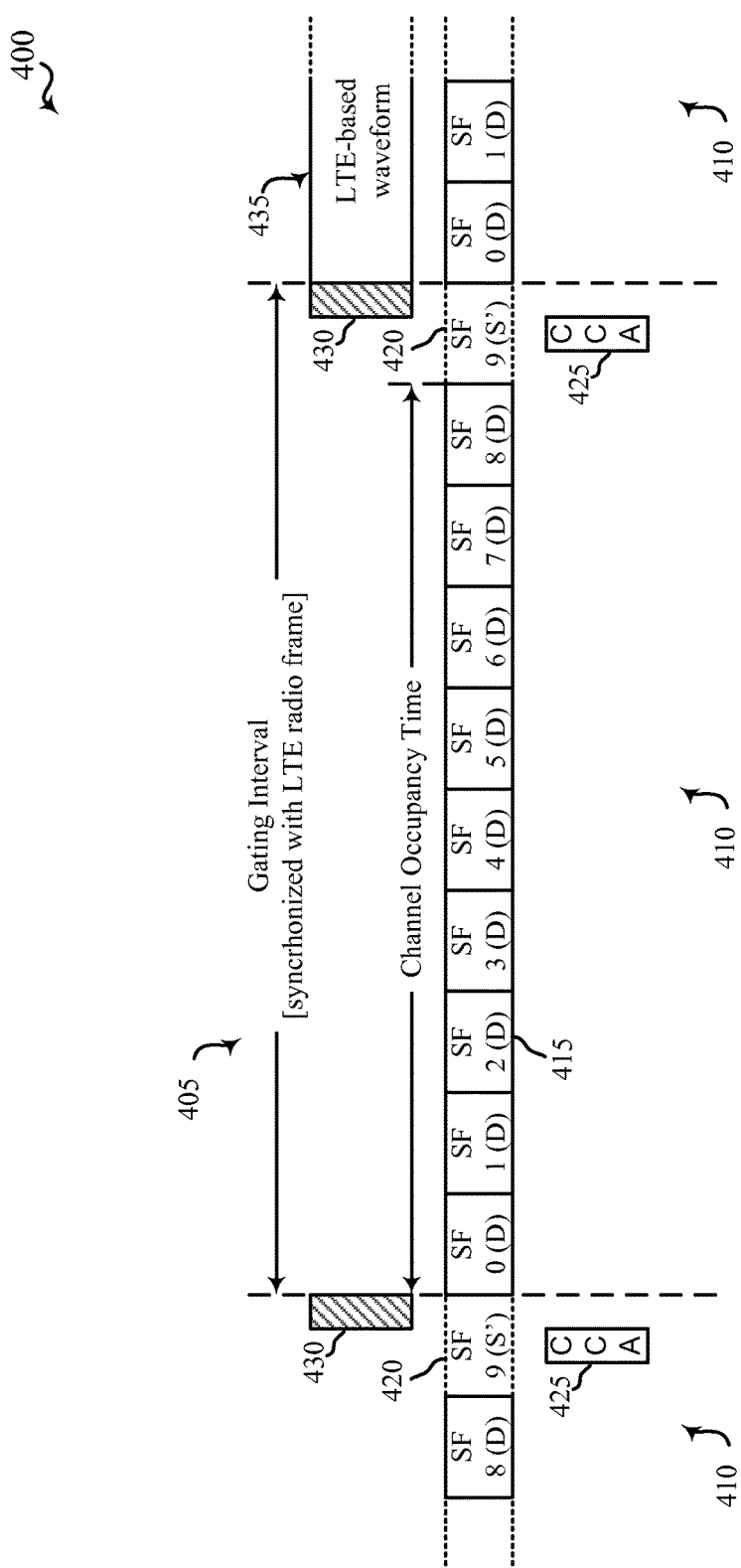
FIG. 4A shows a diagram that illustrates an example of a periodic gating structure waveform according to various embodiments.

FIG. 4A illustrates an example 400 of a periodic gating interval 405 for a cellular downlink in an unlicensed spectrum. The periodic gating interval 405 may be used by an eNB that supports LTE/LTE-A communications over an unlicensed or shared spectrum. Examples of such an eNB may be the eNBs 105 and 205 described with reference to FIGS. 1, 2A, and/or 2B. The periodic gating interval 405 may also be used with the system 100, 200, and/or 250 of FIGS. 1, 2A, and/or 2B.

By way of example, the duration of the periodic gating interval 405 is shown to be equal to (or approximately equal to) the duration of a periodic frame structure 410 associated with the cellular downlink. The boundaries of the periodic gating interval 405 may be synchronized with (e.g., aligned with) the boundaries of the periodic frame structure 410.

The periodic frame structure 410 may include an LTE/LTE-A radio frame having ten subframes (e.g., SF0, SF1, . . . , SF9). Subframes SF0 through SF8 may be downlink (D) subframes 415, and subframe SF9 may be a special (S') subframe 420. The D subframes 415 may collectively define a channel occupancy time of the LTE radio frame, and at least part of the S' subframe 420 may define a channel idle time. Under the current LTE/LTE-A standards, an LTE/LTE-A radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE/LTE-A standards, the periodic gating interval 405 may abide by these requirements of the LTE/LTE-A standard by providing a 0.5 millisecond guard period (i.e., OFF time) as part of the S' subframe 420.

Because the S' subframe 420 has a duration of one millisecond, it may include one or more CCA slots or windows 425 in which the transmitting devices contending for a particular physical channel of an unlicensed spectrum may perform their CCAs. When a transmitting device's CCA indicates the physical channel is available, but the device's CCA is completed before the end of the periodic gating interval 405, the device may transmit one or more signals to reserve the channel until the end of the periodic gating interval 405. The one or more signals may in some cases include Channel Usage Beacon Signals (CUBS) 430 and/or a cell-specific reference signal (CRS). As used in the present disclosure and the appended claims, the terms "Channel Usage Pilot Signal (CUPS)" and "Channel Usage Beacon Signal (CUBS)" are interchangeable. CUBS 430 and/or a CRS may be used for both channel synchronization and channel reservation. That is, a device that performs a CCA for the channel after another device begins to transmit CUBS on the channel may detect the energy of the CUBS 430 and determine that the channel is currently unavailable.

Following a transmitting device's successful completion of CCA for a physical channel and/or the transmission of CUBS 430 over a physical channel, the transmitting device may use the physical channel for up to a predetermined period of time (e.g., one LTE/LTE-A radio frame) to transmit a waveform (e.g., an LTE-based waveform 435 associated with a physical carrier).

Figure 4B:
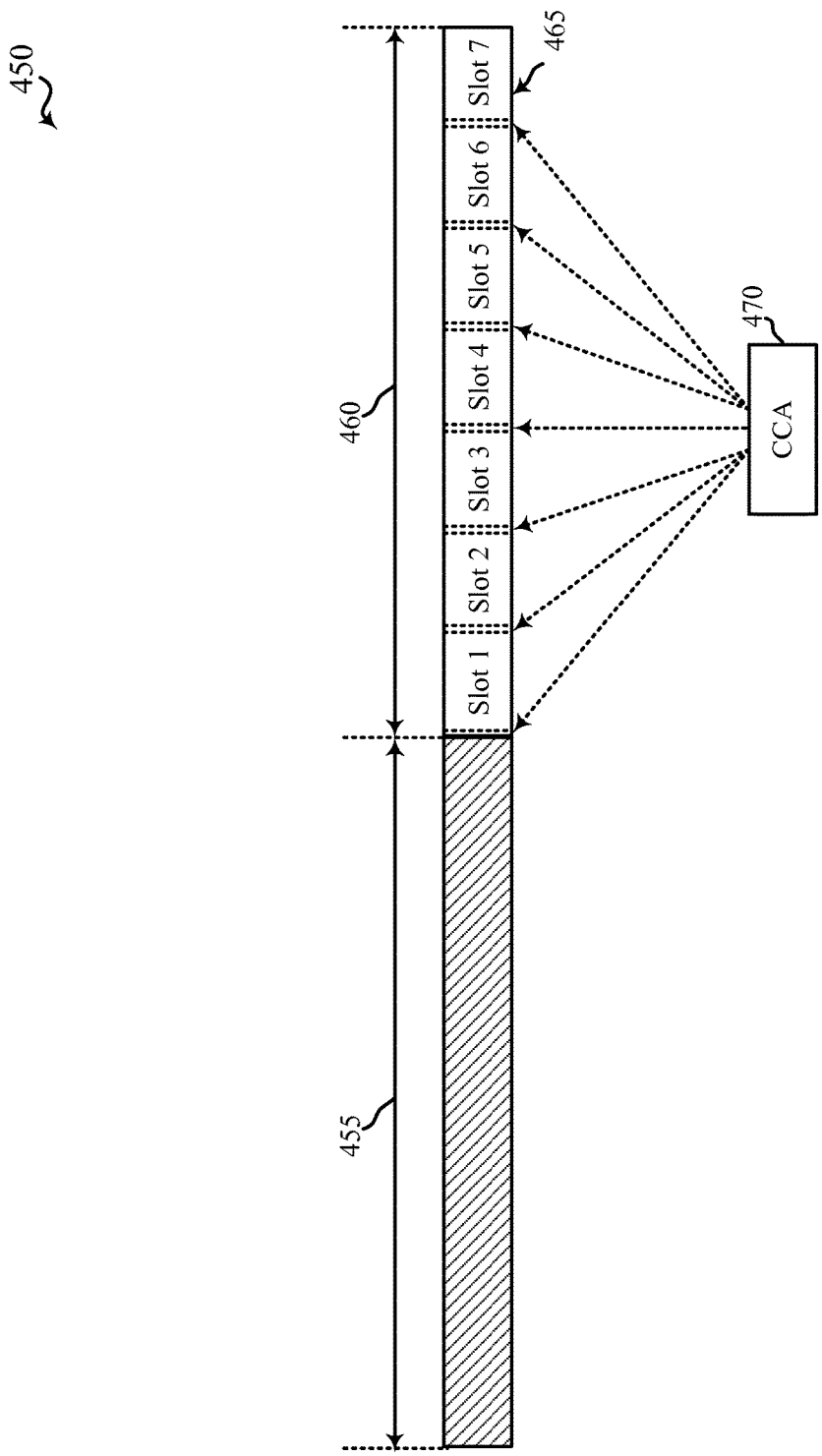
FIG. 4B shows a diagram that illustrates an example of placement options for clear channel assessment (CCA) slots in an S' subframe according to various embodiments.

FIG. 4B illustrates how a contention-based protocol such as LBT may be implemented within an S' subframe 450 of a gating interval, such as an S' subframe of the ten millisecond periodic gating interval 405 described with reference to FIG. 4A. The contention-based protocol may be used with, for example, the system 100, 200, and/or 250, access points or eNBs 105 and/or 205, and/or UEs 115 and/or 215 described with reference to FIGS. 1, 2A, and/or 2B.

The S' subframe 450 may have a guard period (or silent period) 455 and a CCA period 460. By way of example, each of the guard period 455 and the CCA period 460 may have a duration of 0.5 milliseconds and include seven OFDM symbol positions 465 (labeled in FIG. 4B as Slots 1 through 7). In some cases, an eNB may select one or more of the OFDM symbol positions 465 to perform a CCA 470 for a subsequent transmission interval of an unlicensed spectrum, to determine whether the transmission interval of the unlicensed spectrum is available for a transmission during the transmission interval. In some cases, different ones of the OFDM symbol positions 465 may be pseudo-randomly identified or selected by an eNB in different occurrences of the S' subframe 450 (i.e., in different S' subframes used to perform CCA 470 for different transmission intervals of the unlicensed spectrum). The pseudo-random identification or selection of OFDM symbol positions may be controlled using a hopping sequence.

The eNBs of a wireless communications system may be operated by the same or different operators. In some embodiments, the eNBs operated by different operators may select different ones of the OFDM symbol positions 465 in a particular S' subframe 450, thereby avoiding CCA collisions between different operators. If the pseudo-random selection mechanisms of different operators are coordinated, OFDM symbol positions 465 may be pseudo-randomly selected by a plurality of different operators such that the eNBs of the different operators each have an equal opportunity to perform CCA 470 in the earliest OFDM symbol position (i.e., Slot 1) for certain transmission intervals. Thus, over time, the eNBs of the different operators may each have an opportunity to perform CCA 470 first and gain access to a transmission interval of the unlicensed spectrum regardless of the needs of eNBs of other operators. After a successful CCA 470, an eNB may transmit CUBS to prevent other devices and/or operators from using one or more physical channels of the transmission interval of the unlicensed spectrum.

Figure 5:
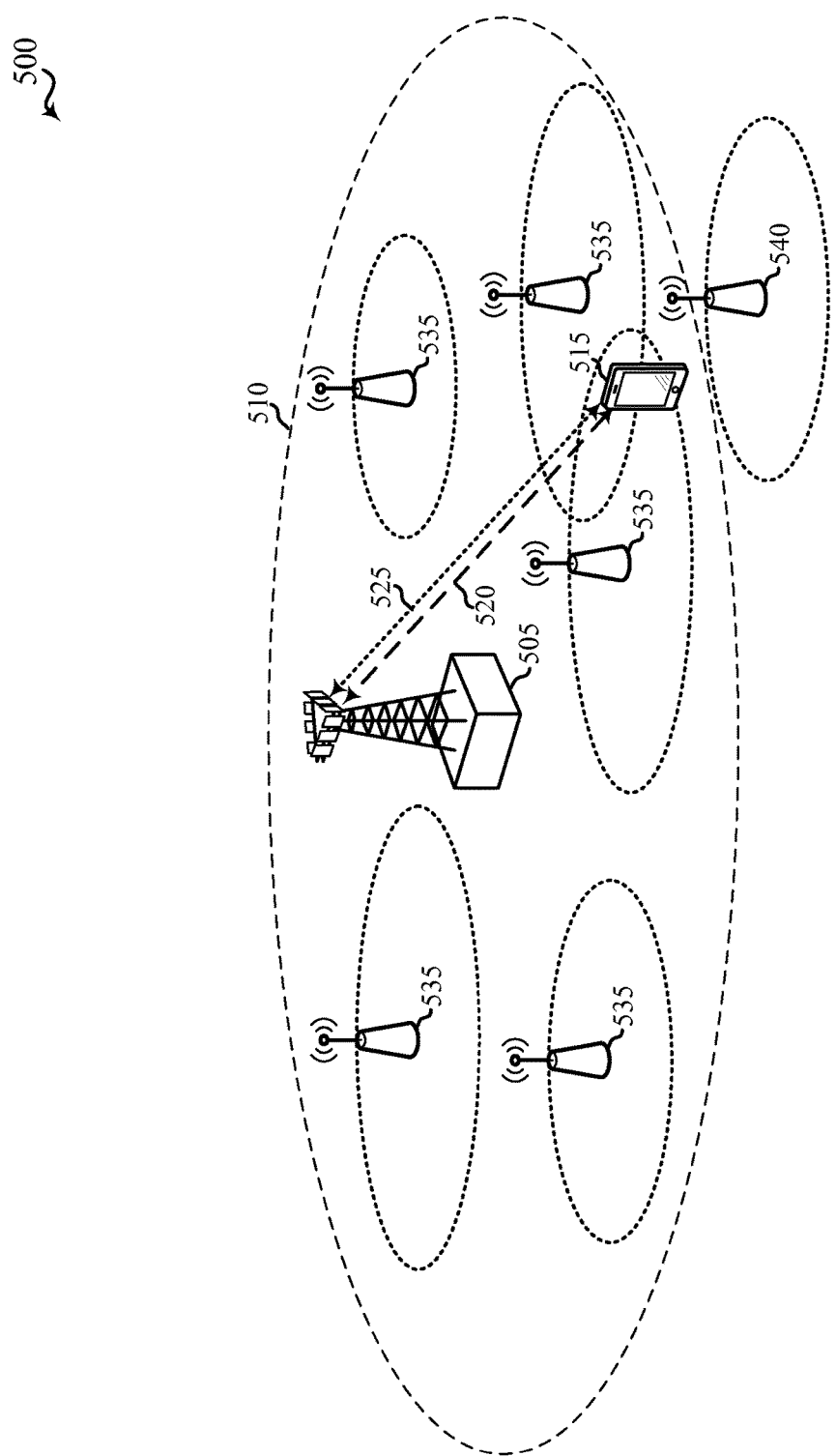
FIG. 5 shows a block diagram of a wireless communications system in which a number of wireless access points and a UE are within the coverage area of an eNB.

FIG. 5 illustrates a wireless communications system 500 in which a number of wireless access points (e.g., WiFi nodes) 535 and a UE 515 are within the coverage area 510 of an eNB 505. In some examples, the eNB 505, UE 515, and/or wireless access points 535 may be respective examples of one or more aspects of the eNBs 105 and/or 205, UEs 115 and/or 215, and/or wireless access points 105 described with reference to FIGS. 1, 2A, and/or 2B.

The eNB 505 and UE 515 may communicate with one another over a licensed or unlicensed spectrum using either or both of a bidirectional link 520 in a licensed spectrum (e.g., an LTE/LTE-A spectrum) and a bidirectional link 525 in an unlicensed spectrum (e.g., LTE/LTE-A in an unlicensed spectrum). Such communication may be an example of the carrier aggregation scenario described above with respect to FIG. 2A.

When attempting to reserve access to the bidirectional link 525 in the unlicensed spectrum, both the eNB 505 and the UE 515 may perform CCAs to determine availability of the unlicensed spectrum. In some cases, both the eNB 505 and the UE 515 may perform a CCA, to account for the presence of wireless access points 540 and/or other potential transmitting devices that are outside the coverage area 510 of the eNB 505, but within range of the UE 515. Such wireless access points 540 may be referred to as "hidden nodes," because their presence may be unknown to and hidden from the eNB 505. Thus, in the absence of the UE 515 performing CCA to discover possible transmissions of the wireless access point 540, the eNB 505 might determine that the unlicensed spectrum is available in a particular transmission interval when, in fact, a hidden wireless access point 540 has already reserved the unlicensed spectrum for communication with a device or devices in the vicinity of the UE 515.

Figure 6:
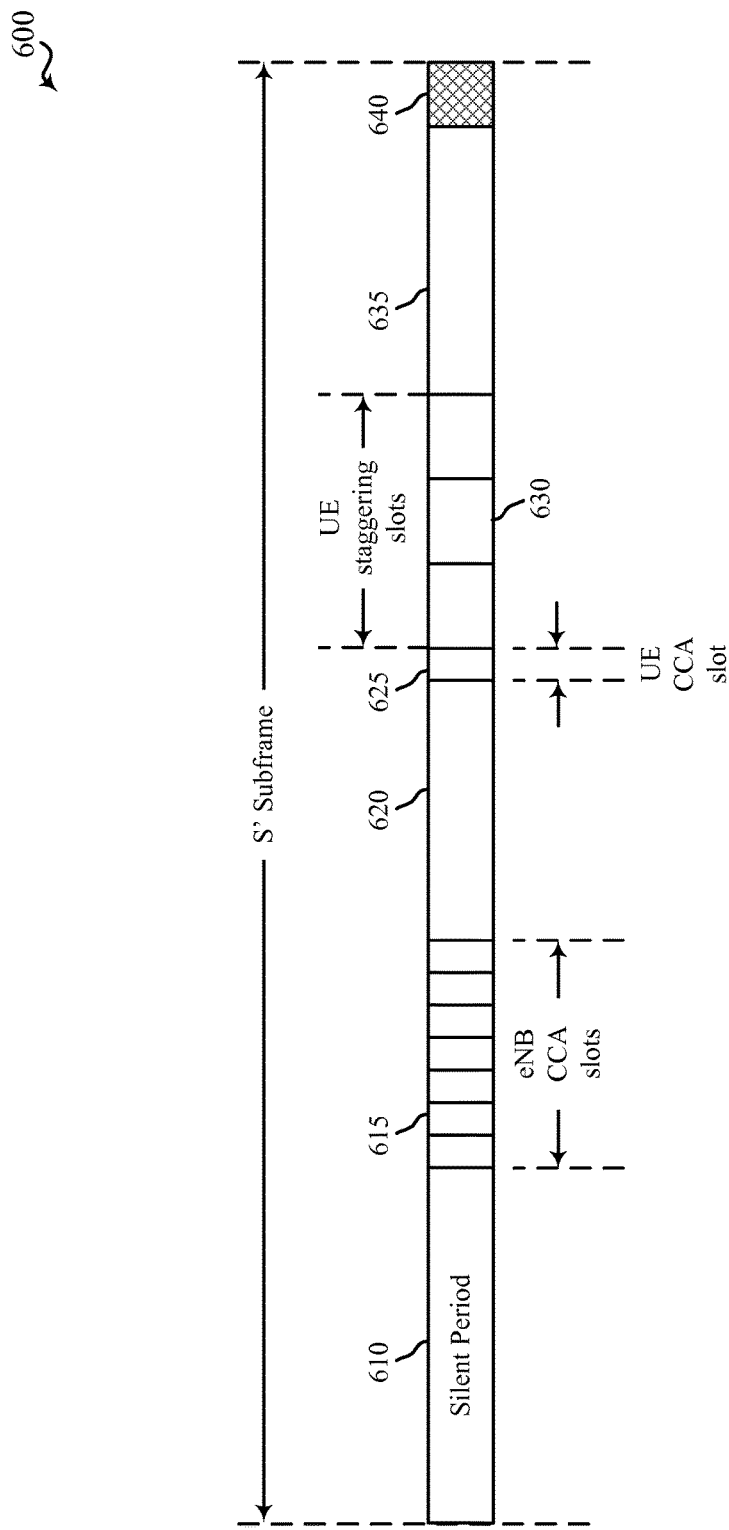
FIG. 6 shows a diagram that illustrates an example format of an S' subframe according to various embodiments.

FIG. 6 illustrates an example format of an S' subframe 600. In some embodiments, the S' subframe 600 may be an alternate example of the S' subframe 420 and/or 450 described with reference to FIGS. 4A and/or 4B. The S' subframe 600 may include a silent period 610, a number (e.g., seven) of eNB CCA slots 615, an eNB transmission period 620, a UE CCA slot 625, a number (e.g., three) of second waveform slots 630, a UE transmission period 635, and a partial channel usage beacon symbol (PCUBS) transmission period 640. In some cases, the S' subframe 600 may be used in conjunction with a ten millisecond frame or gating structure, such as the periodic gating interval 405 described with reference to FIG. 4A, and have a duration of one millisecond.

The silent period 610 may occur at various points in the S' subframe 600, such as the beginning or end, and in some cases may be split into two or more silent periods. By way of example, the silent period 610 is shown to occur at the beginning of the S' subframe 600. The silent period 610 enables compliance with the channel occupancy requirements of the LTE standard. In some instances, the silent period 610 may have a minimum duration of 475 microseconds.

One of the eNB CCA slots 615 may be pseudo-randomly selected by an eNB for performing CCA to determine availability of an unlicensed spectrum. The eNB CCA slots 615 may be pseudo-randomly selected such that the eNBs of a same operator deployment perform CCA in a common one of the eNB CCA slots 615, and the eNBs of different operator deployments perform CCA in different ones of the eNB CCA slots 615. In successive instances of the S' subframe 600, the pseudo-random selection of eNB CCA slots may result in different operator deployments selecting the first of the eNB CCA slots. In this manner, each of a number of operator deployments may be given the first chance to perform CCA (e.g., a first operator deployment may select the first eNB CCA slot in one S' subframe 600, a second operator deployment may select the first eNB CCA slot in a next S' subframe 600, etc.). In some instances, the eNB CCA slots 615 may each have a duration of approximately 20 microseconds.

When an eNB makes a determination that the unlicensed spectrum is available, it may immediately begin transmitting a first waveform. The first waveform may be transmitted during later ones of the eNB CCA slots 615 and/or during the eNB transmission period 620. The first waveform may be configured to indicate one or more time periods during which the eNB has channel access over the unlicensed spectrum.

The UEs receiving the first waveform may, responsive to the first waveform, perform their own CCAs during the UE CCA slot 625. When a UE determines that the unlicensed spectrum is available, the UE may transmit a second waveform and a third waveform over the unlicensed spectrum.

The second waveform may be transmitted in one of the second waveform slots 630 and may be configured to indicate to nearby WiFi devices that the eNB that transmitted the first waveform has channel access over the unlicensed spectrum during a particular time period. The set of second waveform slots may enable a UE to identify a second waveform slot that is staggered relative to the second waveform slot identified by another UE in the same operator deployment. The staggering of second waveforms in the set of second waveform slots may enable nearby WiFi devices to better distinguish and decode second waveforms received from more than one UE. The second waveform slots 630 may each have a duration of approximately 44 microseconds.

The third waveform may be transmitted immediately following the second waveform and/or during the UE transmission period 635. The third waveform may be configured to provide information to the eNB for data transmissions to the UE. The data transmissions may occur subsequent to the S' subframe 600.

The PCUBS transmission period 640 may or may not occur in a particular S' subframe 600. Its occurrence may depend on the transmission timing of the third waveform. During the PCUBS transmission period 640, one or more eNBs and/or UEs may transmit PCUBS to maintain its channel access (e.g., reservation) over the unlicensed spectrum.

The S' subframe 600 may be useful in that it provides CCA slots for both eNBs and UEs, and in some cases may help alleviate the hidden node problem described with reference to FIG. 5.

Figure 7:
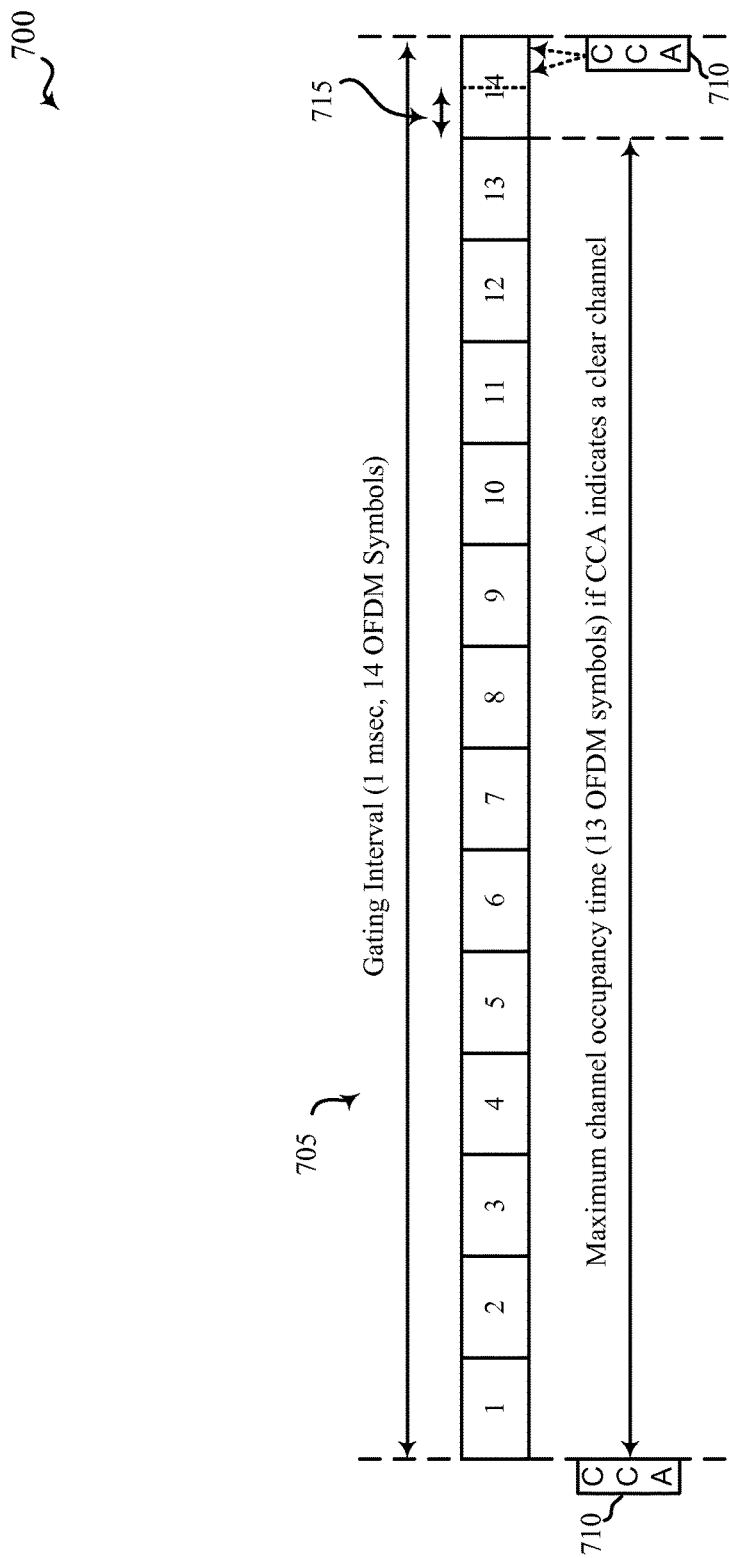
FIG. 7 shows a diagram that illustrates an example of a periodic gating structure waveform with 14 Orthogonal Frequency-Division Multiplexing (OFDM) symbols according to various embodiments.

FIG. 7 provides an example 700 of a one millisecond (e.g., one LTE/LTE-A subframe) gating interval 705. A one millisecond gating interval 705 may be used by the access points or eNBs 105, 205, and/or 505 and/or UEs 115, 215, and/or 515, described with reference to FIGS. 1, 2A, 2B, and/or 5. The gating interval 705 may be used with the system 100, 200, 250, and/or 500 described with reference to FIGS. 1, 2A, 2B, and/or 5.

The current LTE/LTE-A specification requires a channel occupancy time (ON time) ≥one millisecond, and a channel idle time ≥five percent of the channel occupancy time. Thus, the current LTE specification dictates a minimum gating interval duration of 1.05 milliseconds. However, if the LTE specification could be relaxed to require a minimum channel occupancy time of perhaps 0.95 milliseconds, then a one millisecond gating interval would be possible.

As shown in FIG. 7, a gating interval 705 of one millisecond may include 14 OFDM symbols (or symbol positions). When a successful CCA is performed during a CCA slot 710 preceding the gating interval 705, a downlink transmission may occur during the first 13 OFDM symbols of the gating interval 705. Such a downlink transmission may have a duration (or channel occupancy time) of 929 microseconds. In accord with the current LTE standard, a channel occupancy time of 929 microseconds would require a channel idle time 715 of 48 microseconds, which is less than the 71.4 microsecond duration of one OFDM symbol. As a result, the channel idle time 715 of 48 microseconds, as well as one or more CCA slots 710, may be provided during the $14^{th}$ OFDM symbol position. In some cases, two CCA slots 710 having a total duration of 20 microseconds may be provided during the $14^{th}$ OFDM symbol position, thereby enabling some amount of CCA randomization. Of note, each CCA slot 710 in the example 700 has a duration of less than one OFDM symbol.

Figure 8:
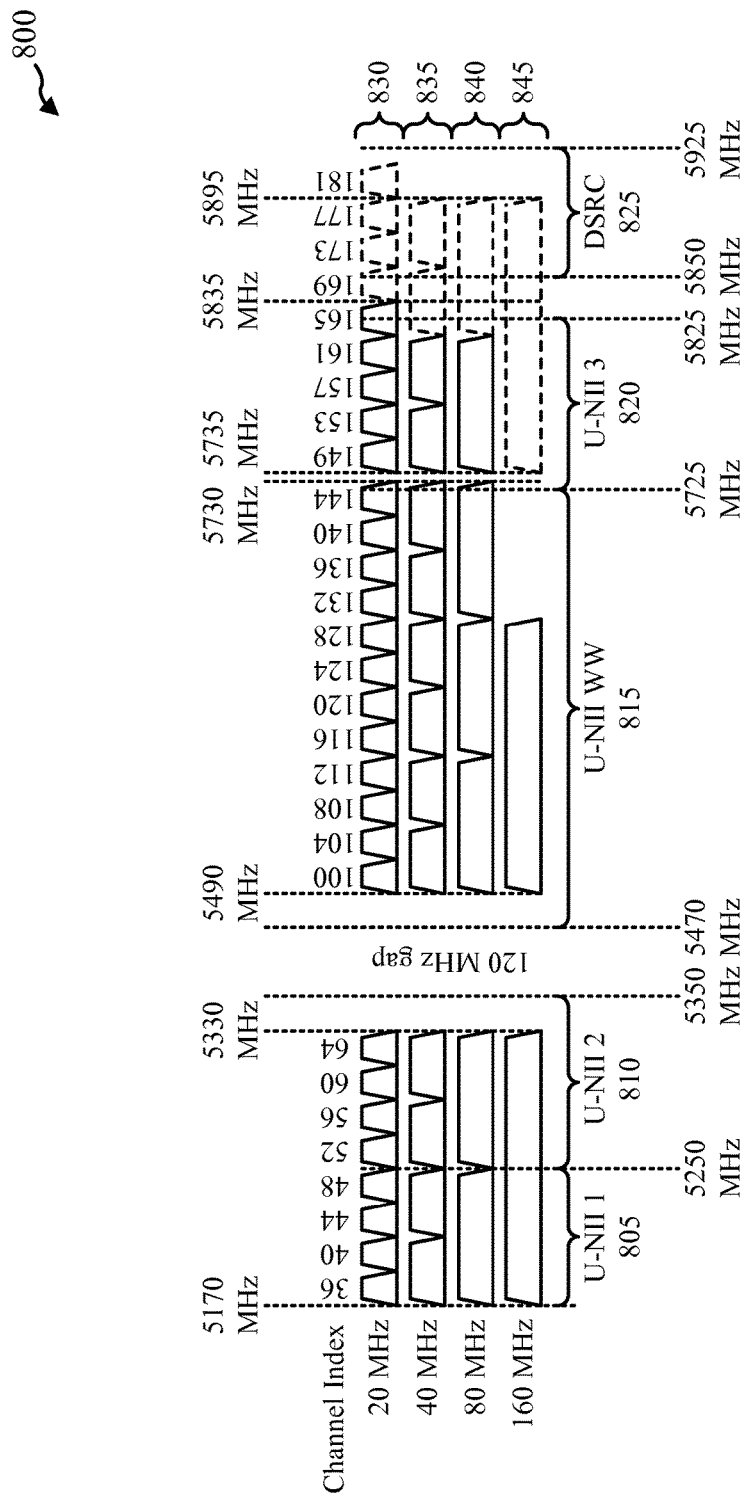
FIG. 8 shows a diagram that illustrates an allocation of frequency bands (i.e., physical channels) along a frequency spectrum.

FIG. 8 shows an exemplary view of various frequency spectrum allocations in the unlicensed 5 GHz spectrum 800. As illustrated in FIG. 8, the 5 GHz spectrum 800 may include the U-NII 1 frequency band 805 (e.g., 5170-5250 MHz), the U-NII 2 frequency band 810 (e.g., 5250-5350 MHz), the U-NII WW frequency band 815 (e.g., 5470-5725 MHz), the U-NII 3 frequency band 820 (e.g., 5725-5825 MHz), and the DSRC frequency band 825 (e.g., 5850-5925 MHz).

Each frequency band may be allocated to use one or more physical channels. Each physical channel may occupy bandwidth (e.g., 10 MHz, 20 MHz, 40 MHz, 80 MHz, 160 MHz, etc.). The U-NII 1 frequency band 805 (which occupies 80 MHz, for example) may support up to four 20 MHz channels 830 (with channel indexes 36, 40, 44, and 48, for example), up to two 40 MHz channels 835, or one 80 MHz channel 840. Similarly, the U-NII 2 frequency band 810 may support up to four 20 MHz channels 830 (with channel indexes 52, 56, 60, and 64, for example), up to two 40 MHz channels 835, or one 80 MHz channel 840. Certain devices (e.g., Wi-Fi or LTE/LTE-A device configured to operate in an unlicensed spectrum) may operate across both the U-NII 1 and U-NII 2 frequency bands 805, 810. As a result the U-NII 1 and U-NII 2 frequency bands 805, 810 may be effectively combined to result in a 5170-5350 MHz frequency band. Accordingly, a 160 MHz channel 845 (e.g., 5170-5330 MHz) may be supported.

As illustrated in FIG. 8, the U-NII 3 frequency band 820 (e.g., 5725-5825 MHz) may support up to five 20 MHz channels 830 (with channel indexes 149, 153, 157, 161, and 165, for example), up to two 40 MHz channels 835, or one 80 MHz channel 840. Typically, the DSRC frequency band 825 supports DSRC communications using 10 MHz channels. In some cases, multi-mode LTE/LTE-A device may opportunistically use part or all of the 5 GHz spectrum 800 as spectrum for LTE/LTE-A communications after gaining access to and reserving one or more channels of the spectrum using a contention-based protocol (e.g., LBT and/or CCA).

In some cases, it may be desirable for a transmitting device to perform CCA for more physical channels than are needed for a particular wireless data transmission. In this manner, the transmitting device may lose to another device when contending for access to one or more of the physical channels, yet still obtain access to enough physical channels to make a wireless data transmission. FIGS. 9A, 9B, 9C, and 9D illustrate various examples in which a transmitting device may perform CCA for more physical channels than are needed for a wireless data transmission. The channels needed to make the wireless data transmission may be referred to as virtual component carriers (labeled, e.g., VirCC_x in the figures, where "x" is a channel number), virtual carriers, or virtual channels. The virtual carriers may be mapped to physical component carriers or physical channels for which CCA is successfully performed (labeled, e.g., PhyCC_y in the figures, where "y" is a channel number). As used in the present specification and in the appended claims, the terms "virtual carrier," "virtual component carrier," and "virtual channel" are interchangeable. In addition, the terms "physical carrier," "physical component carrier," and "physical channel" are interchangeable.

Figure 9A:
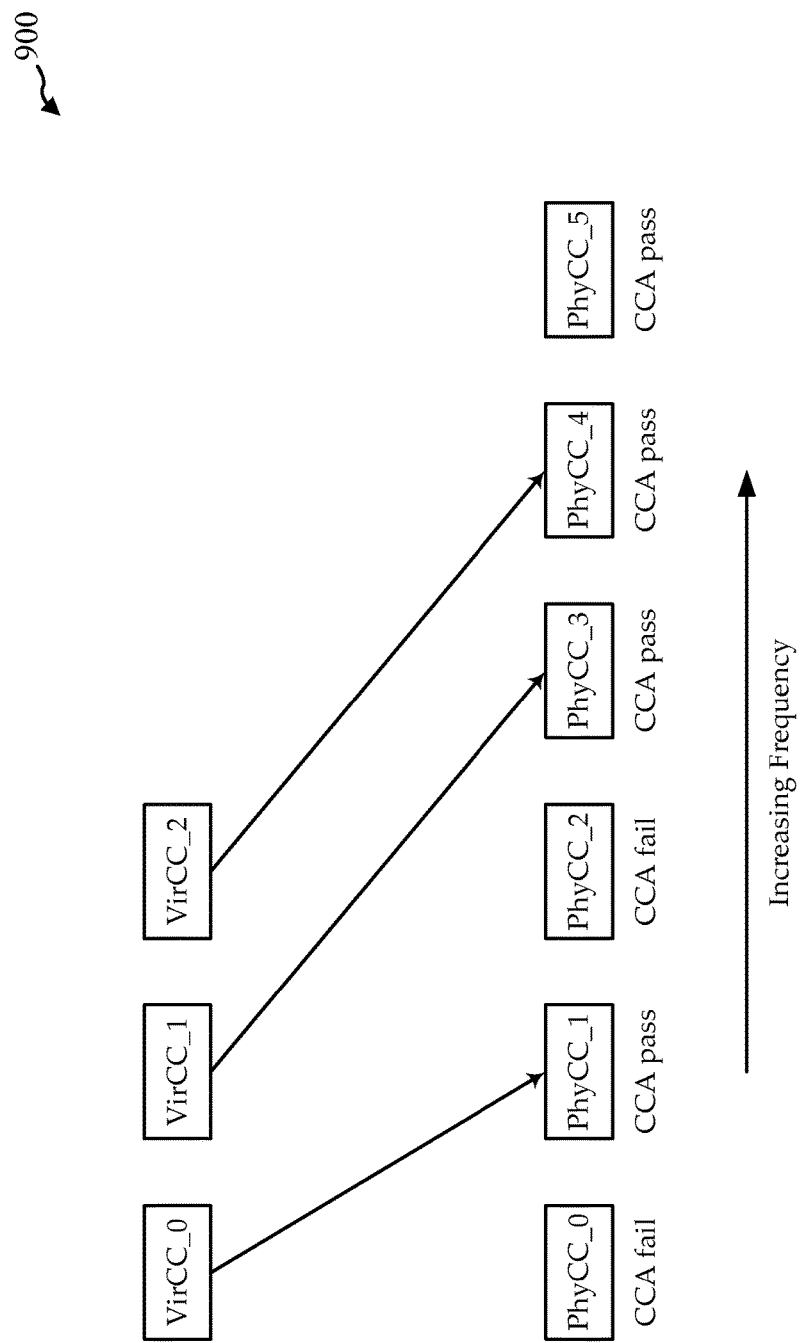
FIGS. 9A, 9B, 9C, and 9D illustrate various techniques for mapping virtual carriers to physical carriers in a shared spectrum according to various embodiments.

Turning now to FIG. 9A, there is shown a mapping 900 of three virtual carriers (i.e., VirCC_0, VirCC_1, and VirCC_2) to three physical carriers (i.e., PhyCC_1, PhyCC_3, and PhyCC_4). When a transmitting device desires to make a wireless data transmission requiring the three virtual carriers, the transmitting device may perform a CCA for more physical carriers than are required to make the wireless data transmission (e.g., for physical channels associated with physical carriers PhyCC_0, PhyCC_1, PhyCC_2, PhyCC_3, PhyCC_4, and PhyCC_5). As shown, the CCA may be successful (i.e., "pass") for some of the physical carriers and be unsuccessful (i.e., "fail") for other ones of the physical carriers. However, because the CCA passes for enough of the physical carriers, the wireless data transmission may be made regardless of the CCA failing for certain physical carriers. The virtual carriers may be mapped to the physical carriers in any agreed upon manner, such as, with the lowest numbered virtual carrier mapped to the lowest numbered physical carrier for which CCA was successfully performed. In the example given, the mapping may be implicit to a receiving device (e.g., the transmitting device may transmit signaling on the physical carriers it uses, to reserve the channels, and a receiving device may detect energy or signaling on each of the channels used and implicitly understand that a lowest numbered one (or lowest frequency one) of the channels on which energy appears is mapped to a lowest numbered virtual carrier of a wireless data transmission). Alternately, the transmitting device may transmit, and the receiving device may receive, information (e.g., a bitmap) from which the receiving device may identify the physical carriers (e.g., PhyCC_1, PhyCC_3, and PhyCC_4) to which the virtual carriers (e.g., VirCC_0, VirCC_1, and VirCC_2) are mapped.

Figure 9B:
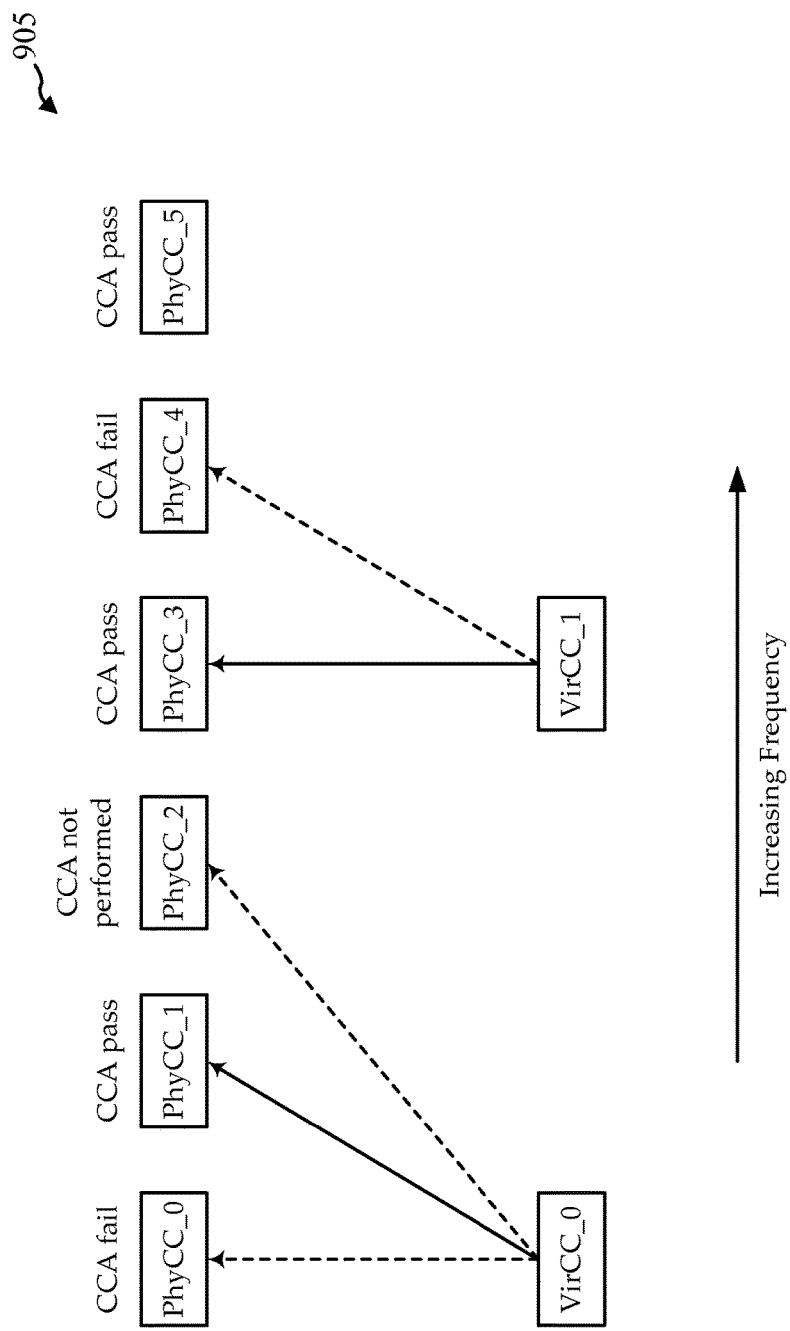

FIG. 9B shows a mapping 905 of two virtual carriers (i.e., VirCC_0 and VirCC_1) to two physical carriers (i.e., PhyCC_1 and PhyCC_3). When a transmitting device desires to make a wireless data transmission requiring the two virtual carriers, the transmitting device may perform a CCA for more physical carriers than are required to make the wireless data transmission (e.g., for physical carriers PhyCC_0, PhyCC_1, PhyCC_2, PhyCC_3, PhyCC_4, and PhyCC_5). As shown, the CCA may be successful (i.e., "pass") for some of the physical carriers and be unsuccessful (i.e., "fail") for other ones of the physical carriers. However, because the CCA passes for enough of the physical carriers, the wireless data transmission may be made regardless of the CCA failing for certain physical carriers. The virtual carriers may be mapped to the physical carriers in any agreed upon manner, such as, with the lowest numbered virtual carrier mapped to the lowest numbered physical carrier for which CCA was successfully performed. In the example given, the mapping may be implicit to a receiving device (e.g., the transmitting device may transmit signaling on the physical carriers it uses, to reserve the channels, and a receiving device may detect energy or signaling on each of the channels used and implicitly understand that a lowest numbered one (or lowest frequency one) of the channels on which energy appears is mapped to a lowest numbered virtual carrier of a wireless data transmission).

In FIG. 9B, a CCA may be performed for a first subset of physical carriers (e.g., PhyCC_0, PhyCC_1, and PhyCC_2) that might be used for transmitting the virtual carrier VirCC_0, and a second subset of physical carriers (e.g., PhyCC_3, PhyCC_4, and PhyCC_5) that might be used for transmitting the virtual carrier VirCC_1. When CCA is successful for more than one physical carrier in a subset, a virtual carrier corresponding to the subset may be mapped to one of the physical carriers for which the CCA was successfully performed, or the virtual carrier may be mapped to more than one of the physical carriers for which the CCA was successfully performed and transmitted redundantly. Alternately, a virtual carrier corresponding to the subset may be mapped to one of the physical carriers for which the CCA was successfully performed, and another transmission may be made over at least one additional carrier for which the CCA was successfully performed. For example, in the case of a downlink virtual carrier, the transmission made over the at least one additional carrier may include a CUBS and/or a channel state information reference signal (CSI-RS). In the case of an uplink virtual carrier, the transmission made over the at least one additional carrier may include a sounding reference signal (SRS) and/or a CCA exempt transmission (CET), which CET may include an SRS. A CET may also be made over any physical carrier, and in some cases each physical carrier (or each physical carrier not mapped to a virtual carrier), regardless of whether CCA is successfully performed for the physical carrier. The transmission of an SRS or CET over a physical carrier which is not mapped to a virtual carrier may enable an eNB to derive updated channel quality information (CQI) for a physical channel that is not used for a current wireless data transmission. CQI is a property of physical channels and can be very different from one physical channel to another (e.g., because of interference conditions and/or hidden terminals). For rate prediction, updated CQI is needed for all physical channels, so that an eNB can schedule transmissions on any of the physical channels. From the perspective of the eNB deriving the updated CQI for one or more physical channels, transmitting an SRS or CET over the physical channels improves resource utilization, though from the perspective of an eNB in another operator deployment, transmitting an SRS or CET over physical channels that are not used for a wireless data transmission may be wasteful.

Figure 9C:
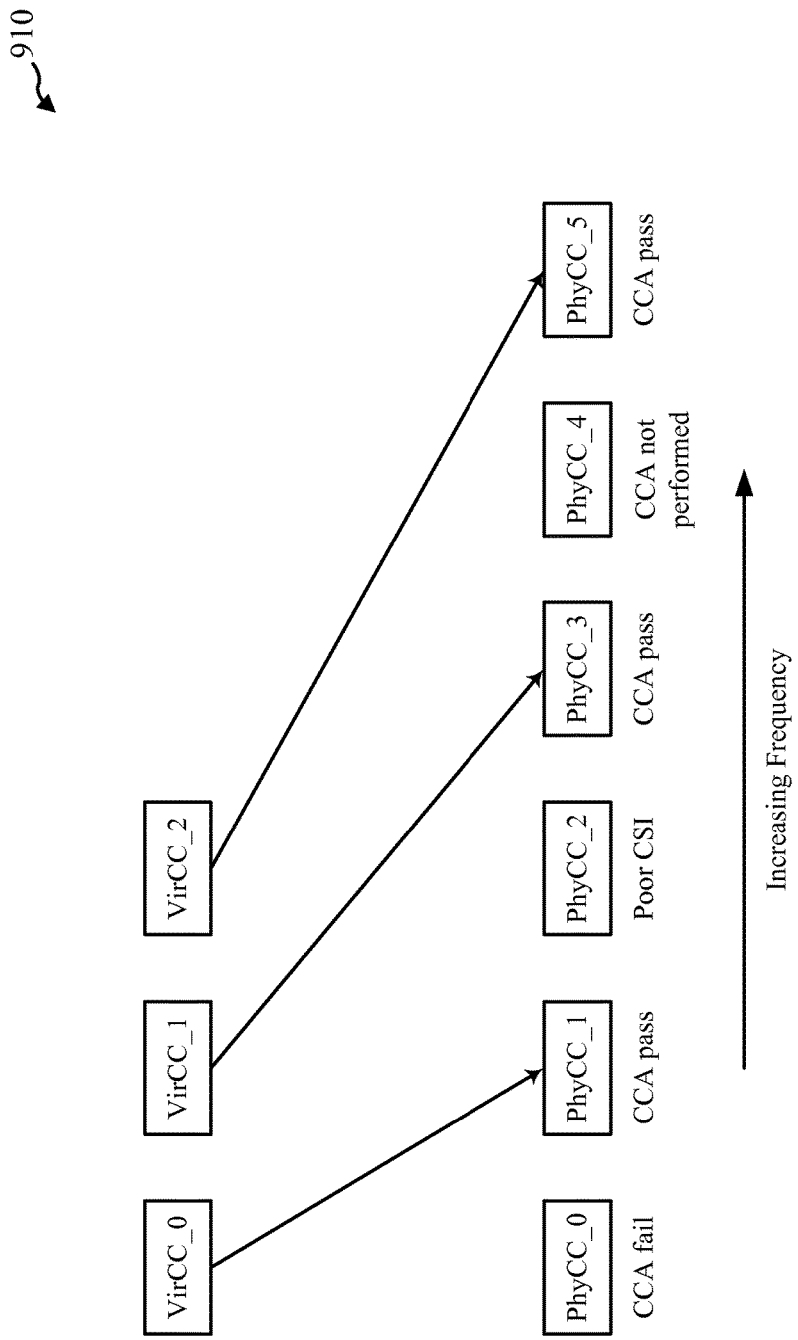

FIG. 9C shows another mapping 910 of three virtual carriers (i.e., VirCC_0, VirCC_1, and VirCC_2) to three physical carriers (i.e., PhyCC_1, PhyCC_3, and PhyCC_5). When a transmitting device desires to make a wireless data transmission requiring the three virtual carriers, the transmitting device may perform a CCA for more physical carriers than are required to make the wireless data transmission (e.g., for physical carriers PhyCC_0, PhyCC_1, PhyCC_2, PhyCC_3, PhyCC_4, and PhyCC_5). As shown, the CCA may be successful (i.e., "pass") for some of the physical carriers and be unsuccessful (i.e., "fail") for other ones of the physical carriers. However, because the CCA passes for enough of the physical carriers, the wireless data transmission may be made regardless of the CCA failing for certain physical carriers. The virtual carriers may be mapped to the physical carriers in any agreed upon manner, such as, with the lowest numbered virtual carrier mapped to the lowest numbered physical carrier for which CCA was successfully performed. In the example given, the mapping may be implicit to a receiving device (e.g., the transmitting device may transmit signaling on the physical carriers it uses, to reserve the channels, and a receiving device may detect energy or signaling on each of the channels used and implicitly understand that a lowest numbered one (or lowest frequency one) of the channels on which energy appears is mapped to a lowest numbered virtual carrier of a wireless data transmission).

FIG. 9C shows that certain physical carriers for which a CCA is successfully performed, such as physical carrier PhyCC_2, may be discarded as a result of poor channel strength (e.g., poor channel state information (CSI)). FIG. 9C also shows that CCA may not be performed for certain physical carriers, such as physical carrier PhyCC_4, because a transmitting device may prefer to try another physical carrier and/or obtain CSI for another physical carrier (e.g., physical carrier PhyCC_5).

Figure 9D:
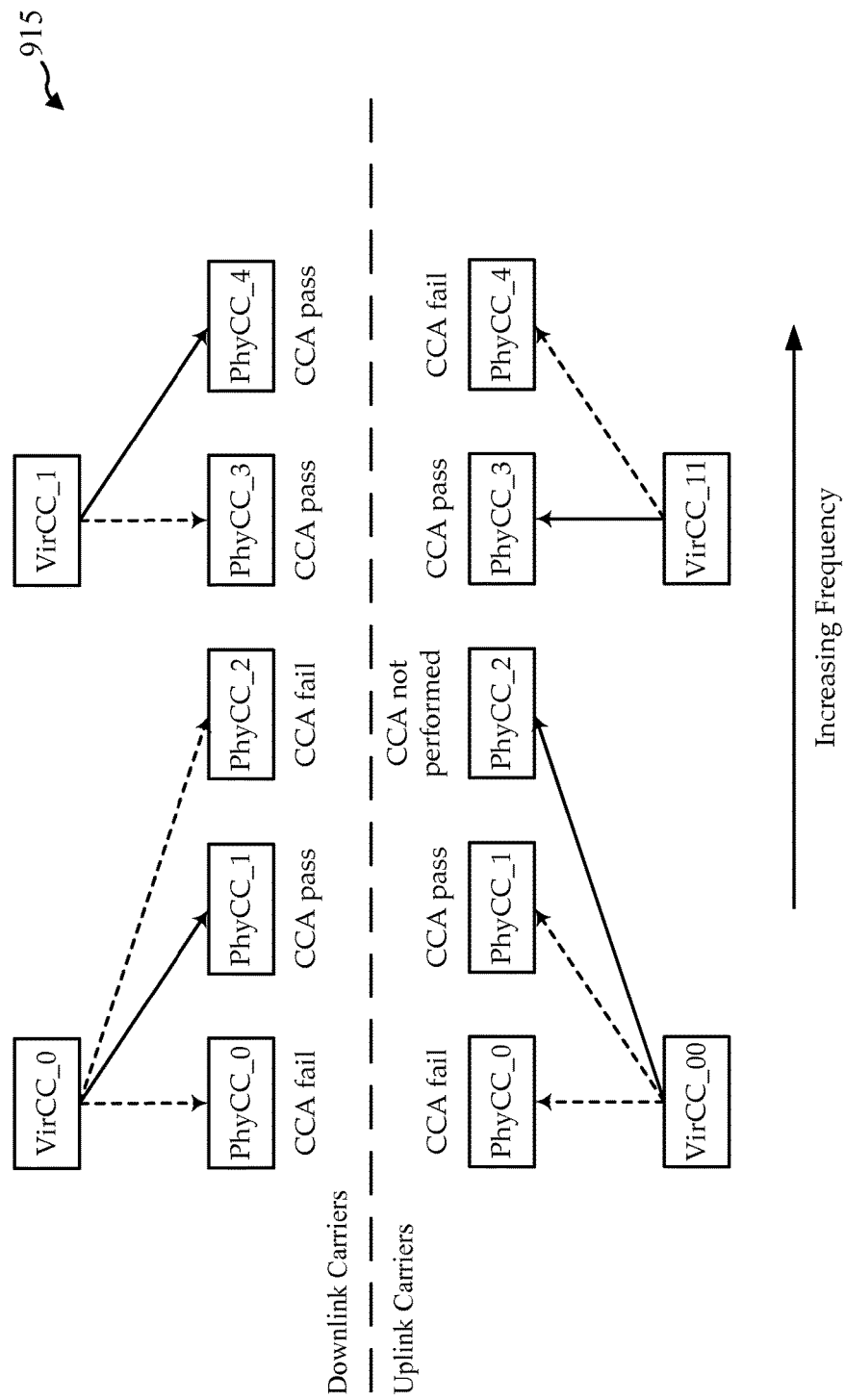

FIG. 9D shows a mapping 915 of two downlink virtual carriers (i.e., VirCC_0 and VirCC_1) to two physical carriers (i.e., PhyCC_1 and PhyCC_4), and two uplink virtual carriers (i.e., VirCC_00 and VirCC_11) to two physical carriers (i.e., PhyCC_2 and PhyCC_3), in a carrier aggregation mode of operation. Each of the downlink virtual carriers may be used for a downlink wireless data transmission by an eNB, such as a downlink wireless data transmission by one of the eNBs 105, 205, and/or 505 described with reference to FIGS. 1, 2A, 2B, and/or 5, and each of the uplink virtual carriers may be used for an uplink wireless data transmission by a UE, such as an uplink wireless data transmission by one of the UEs 115, 215, and/or 515 described with reference to FIGS. 1, 2A, 2B and/or 5.

The physical carriers (i.e., PhyCC_0, PhyCC_1, PhyCC_2, PhyCC_3, and PhyCC_4) to which the downlink virtual carriers and the uplink virtual carriers may be mapped may be grouped into non-overlapping subsets of physical carriers. For example, a first subset of physical carriers includes physical carriers PhyCC_0, PhyCC_1, and PhyCC_2. A second subset of physical carriers includes physical carriers PhyCC_3 and PhyCC_4. When an eNB desires to make a wireless data transmission requiring the two downlink virtual carriers, the eNB may perform a downlink CCA for each of the physical carriers in each of the subsets of physical carriers. Because the downlink CCA may be performed for a plurality of physical carriers in each subset of physical carriers, there may exist physical carriers to which the virtual carriers may be mapped despite the downlink CCA failing for one or more physical carriers.

After identifying the physical carrier to which a virtual carrier will be mapped in a given subset of physical carriers, the remaining physical carriers for which the downlink CCA passed may be identified to a UE. A UE may have a higher likelihood of successfully performing an uplink CCA for a physical carrier that has already cleared a downlink CCA. The use of non-overlapping subsets of physical carriers also removes ambiguity in pairings of downlink carriers and uplink carriers, and enables more flexibility in establishing downlink/uplink carrier ratios.

As shown in the examples of FIGS. 9A-9D, a carrier aggregation mode may be supported for a transmitting device by performing CCA on more physical carriers than the transmitting device intends to transmit, then mapping virtual carriers to physical carriers for which the CCA is successful. In certain systems, there may be a maximum number of total physical carriers on which the transmitting device may be configured to transmit at once. For example, in systems implementing certain releases of the LTE/LTE-A standards, carrier aggregation may be limited to five total physical carriers.

These limits on total physical carriers may be enforced by systems utilizing virtual carriers according to the principles of the present description. For example, a transmitting device implementing certain releases of LTE/LTE-A may limit the total number of virtual carriers used to transmit data over the shared spectrum to five. With a one-to-one mapping between virtual carriers and physical carriers, the transmitting device may therefore ensure that the total number of physical carriers used by the transmitting device for any given frame or subframe does not exceed limits on total physical carriers imposed by the standard, even though different physical carriers may be used during different frames.

Continuing the example of a transmitting device constrained to five total physical carriers during carrier aggregation, the transmitting device may be configured to perform CCA monitoring on N>5 physical carriers for each frame while utilizing K≤5 virtual carriers for carrier aggregation. If the number (M) of physical carriers for which the CCA assessment is successful is less than or equal to K, each of the M physical carriers may be selected for transmission during the frame and mapped to one of the virtual carriers. Otherwise, if M is greater than or equal to the K, then K of the successful physical carriers may be selected for use in that frame and mapped to individual virtual carriers.

The selection of the K physical carriers may be based on an RRC configuration. In one example, each of the physical carriers may have a numeric identifier, and the K physical carriers with the lowest identifiers may be selected for mapping to a virtual carrier. The identifiers assigned to the physical carriers may be different for different transmitting devices. Additionally or alternatively, the selection of the K physical carriers may be based on a token or identifier unique to the transmitting device (e.g., a UE ID) within the network. For example, the token or identifier specific to the transmitting device may be hashed to derive K physical carriers from the M CCA cleared physical carriers.

Figure 10A:
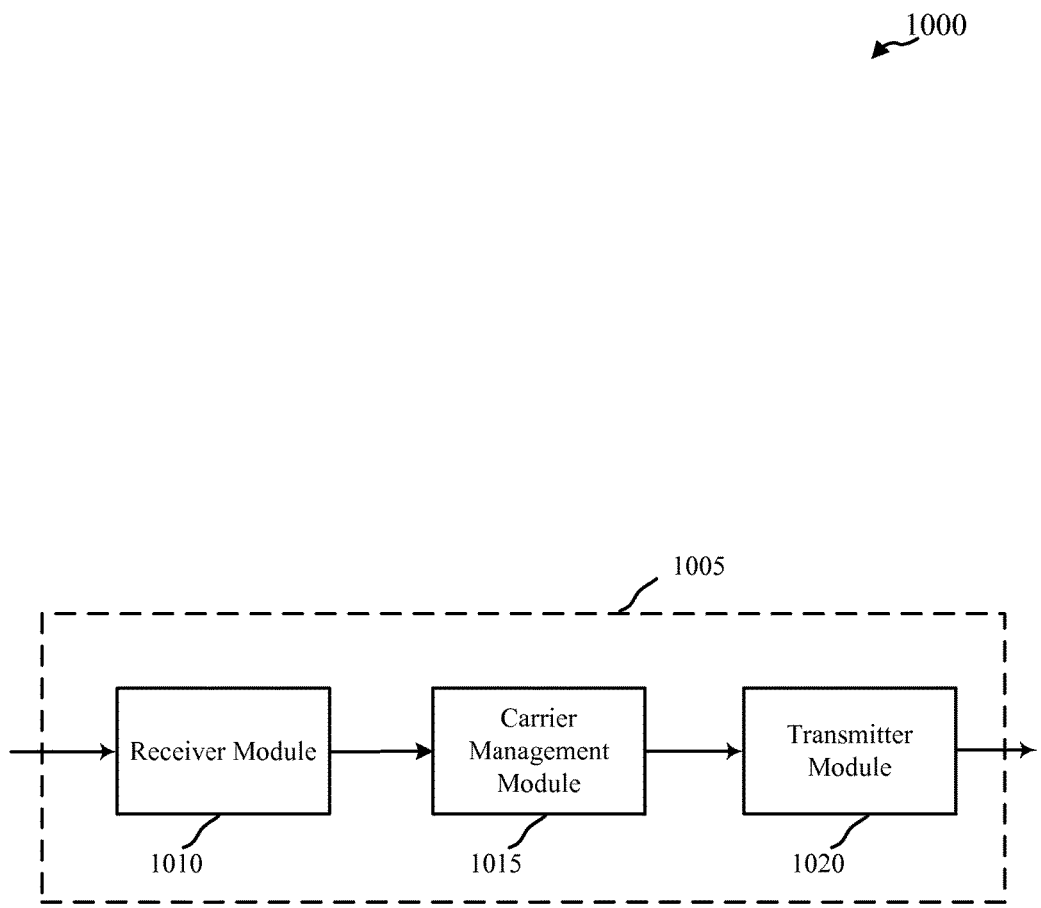
FIGS. 10A & 10B show block diagrams of examples of devices (e.g., eNBs or UEs) according to various embodiments.

Referring now to FIG. 10A, a block diagram 1000 illustrates a device 1005 for use in wireless communications in accordance with various embodiments. In some embodiments, the device 1005 may be an example of one or more aspects of one of the eNBs 105, 205, and/or 505 or UEs 115, 215, and/or 515 described with reference to FIGS. 1, 2A, 2B and/or 5. The device 1005 may also be a processor. The device 1005 may include a receiver module 1010, a carrier management module 1015, and/or a transmitter module 1020. Each of these components may be in communication with each other.

The components of the device 1005 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1010 may be or include a radio frequency (RF) receiver, such as an RF receiver operable to receive transmissions in a licensed spectrum (e.g., an LTE/LTE-A spectrum) and/or an unlicensed spectrum. The receiver module 1010 may be used to receive various types of data and/or control signals (i.e., transmissions) over one or more communication links (e.g., physical channels) of a wireless communications system including the licensed and/or unlicensed spectrums, such as one or more communication links of the wireless communications system 100, 200, and/or 250 described with reference to FIGS. 1, 2A, and/or 2B.

In some embodiments, the transmitter module 1020 may be or include an RF transmitter, such as an RF transmitter operable to transmit in the licensed spectrum and/or the unlicensed spectrum. The transmitter module 1020 may be used to transmit various types of data and/or control signals (i.e., transmissions) over one or more communication links (e.g., physical channels) of a wireless communications system, such as one or more communication links of the wireless communications system 100, 200, 250, and/or 500 described with reference to FIGS. 1, 2A, 2B, and/or 5.

In some embodiments, the carrier management module 1015 may be used to manage carriers for wireless data transmissions over a shared spectrum. Carrier management may in some cases involve performing a CCA for more physical channels than are needed to make a wireless data transmission, and then identifying a number of the physical channels for which CCA was successfully performed for use in making the wireless data transmission. In this manner, failure of a CCA for one or more physical channels may not prevent the wireless data transmission from being made.

Figure 10B:
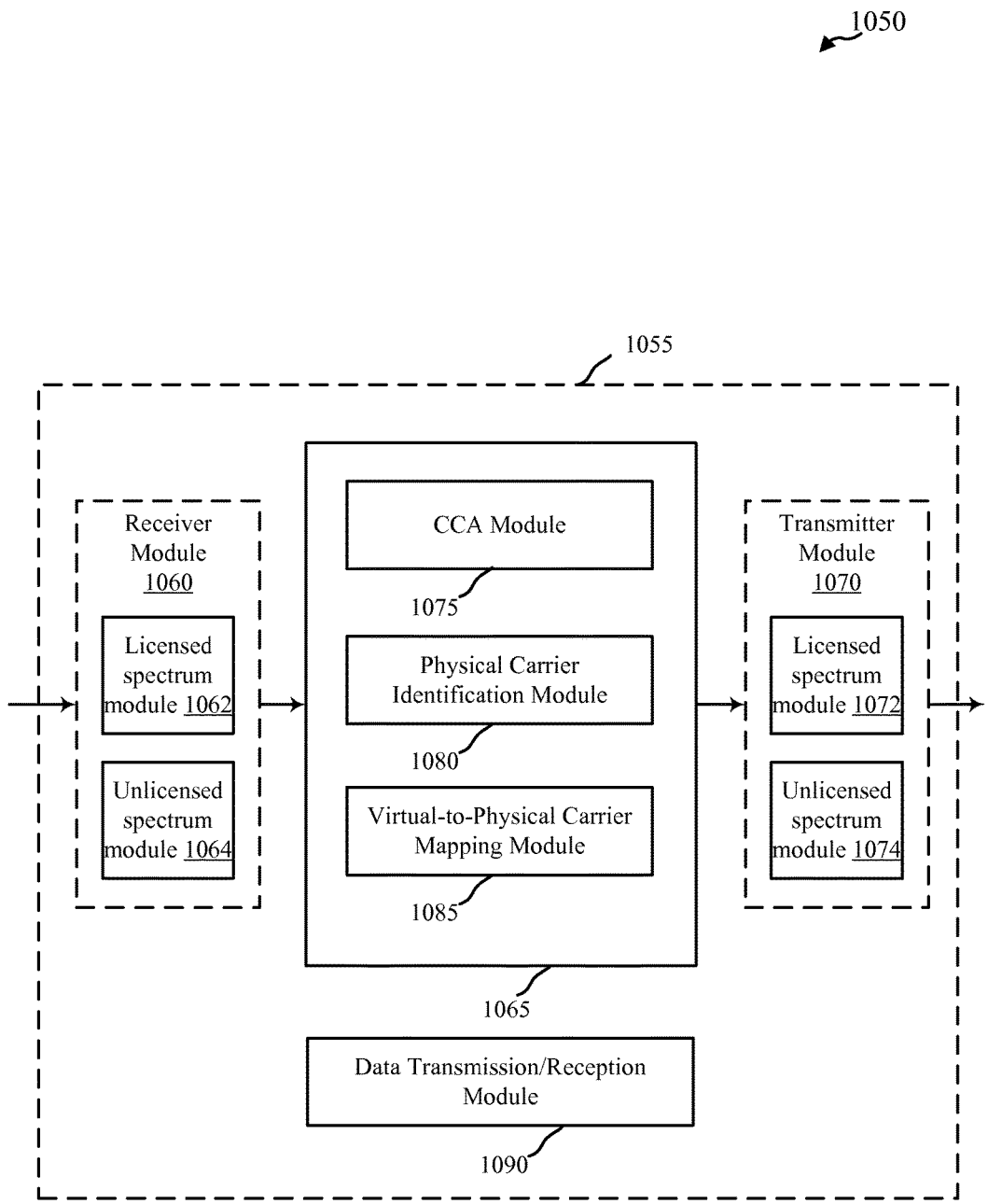

Referring now to FIG. 10B, a block diagram 1050 illustrates a device 1055 for use in wireless communications in accordance with various embodiments. In some embodiments, the device 1055 may be an example of one or more aspects of one of the eNBs 105, 205, and/or 505 or UEs 115, 215, and/or 515 described with reference to FIGS. 1, 2A, 2B and/or 5. The device 1055 may also be a processor. The device 1055 may include a receiver module 1060, a carrier management module 1065, a data transmission/reception module 1090, and/or a transmitter module 1070. Each of these components may be in communication with each other.

The components of the device 1055 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1060 may be or include an RF receiver, such as an RF receiver operable to receive transmissions in a licensed spectrum (e.g., an LTE/LTE-A spectrum) and/or an unlicensed spectrum. The RF receiver may include separate receivers for the licensed spectrum and the unlicensed spectrum. The separate receivers may in some cases take the form of a licensed spectrum module 1062 and an unlicensed spectrum module 1064. The receiver module 1060, including the licensed spectrum module 1062 and/or the unlicensed spectrum module 1064, may be used to receive various types of data and/or control signals (i.e., transmissions) over one or more communication links (e.g., physical carriers) of a wireless communications system including the licensed and unlicensed spectrums, such as one or more communication links of the wireless communications system 100, 200, 250, and/or 500 described with reference to FIGS. 1, 2A, 2B, and/or 5.

In some embodiments, the transmitter module 1070 may be or include an RF transmitter, such as an RF transmitter operable to transmit in the licensed spectrum and/or the unlicensed spectrum. The RF transmitter may include separate transmitters for the licensed spectrum and the unlicensed spectrum. The separate transmitters may in some cases take the form of a licensed spectrum module 1072 and an unlicensed spectrum module 1074. The transmitter module 1070, including the licensed spectrum module 1072 and/or the unlicensed spectrum module 1064, may be used to transmit various types of data and/or control signals (i.e., transmissions) over one or more communication links (e.g., physical carriers) of a wireless communications system, such as one or more communication links of the wireless communications system 100, 200, 250, and/or 500 described with reference to FIGS. 1, 2A, 2B, and/or 5.

In some embodiments, the carrier management module 1065 may be an example of one or more aspects of the carrier management module 1015 described with reference to FIG. 10A and may include a CCA module 1075, a physical carrier identification module 1080, and/or a virtual-to-physical carrier mapping module 1085.

In some embodiments, the CCA module may be used to perform a CCA on each of a plurality of physical carriers of a shared spectrum (e.g., an unlicensed spectrum). In some cases, a CCA may be performed for a particular transmission interval of the shared spectrum, and then repeated for each of a number of subsequent transmission intervals of the shared spectrum. In some cases, the transmission interval may include a radio frame, and the CCA may be performed on a frame-by-frame basis. In some cases, the CCA may be performed using one or more of the periodic gating intervals and associated frame or subframe structures described with reference to FIGS. 3, 4, 6, and/or 7. In some cases, the CCA may be performed for a plurality of the physical carriers described with reference to FIG. 8. In some cases, a wireless data transmission may be subsequently made, during a transmission interval, over some or all of the physical carriers for which a CCA was successfully performed for the transmission interval.

In some embodiments, the physical carrier identification module 1080 may be used to identify, from a plurality of physical carriers associated with a CCA performed by the device 1055, a number of the physical carriers for which the CCA was successful.

In some embodiments, the virtual-to-physical carrier mapping module 1085 may be used to map a number of virtual carriers associated with a wireless data transmission to the identified number of physical carriers for which the CCA was successful. The virtual carriers may be mapped to the physical carriers for the purpose of transmitting data or receiving data from/at the device 1055.

In some embodiments, the data transmission/reception module 1090 may be used to make or receive a wireless data transmission using the transmitter module 1070 or receiver module 1060. The wireless data transmission may be made or received using a number of virtual carriers associated with the wireless data transmission and a virtual-to-physical carrier mapping.

Figure 11:
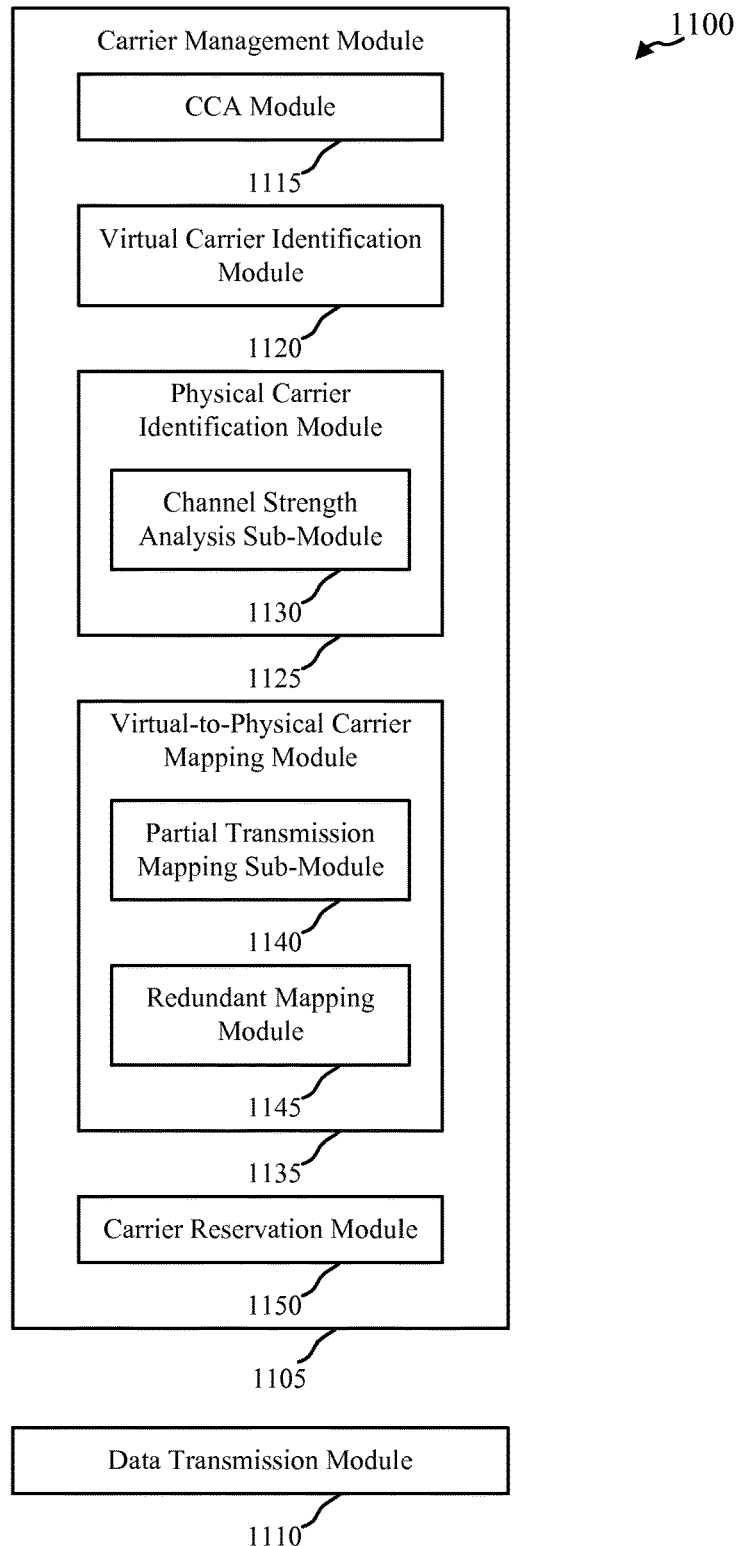
FIG. 11 shows a block diagram of an example of a carrier management module usable in a transmitting device according to various embodiments.

Referring now to FIG. 11, a block diagram 1100 illustrates one embodiment of a carrier management module 1105 and a data transmission module 1110 usable for transmitting data in accordance with various embodiments. The carrier management module 1105 may be an example of one or more aspects of the carrier management module 1015 and/or 1065 described with reference to FIGS. 10A and/or 10B. The data transmission module 1110 may be an example of one or more aspects of the data transmission/reception module 1090 described with reference to FIG. 10B. The carrier management module 1105 may include a CCA module 1115, a virtual carrier identification module 1120, a physical carrier identification module 1125, a virtual-to-physical carrier mapping module 1135, and/or a carrier reservation module 1150.

The components of the carrier management module 1105 and data transmission module 1110 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the CCA module 1115 may be an example of one or more aspects of the CCA module 1075 described with reference to FIG. 10B.

In some embodiments, the virtual carrier identification module 1120 may be used to identify a number of virtual carriers associated with a wireless data transmission. In some cases, the virtual carrier identification module 1120 may also determine the number of virtual carriers. For example, the virtual carrier identification module 1120 may determine a bandwidth that is to be used for the wireless data transmission, and then divide the bandwidth to be used for the wireless data transmission by a bandwidth allotted to each of a number of physical carriers.

In some embodiments, the physical carrier identification module 1125 may be an example of one or more aspects of the physical carrier identification module 1080 described with reference to FIG. 10B. The physical carrier identification module 1125 may be used to select a plurality of physical carriers for which a CCA may be performed by the CCA module 1115. The physical carrier identification module 1125 may select the plurality of physical carriers based on a number of virtual carriers identified by the virtual carrier identification module 1120. The number of physical carriers selected by the physical carrier identification module 1125 may be a number of physical carriers that is greater than the number of virtual carriers identified by the virtual carrier identification module 1120.

In some cases, the plurality of physical carriers may be selected by the physical carrier identification module 1125 based on channel strength measurements (e.g., one or more of the physical carriers may be selected because it is associated with a channel strength above a threshold). In this regard, the physical carrier identification module 1125 may include a channel strength analysis sub-module 1130. The channel strength analysis sub-module 1130 may analyze various parameters related to channel strength. The analyses of the channel strength analysis sub-module 1130 may then be used by the physical carrier identification module 1125 to select some or all of the plurality of physical carriers. In some cases, the plurality of physical carriers may be selected based on an age of channel strength measurements for at least a portion of the plurality of physical carriers (e.g., one or more of the plurality of physical carriers may be selected because it is associated with a more recent, and likely more reliable, channel strength measurement, and/or one or more of the plurality of physical carriers may be selected because it is associated with an older channel strength measurement and an updated channel strength measurement is desired). In some cases, the plurality of physical carriers may be selected based on a determination of whether the physical carriers are capable of supporting at least one of: a modulation and coding scheme (MCS) associated with the wireless data transmission, a rank associated with the wireless data transmission (e.g., with a MIMO transmission), or a transport block size associated with the wireless data transmission.

The physical carrier identification module 1125 may also be used to identify, from a plurality of physical carriers associated with a CCA performed by the CCA module 1115, a number of the physical carriers for which the CCA was successful. The subset may include one or more or all of the physical carriers on which the CCA was performed.

In some embodiments, the virtual-to-physical carrier mapping module 1135 may be an example of one or more aspects of the virtual-to-physical carrier mapping module 1085 described with reference to FIG. 10B. The virtual-to-physical carrier mapping module 1135 may be used to map a number of virtual carriers associated with a wireless data transmission (as determined by the virtual carrier identification module 1120) to the identified number of physical carriers for which the CCA was successful (as determined by the physical carrier identification module 1125). The virtual carriers may be mapped to the physical carriers for the purpose of transmitting data.

In some cases, the virtual-to-physical carrier mapping module 1135 may determine whether a bandwidth of a subset of physical carriers for which CCA was successful is greater than or equal to a bandwidth of a wireless data transmission. In some cases, this determination may be made by comparing a number of virtual carriers identified by the virtual carrier identification module 1120 to a number of physical carriers in a subset of physical carriers for which a CCA was successful (as identified by the physical carrier identification module 1125).

When the virtual-to-physical carrier mapping module 1135 determines that the bandwidth of a subset of physical carriers for which a CCA was successful is greater than or equal to the bandwidth of a wireless data transmission, the virtual-to-physical carrier mapping module 1135 may map each of a number of virtual carriers associated with the wireless data transmission to a physical carrier of the subset of physical carriers. The mapping may be carried out using a predetermined mapping scheme shared by transmitting and receiving devices.

When the virtual-to-physical carrier mapping module 1135 determines that the bandwidth of a subset of physical carriers for which a CCA was successful is less than the bandwidth of a wireless data transmission, the partial transmission mapping sub-module 1140 may determine whether the bandwidth of the subset of physical carriers for which the CCA was successful is greater than or equal to a bandwidth of at least one virtual carrier associated with the wireless data transmission (e.g., the bandwidth of a primary virtual carrier). In some cases, this determination may be made by determining whether the number of physical carriers in the subset of physical carriers for which the CCA was successful is greater than or equal to one. When the bandwidth of the subset of physical carriers for which the CCA was successful is greater than or equal to a bandwidth of at least one virtual carrier associated with the wireless data transmission, the partial transmission mapping sub-module 1140 may map each of at least one virtual carrier associated with the wireless data transmission to a respective physical carrier of the subset of physical carriers. However, the partial transmission mapping sub-module 1140 may refrain from mapping at least one other virtual carrier to a physical carrier of the subset of physical carriers. The mapping may be carried out using a predetermined mapping scheme shared by a transmitting and receiving devices. In some cases, a determination to refrain from mapping a particular virtual carrier (or carriers) to a physical carrier of the subset of physical carriers may be based on a priority of the unmapped virtual carrier with respect to a priority of the mapped virtual carrier(s). For example, in some cases, a primary virtual carrier may be mapped to a respective physical carrier before any other virtual carrier is mapped to a respective physical carrier.

The virtual-to-physical carrier mapping module 1135 may in some cases include a redundant mapping sub-module 1145. When the virtual-to-physical carrier mapping module 1135 determines that the number of physical carriers for which a CCA was successful is greater than a number of virtual carriers, the redundant mapping sub-module 1145 may in some cases be used to map each of a number of virtual carriers to multiple physical carriers (e.g., one virtual carrier may be mapped to multiple physical carriers, or one virtual carrier may be mapped to a first set of multiple physical carriers and another virtual carrier may be mapped to a second set of multiple physical carriers, etc.).

In some embodiments, the carrier reservation module 1150 may be used to reserve a number of physical carriers that will be used for a wireless data transmission. For example, the carrier reservation module 1150 may in some cases transmit a channel usage beacon signal (CUBS) or cell-specific reference signal (CRS) for each of the physical carriers that will be used for a wireless data transmission. The CUBS or CRS may then be received by other potential transmitting devices, and may alert the other potential transmitting devices that the channels on which the CUBS or CRS are transmitted are reserved.

In some embodiments, the data transmission module 1110 may be an example of one or more aspects of the data transmission/reception module 1090 described with reference to FIG. 10B. The data transmission module 1110 may be used to make a wireless data transmission. The wireless data transmission may be made using a number of virtual carriers associated with the wireless data transmission and a virtual-to-physical carrier mapping. In some cases, the wireless data transmission may be prepared for transmission by, for each virtual carrier, inserting an identifier associated with the virtual carrier in a carrier identification field (CIF) of a physical carrier to which the virtual carrier is mapped.

Figure 12:
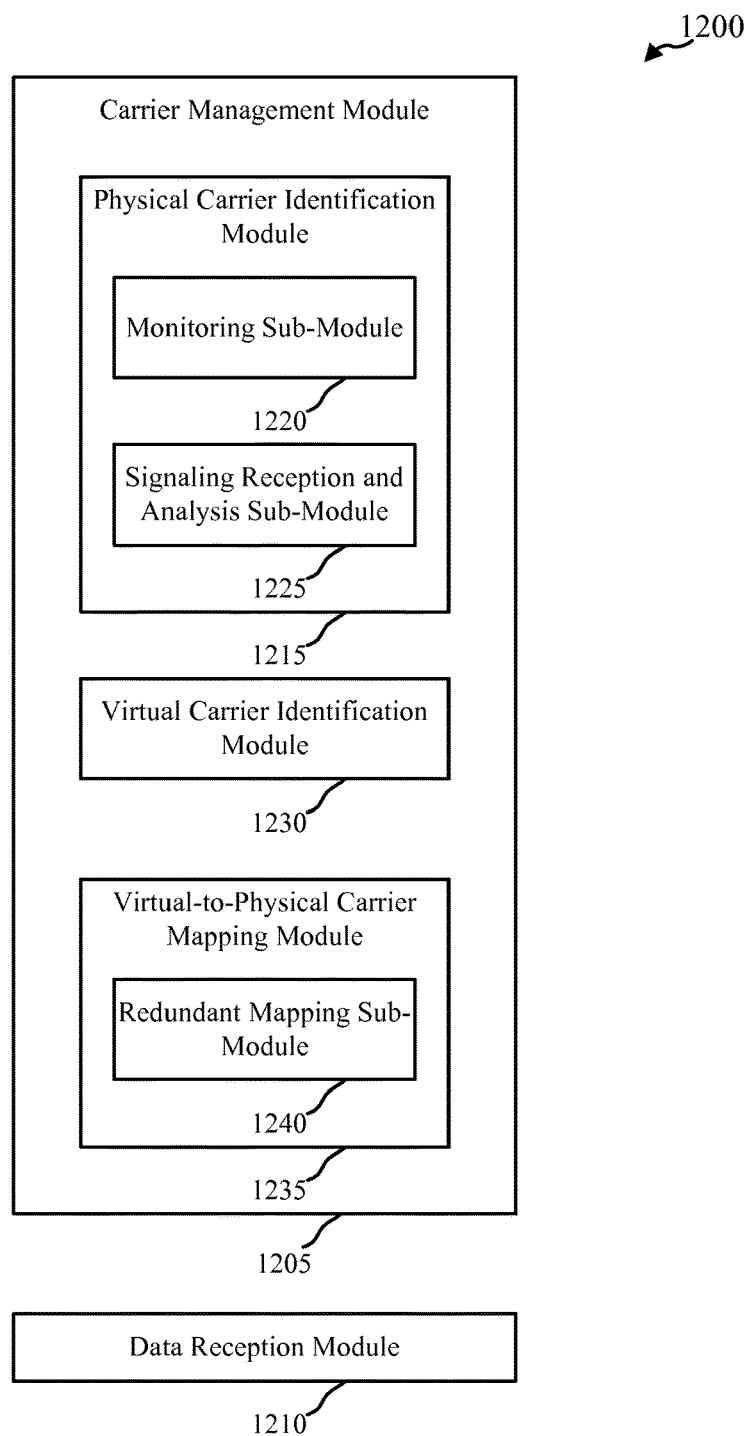
FIG. 12 shows a block diagram of an example of a carrier management module and a data reception module usable for a receiving device according to various embodiments.

Referring now to FIG. 12, a block diagram 1200 illustrates one embodiment of a carrier management module 1205 and a data reception module 1210 usable for receiving data according to various embodiments. The carrier management module 1205 may be an example of one or more aspects of the carrier management module 1015 and/or 1065 described with reference to FIGS. 10A and/or 10B. The data reception module 1210 may be an example of one or more aspects of the data transmission/reception module 1090 described with reference to FIG. 10B. The carrier management module 1205 may include a physical carrier identification module 1215, a virtual carrier identification module 1230, and/or a virtual-to-physical carrier mapping module 1235.

The components of the carrier management module 1205 and data reception module 1210 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the physical carrier identification module 1215 may be an example of one or more aspects of the physical carrier identification module 1080 described with reference to FIG. 10B. The physical carrier identification module 1215 may be used to identify, from a plurality of physical carriers associated with a CCA performed by a transmitting device, a number of the physical carriers for which the CCA was successful. The subset of physical carriers may be identified based on signaling received from the transmitting device. For example, the presence of signaling on a monitored one of the physical carriers may indicate that the transmitting device successfully performed a CCA for the monitored one of the physical carriers. The physical carrier identification module 1215 may in some cases include a monitoring sub-module 1220 for monitoring a plurality of physical carriers for signaling, prior to receiving a wireless data transmission during a particular transmission interval. The physical carrier identification module 1215 may also include a signaling reception and analysis sub-module 1225 for analyzing received signaling. In some cases, the received signaling may include CUBS and/or a CRS.

In some embodiments, the virtual carrier identification module 1230 may be used to identify a number of virtual carriers associated with a wireless data transmission. In some cases, the virtual carrier identification module 1230 may determine the number of virtual carriers based on a number of physical carriers on which signaling is detected by the monitoring sub-module 1220.

In some embodiments, the virtual-to-physical carrier mapping module 1235 may be an example of one or more aspects of the virtual-to-physical carrier mapping module 1085 described with reference to FIG. 10B. The virtual-to-physical carrier mapping module 1235 may be used to map a number of virtual carriers associated with a wireless data transmission (as determined by the virtual carrier identification module 1230) to the identified number of physical carriers for which the CCA was successful (as determined by the physical carrier identification module 1215). The virtual carriers may be mapped to the physical carriers for the purpose of receiving data.

In some embodiments, the virtual-to-physical carrier mapping module 1235 may include a redundant mapping module 1240 for mapping virtual carriers to redundant physical carriers.

In some embodiments, the data reception module 1210 may be an example of one or more aspects of the data transmission/reception module 1090 described with reference to FIG. 10B. The data reception module 1210 may be used to receive a wireless data transmission. The wireless data transmission may be received using a number of virtual carriers associated with the wireless data transmission and a virtual-to-physical carrier mapping.

Figure 13:
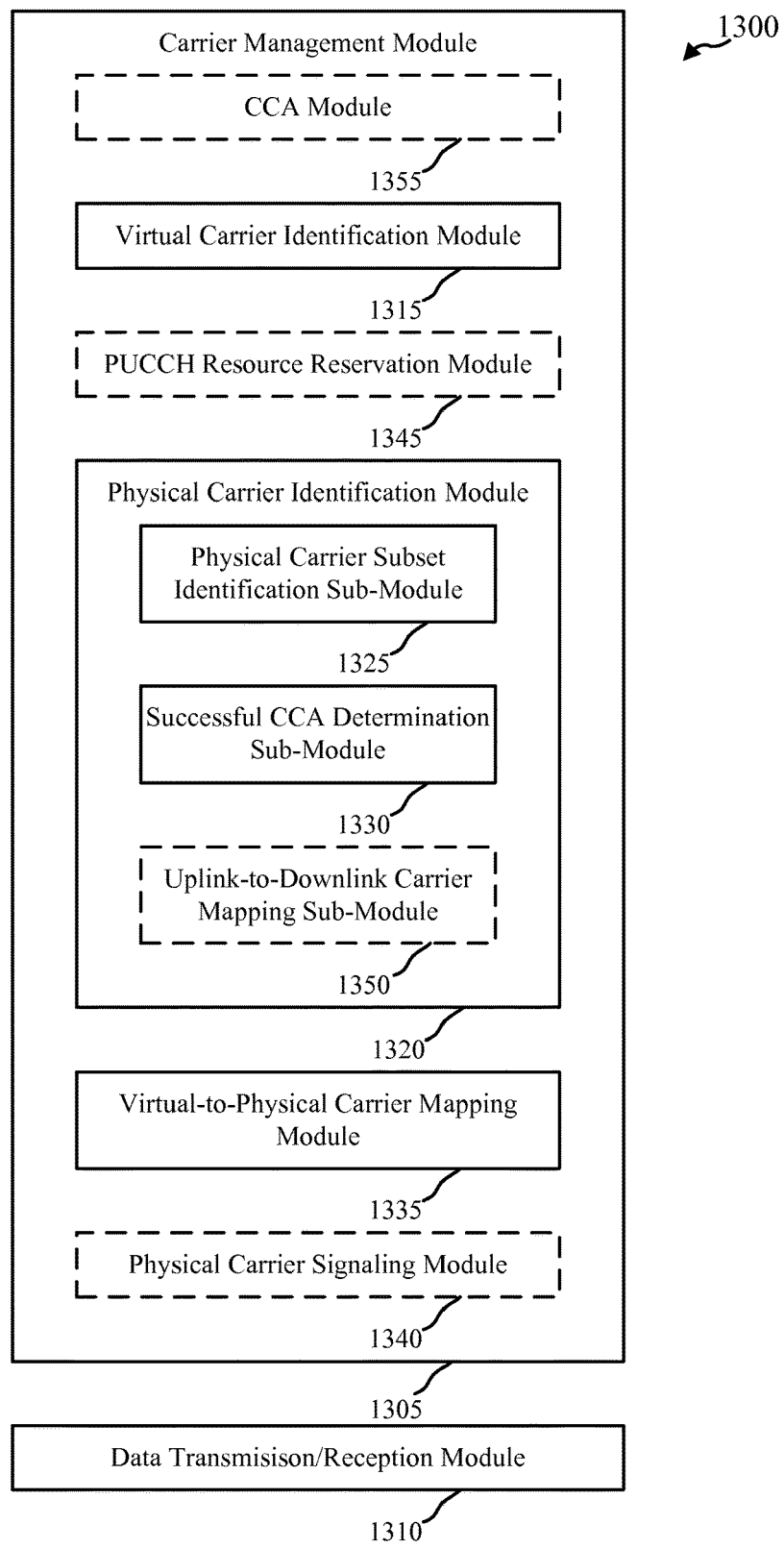
FIG. 13 shows a block diagram of an example of a carrier management module and a data transmission/reception module usable for transmitting and/or receiving data (depending on its configuration) according to various embodiments.

Referring now to FIG. 13, a block diagram 1300 illustrates an embodiment of a carrier management module 1305 and a data transmission/reception module 1310 usable for transmitting and/or receiving data (depending on its configuration) according to various embodiments. The carrier management module 1305 may be an example of one or more aspects of the carrier management module 1015 and/or 1065 described with reference to FIGS. 10A and/or 10B. The data transmission/reception module 1310 may be an example of one or more aspects of the data transmission/reception module 1090 described with reference to FIG. 10B. The carrier management module 1305 may include a virtual carrier identification module 1315, a physical carrier identification module 1320, and/or a virtual-to-physical carrier mapping module 1335. The carrier management module 1305 may also include, in some embodiments, a CCA module 1355, a physical uplink control channel (PUCCH) resource reservation module 1345, and/or a physical carrier signaling module 1340.

The components of the carrier management module 1305 and the data transmission/reception module 1310 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the CCA module 1115 may be an example of one or more aspects of the CCA module 1075 described with reference to FIG. 10B.

In some embodiments, the virtual carrier identification module 1315 may be used to identify or determine a number of virtual carriers (e.g., one or a plurality of virtual carriers) associated with a wireless data transmission.

In certain embodiments in which the device incorporating the carrier management module 1305 is a UE, the PUCCH resource reservation module 1345 may be used to reserve resources for a PUCCH on each virtual carrier associated with an uplink wireless data transmission. By way of example, the resources may in some cases include resources for a scheduling request (SR), resources for acknowledgements and non-acknowledgements (ACKs/NACKs) of received transmissions, and resources for periodic channel quality information (CQI) reports)). In some cases, a physical uplink shared channel (PUSCH) may not be transmitted over the reserved resources, regardless of whether the reserved resources are used for transmitting a PUCCH. In some cases, the reserved resources may include interlaced resource blocks.

In some embodiments, the physical carrier identification module 1320 may be an example of one or more aspects of the physical carrier identification module 1080 described with reference to FIG. 10B. The physical carrier identification module 1320 may include a physical carrier subset identification sub-module 1325, a successful CCA determination sub-module 1330, and/or an uplink-to-downlink carrier mapping sub-module 1350. The physical carrier subset identification sub-module 1325 may be used, in some examples, to identify a subset of physical carriers corresponding to a virtual carrier of a wireless data transmission. The physical carrier subset identification sub-module 1325 may be used, in some examples, to identify a plurality of non-overlapping subsets of physical carriers. Each of the non-overlapping subsets of physical carriers may correspond to a respective one of a plurality of virtual carriers associated with the wireless data transmission by the first device. In some cases, the physical carrier subset identification sub-module 1325 may identify a subset of physical carriers corresponding to a virtual carrier based at least in part on RRC signaling identifying the subset of physical carriers corresponding to the virtual carrier.

In some embodiments, the successful CCA determination sub-module 1330 may be used to identify physical carriers for which a CCA performed by a device (e.g., the device including the carrier management module 1305 and/or another device) was successful. In some cases, the successful CCA determination sub-module 1330 may be used to determine whether a CCA performed by a device was successful for at least one physical carrier in a subset of physical carriers (or to determine, for each of a plurality of non-overlapping subsets of physical carriers, whether the CCA performed by the device was successful for at least one physical carrier in each of a plurality of non-overlapping subsets).

In some embodiments, the uplink-to-downlink carrier mapping sub-module 1350 may be used to identify at least one physical carrier, in a subset of physical carriers corresponding to a downlink virtual carrier, which have not been mapped to the downlink virtual carrier, but for which CCA has been successfully performed by an eNB. The uplink-to-downlink carrier mapping sub-module 1350 may identify each such physical carrier (or at least one of the physical carriers) as a candidate physical carrier for mapping to an uplink virtual carrier associated with an uplink wireless data transmission by a UE.

In some embodiments, the virtual-to-physical carrier mapping module 1335 may be an example of one or more aspects of the virtual-to-physical carrier mapping module 1085 described with reference to FIG. 10B. The virtual-to-physical carrier mapping module 1335 may be used to map a number of virtual carriers associated with a wireless data transmission to a number of physical carriers. In some embodiments, each virtual carrier may be mapped to at least one physical carrier (if available) in a respective one of a plurality of non-overlapping subsets of physical carriers. The available physical carriers to which the virtual carriers are mapped may be physical carriers for which CCA has been successfully performed. If CCA is not successfully performed for any physical carrier in a subset of physical carriers, the virtual carrier corresponding to the subset of physical carriers may not be mapped to a physical carrier.

In some embodiments, and for one or more subsets of physical carriers, the physical carrier signaling module 1340 may be used to identify at least one physical carrier in the subset of physical carriers, which physical carrier has not been mapped to a virtual carrier, and for which physical carrier a successful CCA has been performed. For any such physical carriers, the physical carrier signaling module 1340 may transmit or receive a signal over such physical carrier. When the carrier management module 1305 is included in an eNB, for example, the signal transmitted over each of the physical carriers identified by the physical carrier signaling module 1340 may include a CUBS and/or a CSI-RS, or the signal received over each of the physical carriers identified by the physical carrier signaling module 1340 may include an SRS and/or a CET (including a CET including an SRS). When the carrier management module 1305 is included in a UE, for example, the signal transmitted over each of the physical carriers identified by the physical carrier signaling module 1340 may include an SRS and/or a CET (including a CET including an SRS), or the signal received over each of the physical carriers identified by the physical carrier signaling module 1340 may include a CUBS and/or a CSI-RS. A CET may also be transmitted (in the case of a UE) and/or received (in the case of an eNB) over any physical carrier, and in some cases each physical carrier (or each physical carrier not mapped to a virtual carrier), regardless of whether CCA is successfully performed for the physical carrier.

In embodiments in which the carrier management module 1305 may be included in a UE, the physical carrier signaling module 1340 may be used to identify at least one additional physical carrier of a subset of physical carriers, other than a physical carrier to which a downlink virtual carrier is mapped and for which a CCA was successfully performed by an eNB. The UE including the carrier management module 1305 may then transmit channel quality information (CQI) to the eNB for each of the identified physical carriers.

In some embodiments, the data transmission/reception module 1310 may be an example of the data transmission/reception module 1090 described with reference to FIG. 10B. In certain embodiments in which the device incorporating the carrier management module 1305 is a UE, the data transmission/reception module may be used to transmit a PUCCH over one of a number of virtual carriers that is mapped to a physical carrier for which CCA has been successfully performed. In some embodiments, each of a plurality of virtual carriers may be associated with an index, and the PUCCH may be transmitted over one of the virtual carriers having a lowest index. In other embodiments, the virtual carrier over which the PUCCH is transmitted may be randomly selected (e.g., pseudo-randomly selected). The random selection may be based at least in part on an index generated by a random number generator, which random number generator may in some cases be initialized by RRC signaling. The virtual carrier used to transmit the PUCCH may change from frame to frame.

Figure 14:
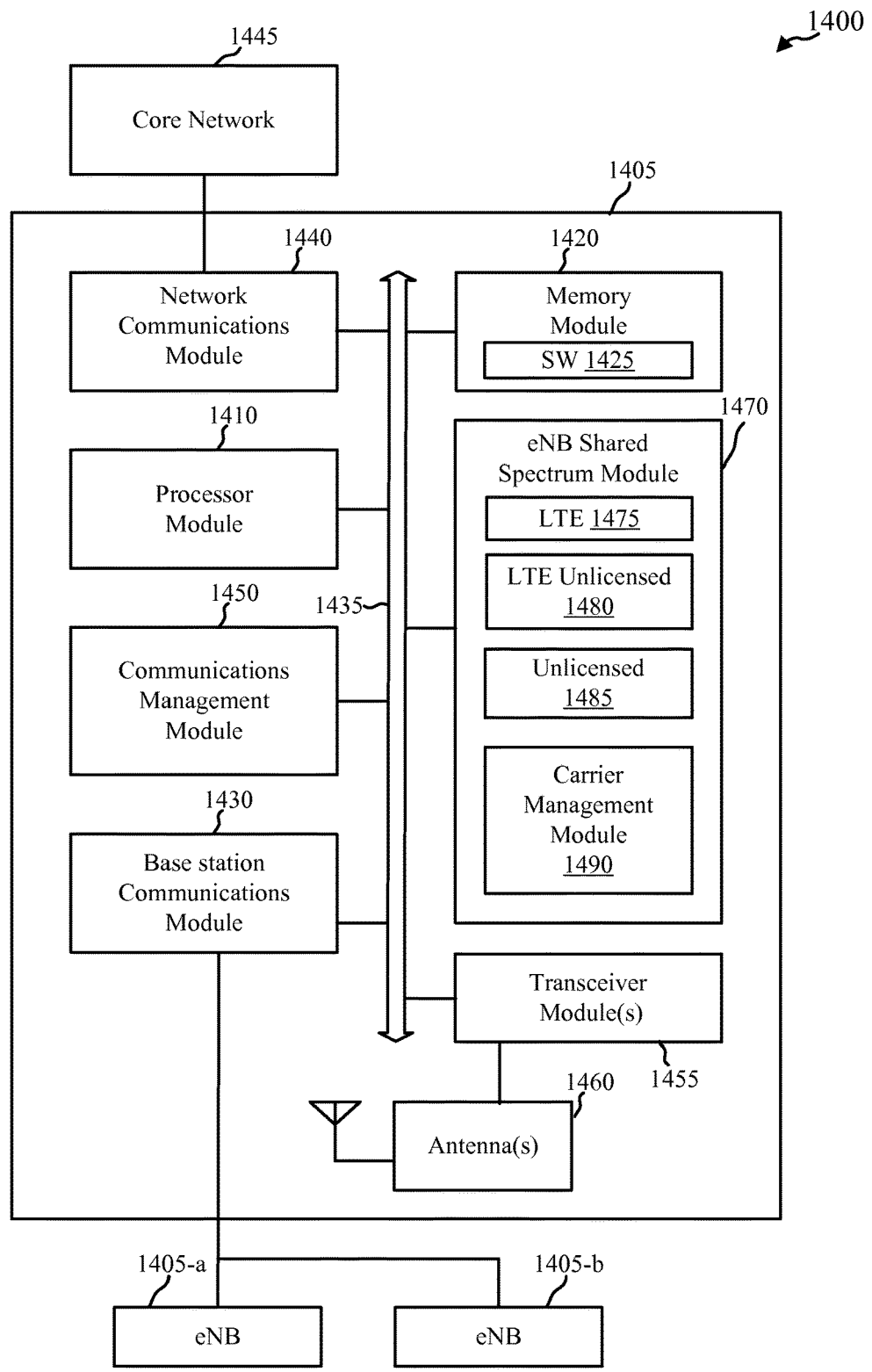
FIG. 14 shows a block diagram of an eNB according to various embodiments.

Turning to FIG. 14, a block diagram 1400 is shown that illustrates an eNB 1405 configured for wireless communications over a shared spectrum. In some embodiments, the eNB 1405 may be an example of one or more aspects of one of the devices 1005 and/or 1055 described with reference to FIGS. 10A and/or 10B, and/or one of the eNBs 105, 205, 505, and/or 505 described with reference to FIGS. 1, 2A, 2B, and/or 5. The eNB 1405 may be configured to implement at least some of the features and functions described with reference to FIGS. 1, 2A, 2B, 3, 4A, 4B, 5, 6, 7, 8, 9A-9D, 10A, 10B, 11, 12, and/or 13. The eNB 1405 may include a processor module 1410, a memory module 1420, at least one transceiver module (represented by transceiver module(s) 1455), at least one antenna (represented by antenna(s) 1460), and/or an eNB shared spectrum module 1470. The eNB 1405 may also include one or both of a base station communications module 1430 and a network communications module 1440. Each of these components may be in communication with each other, directly or indirectly, over one or more buses 1435.

The memory module 1420 may include random access memory (RAM) and/or read-only memory (ROM). The memory module 1420 may store computer-readable, computer-executable software (SW) code 1425 containing instructions that are configured to, when executed, cause the processor module 1410 to perform various functions described herein for managing carriers (e.g., both virtual and physical carriers) for wireless data transmissions in a shared spectrum. Alternatively, the software code 1425 may not be directly executable by the processor module 1410 but be configured to cause the eNB 1405, e.g., when compiled and executed, to perform various of the functions described herein.

The processor module 1410 may include an intelligent hardware device, e.g., a central processing unit (CPU), a microcontroller, an ASIC, etc. The processor module 1410 may process information received through the transceiver module(s) 1455, the base station communications module 1430, and/or the network communications module 1440. The processor module 1410 may also process information to be sent to the transceiver module(s) 1455 for transmission through the antenna(s) 1460, to the base station communications module 1430 for transmission to one or more other base stations or eNBs 1405-a and 1405-b, and/or to the network communications module 1440 for transmission to a core network 1445, which may be an example of aspects of the core network 130 described with reference to FIG. 1. The processor module 1410 may handle, alone or in connection with the eNB shared spectrum module 1470, various aspects of managing carriers (e.g., both virtual and physical carriers) for wireless data transmissions in a shared spectrum.

The transceiver module(s) 1455 may include a modem configured to modulate packets and provide the modulated packets to the antenna(s) 1460 for transmission, and to demodulate packets received from the antenna(s) 1460. The transceiver module(s) 1455 may in some cases be implemented as one or more transmitter modules and one or more separate receiver modules. The transceiver module(s) 1455 may support communications in a shared spectrum, such as a shared licensed spectrum (e.g., an LTE spectrum) and/or a shared unlicensed spectrum. The transceiver module(s) 1455 may be configured to communicate bi-directionally, via the antenna(s) 1460, with one or more of the UEs or devices 115, 215, and/or 315 described with reference to FIGS. 1, 2A, 2B, and/or 3, for example. The eNB 1405 may typically include multiple antennas 1460 (e.g., an antenna array). The eNB 1405 may communicate with the core network 1445 through the network communications module 1440. The eNB 1405 may communicate with other base stations or eNBs, such as the eNBs 1405-a and 1405-b, using the base station communications module 1430.

According to the architecture of FIG. 14, the eNB 1405 may further include a communications management module 1450. The communications management module 1450 may manage communications with other base stations, eNBs, and/or devices. The communications management module 1450 may be in communication with some or all of the other components of the eNB 1405 via the bus or buses 1435. Alternatively, functionality of the communications management module 1450 may be implemented as a component of the transceiver module(s) 1455, as a computer program product, and/or as one or more controller elements of the processor module 1410.

The eNB shared spectrum module 1470 may be configured to perform and/or control some or all of the features and/or functions described with reference to FIGS. 1, 2A, 2B, 3, 4A, 4B, 5, 6, 7, 8, 9A-9D, 10A, 10B, 11, 12, and/or 13 related to wireless communications in a shared spectrum. For example, the eNB shared spectrum module 1470 may be configured to support wireless communications in a licensed spectrum (e.g., an LTE spectrum) and/or a supplemental downlink mode, a carrier aggregation mode, and/or a stand-alone mode in an unlicensed or shared spectrum. The eNB shared spectrum module 1470 may include an LTE module 1475 configured to handle LTE communications, an LTE unlicensed module 1480 configured to handle LTE/LTE-A communications in an unlicensed or shared spectrum, and/or an unlicensed module 1485 configured to handle communications other than LTE/LTE-A in an unlicensed spectrum. The eNB shared spectrum module 1470 may also include a carrier management module 1490 configured to perform, for example, any of the eNB functions described with reference to FIGS. 1, 2, 3, 4A, 4B, 5, 6, 7, 8, 9A-9D, 10A, 10B, 11, 12, and/or 13 for managing carriers (e.g., both virtual and physical carriers) for wireless data transmissions in a shared spectrum. The carrier management module 1490 may be an example of similar modules (e.g., module 1015, 1065, 1105, 1205, and/or 1305) described with reference to FIGS. 10A, 10B, 11, 12, and/or 13. The eNB shared spectrum module 1470, or portions of it, may include a processor, and/or some or all of the functionality of the eNB shared spectrum module 1470 may be performed by the processor module 1410 and/or in connection with the processor module 1410.

Figure 15:
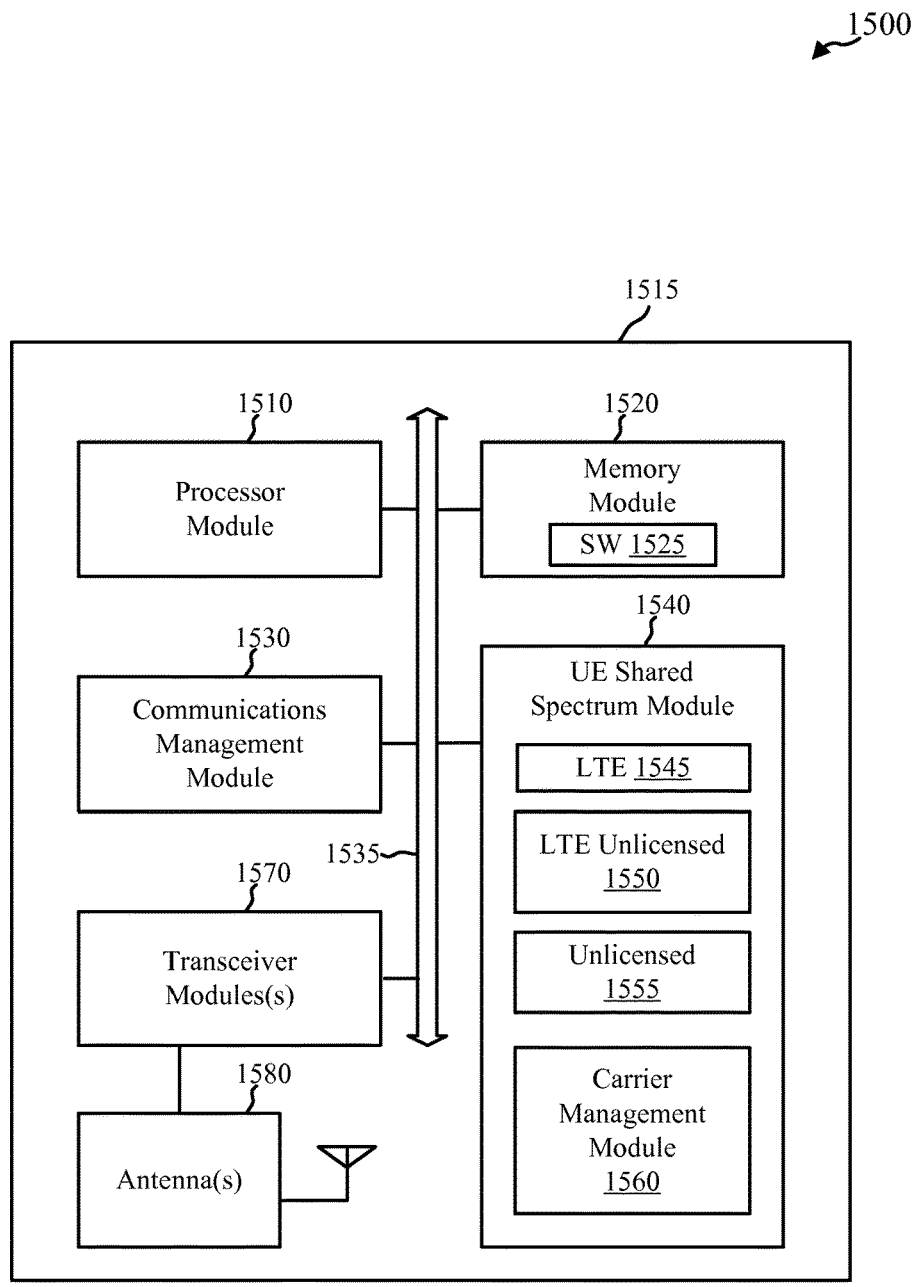
FIG. 15 shows a block diagram of a UE according to various embodiments.

Turning to FIG. 15, a block diagram 1500 is shown that illustrates a UE 1515 configured for wireless communications over a shared spectrum. The UE 1515 may have various other configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 1515 may in some cases have an internal power supply (not shown), such as a small battery, to facilitate mobile operation. In some embodiments, the UE 1515 may be an example of one or more aspects of one of the device 1005 and/or 1055 described with reference to FIGS. 10A and/or 10B, and/or one of the UEs 115, 215, and/or 515 described with reference to FIGS. 1, 2A, 2B, and/or 5. The UE 1515 may be configured to implement at least some of the features and functions described with reference to FIGS. 1, 2A, 2B, 3, 4A, 4B, 5, 6, 7, 8, 9A-9D, 10A, 10B, 11, 12, and/or 13. The UE 1515 may also be configured to communicate with one or more of the eNBs or devices 105, 205, 505, 535, 1005, 1055, and/or 1405 described with reference to FIGS. 1, 2A, 2B, 5, 10A, 10B, and/or 14.

The UE 1515 may include a processor module 1510, a memory module 1520, at least one transceiver module (represented by transceiver module(s) 1570), at least one antenna (represented by antenna(s) 1580), and/or a UE shared spectrum module 1540. Each of these components may be in communication with each other, directly or indirectly, over one or more buses 1535.

The memory module 1520 may include RAM and/or ROM. The memory module 1520 may store computer-readable, computer-executable software (SW) code 1525 containing instructions that are configured to, when executed, cause the processor module 1510 to perform various functions described herein for managing carriers (e.g., both virtual and physical carriers) for wireless data transmissions in a shared spectrum. In some cases, the executed instructions may cause the processor module 1510 to manage carriers similarly to how one of the devices 1005 and/or 1055 described with reference to FIGS. 10A and/or 10B manages carriers. Alternatively, the software code 1525 may not be directly executable by the processor module 1510 but be configured to cause the UE 1515 (e.g., when compiled and executed) to perform various of the UE functions described herein.

The processor module 1510 may include an intelligent hardware device, e.g., a CPU, a microcontroller, an ASIC, etc. The processor module 1510 may process information received through the transceiver module(s) 1570 and/or information to be sent to the transceiver module(s) 1570 for transmission through the antenna(s) 1580. The processor module 1510 may handle, alone or in connection with the UE shared spectrum module 1540, various aspects of managing carriers (e.g., both virtual and physical carriers) for wireless data transmissions in a shared spectrum. In some cases, the processor module 1510 may manage carriers similarly to how one of the devices 1005 and/or 1055 described with reference to FIGS. 10A and/or 10B manages carriers.

The transceiver module(s) 1570 may be configured to communicate bi-directionally with eNBs. The transceiver module(s) 1570 may be implemented as one or more transmitter modules and one or more separate receiver modules. The transceiver module(s) 1570 may support communications in a shared spectrum, such as a shared licensed spectrum (e.g., an LTE spectrum) and/or a shared unlicensed spectrum. The transceiver module(s) 1570 may include a modem configured to modulate packets and provide the modulated packets to the antenna(s) 1580 for transmission, and to demodulate packets received from the antenna(s) 1580. While the UE 1515 may include a single antenna, there may be embodiments in which the UE 1515 may include multiple antennas 1580.

According to the architecture of FIG. 15, the UE 1515 may further include a communications management module 1530. The communications management module 1530 may manage communications with various base stations or eNBs. The communications management module 1530 may be a component of the UE 1515 in communication with some or all of the other components of the UE 1515 over the one or more buses 1535. Alternatively, functionality of the communications management module 1530 may be implemented as a component of the transceiver module(s) 1570, as a computer program product, and/or as one or more controller elements of the processor module 1510.

The UE shared spectrum module 1540 may be configured to perform and/or control some or all of the features and/or functions described with reference to FIGS. 1, 2A, 2B, 3, 4A, 4B, 5, 6, 7, 8, 9A-9D, 10A, 10B, 11, 12, and/or 13 related to wireless communications in a shared spectrum. For example, the UE shared spectrum module 1540 may be configured to support wireless communications in a licensed spectrum (e.g., an LTE spectrum) and/or a supplemental downlink mode, a carrier aggregation mode, and/or a stand-alone mode in an unlicensed or shared spectrum. The UE shared spectrum module 1540 may include an LTE module 1545 configured to handle LTE communications, an LTE unlicensed module 1550 configured to handle LTE/LTE-A communications in an unlicensed or shared spectrum, and/or an unlicensed module 1555 configured to handle communications other than LTE/LTE-A communications in an unlicensed or shared spectrum. The UE shared spectrum module 1540 may also include a carrier management module 1560 configured to perform, for example, carrier management similarly to how one of the devices 1005 and/or 1055 described with reference to FIGS. 10A and/or 10B performs carrier management. The carrier management module 1560 may be an example of similar modules (e.g., module 1015, 1065, 1105, 1205, and/or 1305) described with reference to FIGS. 10A, 10B, 11, 12, and/or 13. The UE shared spectrum module 1540, or portions of it, may include a processor, and/or some or all of the functionality of the UE shared spectrum module 1540 may be performed by the processor module 1510 and/or in connection with the processor module 1510.

Figure 16:
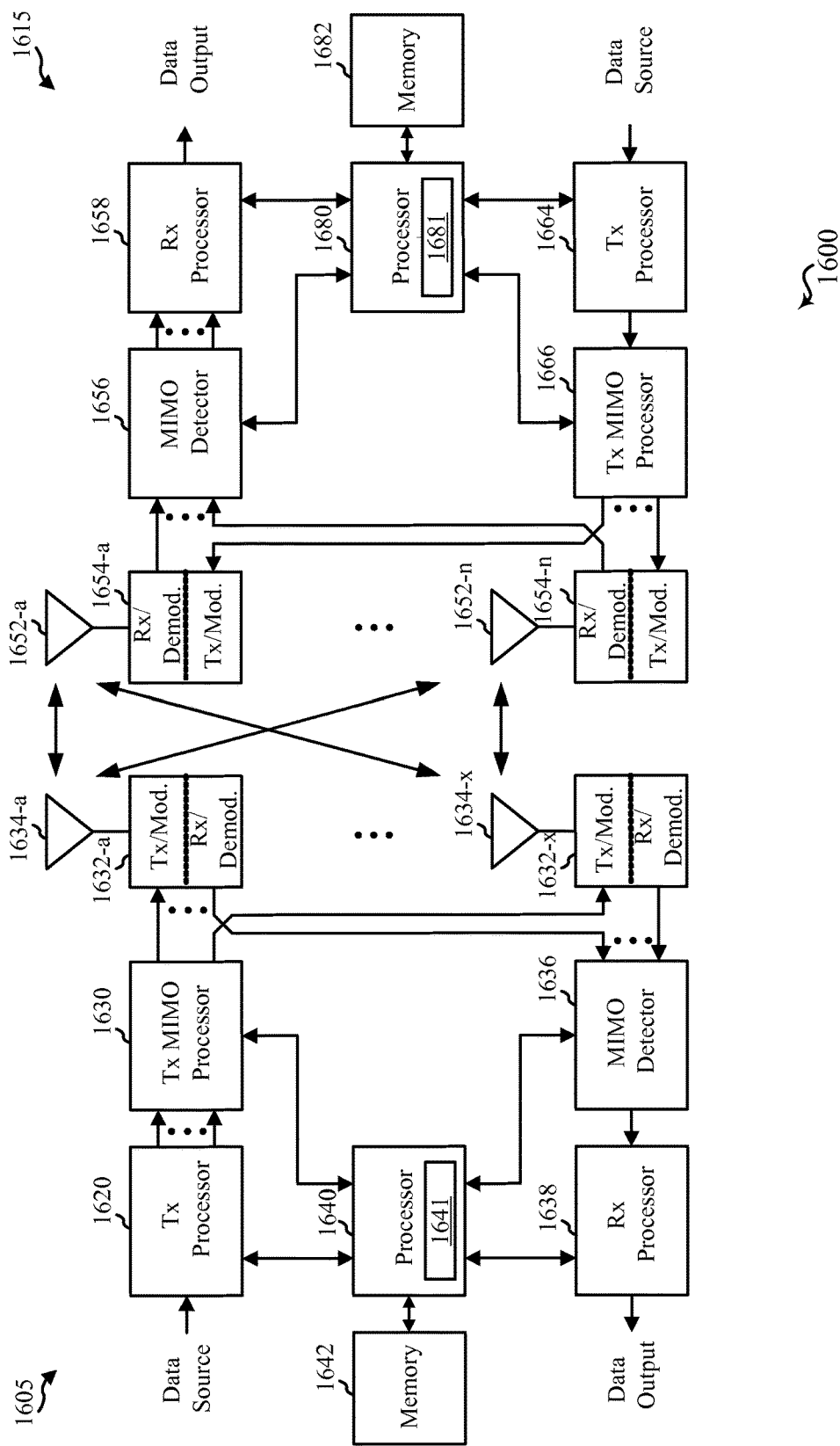
FIG. 16 shows a block diagram that illustrates an example of a multiple-input multiple-output (MIMO) communications system according to various embodiments.

Turning next to FIG. 16, a block diagram of a multiple-input multiple-output (MIMO) communications system 1600 is shown to include an eNB 1605 and a UE 1615. The eNB 1605 and the UE 1615 may support LTE-based communications using a licensed and/or unlicensed spectrum (e.g., an LTE spectrum and/or an unlicensed or shared spectrum). The eNB 1605 may be an example of one or more aspects of one of the devices 1005 and/or 1055 described with reference to FIGS. 10A and/or 10B, and/or one of the eNBs 105, 205, 505, and/or 1405 described with reference to FIGS. 1, 2A, 2B, 5, and/or 14. The UE 1615 may be an example of one or more aspects of one of the devices 1005 and/or 1055 described with reference to FIGS. 10A and/or 10B, and/or one of the UEs 115, 215, 515, and/or 1515 described with reference to FIGS. 1, 2A, 2B, 5, and/or 15. The system 1600 may illustrate aspects of the wireless communications system 100, 200, 250, and/or 500 described with reference to FIGS. 1, 2A, 2B, and/or 5.

The eNB 1605 may be equipped with antennas 1634-$a$ through 1634-$x$, and the UE 1615 may be equipped with antennas 1652-$a$ through 1652-$n$. In the system 1600, the eNB 1605 may be able to send data over multiple communication links at the same time. Each communication link may be called a "layer" and the "rank" of the communication link may indicate the number of layers used for communication. For example, in a 2×2 MIMO system where eNB 1605 transmits two "layers," the rank of the communication link between the eNB 1605 and the UE 1615 may be two.

At the eNB 1605, a transmit (Tx) processor 1620 communicatively coupled with a transmit memory 1642 may receive data from a data source. The transmit processor 1620 may process the data. The transmit processor 1620 may also generate reference symbols and/or a cell-specific reference signal. A transmit (Tx) MIMO processor 1630 may perform spatial processing (e.g., precoding) on data symbols, control symbols, and/or reference symbols, if applicable, and may provide output symbol streams to the transmit (Tx) modulators 1632-$a$ through 1632-$x$. Each modulator 1632 may process a respective output symbol stream (e.g., for OFDM, etc.) to obtain an output sample stream. Each modulator 1632 may further process (e.g., convert to analog, amplify, filter, and upconvert) the output sample stream to obtain a downlink (DL) signal. In one example, DL signals from modulators 1632-$a$ through 1632-$x$ may be transmitted via the antennas 1634-$a$ through 1634-$x$, respectively.

At the UE 1615, the antennas 1652-$a$ through 1652-$n$ may receive the DL signals from the eNB 1605 and may provide the received signals to the receive (Rx) demodulators 1654-$a$ through 1654-$n$, respectively. Each demodulator 1654 may condition (e.g., filter, amplify, downconvert, and digitize) a respective received signal to obtain input samples. Each demodulator 1654 may further process the input samples (e.g., for OFDM, etc.) to obtain received symbols. A MIMO detector 1656 may obtain received symbols from all the demodulators 1654-$a$ through 1654-$n$, perform MIMO detection on the received symbols if applicable, and provide detected symbols. A receive (Rx) processor 1658 may process (e.g., demodulate, deinterleave, and decode) the detected symbols, providing decoded data for the UE 1615 to a data output, and provide decoded control information to a processor 1680, or memory 1682.

On the uplink (UL), at the UE 1615, a transmit (Tx) processor 1664 may receive and process data from a data source. The transmit processor 1664 may also generate reference symbols for a reference signal. The symbols from the transmit processor 1664 may be precoded by a transmit (Tx) MIMO processor 1666 if applicable, further processed by the transmit (Tx) modulators 1654-$a$ through 1654-$n$ (e.g., for SC-FDMA, etc.), and be transmitted to the eNB 1605 in accordance with the transmission parameters received from the eNB 1605. At the eNB 1605, the UL signals from the UE 1615 may be received by the antennas 1634, processed by the receiver (Rx) demodulators 1632, detected by a MIMO detector 1636 if applicable, and further processed by a receive (Rx) processor 1638. The receive processor 1638 may provide decoded data to a data output and to the processor 1640.

The processors 1640 and 1680 may include respective modules or functions 1641 and 1681 for managing carriers (e.g., both virtual and physical carriers) for wireless data transmissions in a shared spectrum. In some embodiments, the modules or functions 1641, 1681 may be examples of one or more aspects of the carrier management module 1015, 1065, 1105, and/or 1205 described with reference to FIGS. 10A, 10B, 11, and/or 12. The eNB 1605 may use the module or function 1641 to manage carriers in conjunction with the transmission or reception of wireless data transmissions to/from the UE 1615 and/or other devices, while the UE 1615 may use the module or function 1681 to manage carriers in conjunction with the transmission or reception of wireless data transmissions to/from the eNB 1605 and/or other devices. In some cases, the eNB 1605 and UE 1615 may only communicate with one another over a shared spectrum after each of the eNB 1605 and UE 1615 has performed a successful CCA. In some cases, the eNB 1605 and UE 1615 may only communicate with one another over a shared spectrum after each of the eNB 1605 and UE 1615 has performed a successful CCA for each physical carrier to be used by the eNB 1605 and UE 1615 during their communications.

The components of the eNB 1605 may, individually or collectively, be implemented with one or more ASICs adapted to perform some or all of the applicable functions in hardware. Each of the noted modules may be a means for performing one or more functions related to operation of the system 1600. Similarly, the components of the UE 1615 may, individually or collectively, be implemented with one or more ASICs adapted to perform some or all of the applicable functions in hardware. Each of the noted components may be a means for performing one or more functions related to operation of the system 1600.

Figure 17:
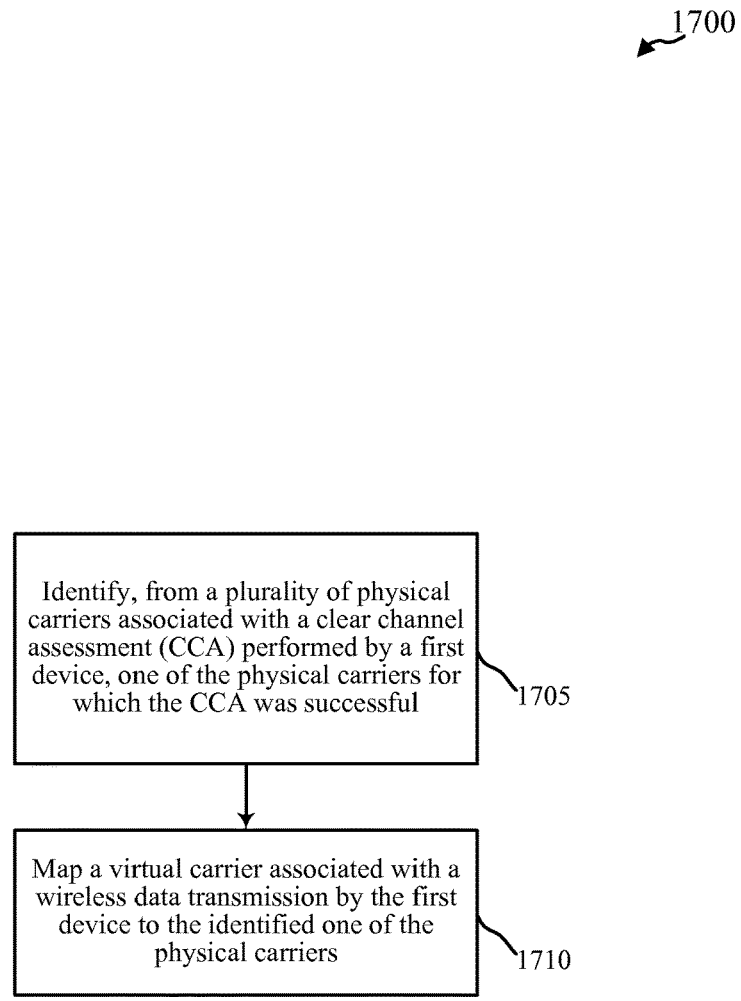
FIGS. 17-25 are flowcharts of examples of methods for wireless communications according to various embodiments.

FIG. 17 is a flow chart illustrating an example of a method 1700 for wireless communications. For clarity, the method 1700 is described below with reference to one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 16. In one embodiment, a device such as an eNB 105, 205, 505, 1005, 1405, and/or 1605 or UE 115, 215, 515, 1055, 1515, and/or 1615 may execute one or more sets of codes to control the functional elements of the device to perform the functions described below.

At block 1705, and from a plurality of physical carriers associated with a CCA performed by a first device, one of the physical carriers for which the CCA was successful may be identified. The operation(s) at block 1705 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the physical carrier identification module 1080, 1125, 1215, and/or 1315 described with reference to FIGS. 10B, 11, 12, and/or 13.

At block 1710, a virtual carrier associated with a wireless data transmission by the first device may be mapped to the identified one of the physical carriers. The operation(s) at block 1710 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the virtual-to-physical carrier mapping module 1085, 1135, 1235, and/or 1335 described with reference to FIGS. 10B, 11, 12, and/or 13.

In some embodiments, the method 1700 may be performed by a transmitting device that may transit the wireless data transmission over the virtual carrier. In other embodiments, the method 1700 may be performed by a receiving device that may receive the wireless data transmission over the virtual carrier. In either case, the transmitting device or receiving device may in some cases be one of the eNBs or UEs 105, 115, 205, 215, 505, 515, 535, 1005, 1055, 1405, 1515, 1605, and/or 1615 described with reference to FIGS. 1, 2A, 2B, 5, 10A, 10B, 14, 15, and/or 16.

The method 1700 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 1700 (including the mapping undertaken at block 1710) may be performed on a frame-by-frame basis.

Thus, the method 1700 may provide for wireless communications. It should be noted that the method 1700 is just one implementation and that the operations of the method 1700 may be rearranged or otherwise modified such that other implementations are possible.

Figure 18:
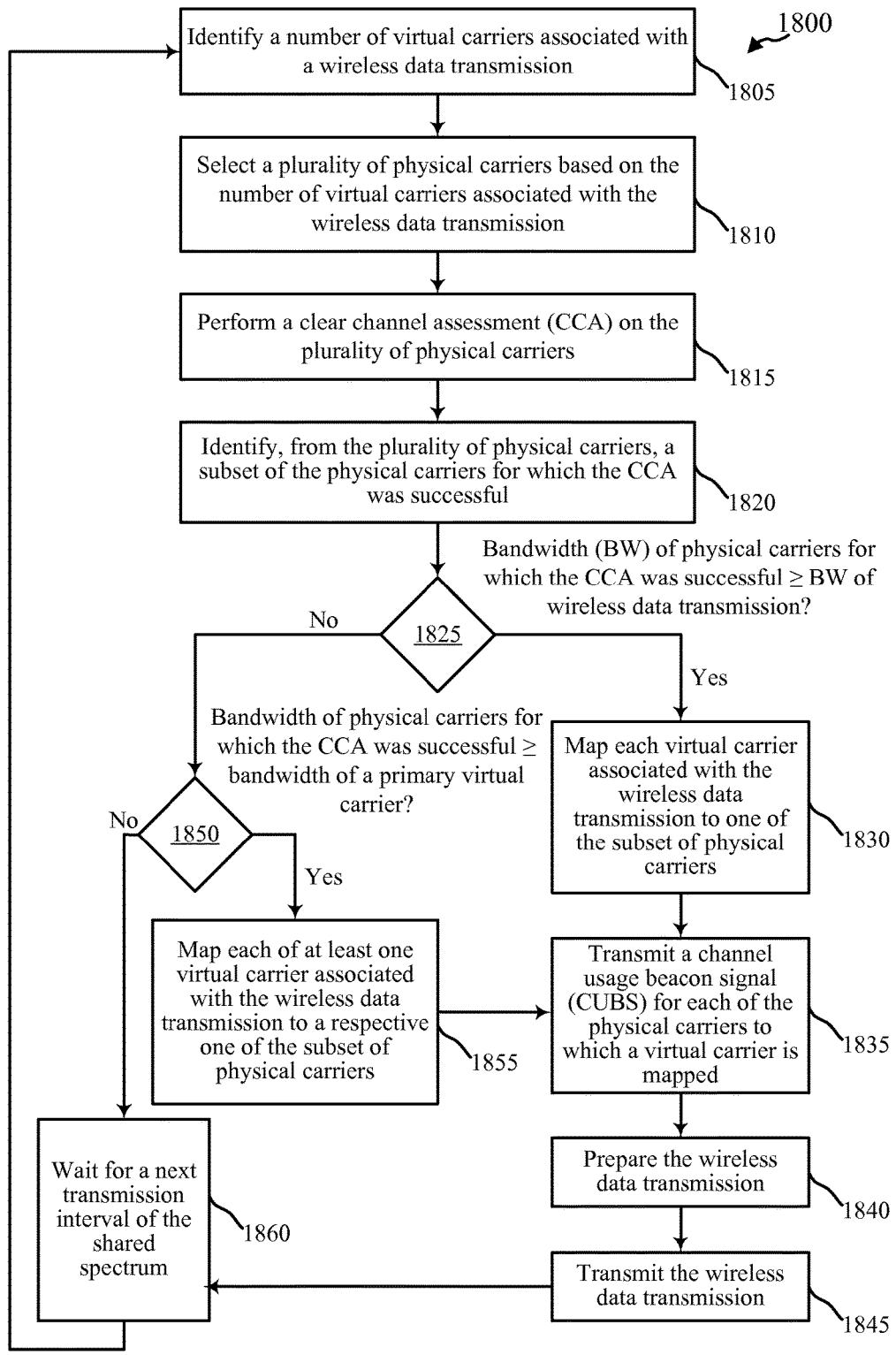

FIG. 18 is a flow chart illustrating an example of a method 1800 for wireless communications. For clarity, the method 1800 is described below with reference to a transmitting device, which transmitting device may be one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 16. In one embodiment, a device such as an eNB or UE 105, 115, 205, 215, 505, 515, 1005, 1055, 1405, 1515, 1605, and/or 1615 may execute one or more sets of codes to control the functional elements of the device to perform the functions described below.

At block 1805, a number of virtual carriers associated with a wireless data transmission may be identified. The operation(s) at block 1805 may in some cases be performed using the carrier management module 1015, 1065, 1105, 1490, 1560, 1641, and/or 1681 described with reference to FIGS. 10A, 10B, 11, 13, 14, 15, and/or 16, and/or the virtual carrier identification module 1120 described with reference to FIG. 11.

At block 1810, a plurality of physical carriers may be selected based on the number of virtual carriers identified at block 1805. The number of physical carriers selected may be a number of physical carriers that is greater than the number of virtual carriers identified at block 1805.

In some cases, the plurality of physical carriers may be selected based on channel strength measurements (e.g., one or more of the physical carriers may be selected because it is associated with a channel strength above a threshold). In some cases, the plurality of physical carriers may be selected based on an age of channel strength measurements for at least a portion of the plurality of physical carriers (e.g., one or more of the plurality of physical carriers may be selected because it is associated with a more recent, and likely more reliable, channel strength measurement, and/or one or more of the plurality of physical carriers may be selected because it is associated with an older channel strength measurement and an updated channel strength measurement is desired). In some cases, the plurality of physical carriers may be selected based on a determination of whether the physical carriers are capable of supporting at least one of: a modulation and coding scheme (MCS) associated with the wireless data transmission, a rank associated with the wireless data transmission (e.g., with a MIMO transmission), or a transport block size associated with the wireless data transmission.

The operation(s) at block 1810 may in some cases be performed using the carrier management module 1015, 1065, 1105, 1490, 1560, 1641, and/or 1681 described with reference to FIGS. 10A, 10B, 11, 14, 15, and/or 16, and/or the physical carrier identification module 1080 and/or 1125 described with reference to FIGS. 10B and/or 11. Channel strength measurements, when relied on, may be analyzed using the channel strength analysis sub-module 1130.

At block 1815, a CCA may be performed on each of the plurality of physical carriers selected at block 1810. The operation(s) at block 1815 may in some cases be performed using the carrier management module 1015, 1065, 1105, 1490, 1560, 1641, and/or 1681 described with reference to FIGS. 10A, 10B, 11, 14, 15, and/or 16, and/or the CCA module 1075 and/or 1115 described with reference to FIGS. 10B and/or 11.

At block 1820, and from the plurality of physical carriers on which the CCA was performed at block 1815, a subset of the physical carriers for which the CCA was successful may be identified. The subset may include one or more or all of the physical carriers on which the CCA was performed. When the subset of physical carriers identified at block 1820 is the null set, the method 1800 may skip to block 1860, where a wait may be incurred until the method 1800 is repeated for a next transmission interval of the shared spectrum.

The operation(s) at block 1820 may in some cases be performed using the carrier management module 1015, 1065, 1105, 1490, 1560, 1641, and/or 1681 described with reference to FIGS. 10A, 10B, 11, 14, 15, and/or 16, and/or the physical carrier identification module 1080 and/or 1125 described with reference to FIGS. 10B and/or 11.

At block 1825, it may be determined whether a bandwidth of the subset of physical carriers for which the CCA was successful is greater than or equal to a bandwidth of the wireless data transmission. In some cases, the determination may be made by comparing the number of virtual carriers identified at block 1805 to the number of physical carriers in the subset of physical carriers for which the CCA was successful. The operation(s) at block 1825 may in some cases be performed using the carrier management module 1015, 1065, 1105, 1490, 1560, 1641, and/or 1681 described with reference to FIGS. 10A, 10B, 11, 14, 15, and/or 16, and/or the virtual-to-physical carrier mapping module 1085 and/or 1135 described with reference to FIGS. 10B and/or 11.

When it is determined at block 1825 that the bandwidth of the subset of physical carriers for which the CCA was successful is greater than or equal to the bandwidth of the wireless data transmission, the method 1800 may continue at block 1830. At block 1830, each of the virtual carriers associated with the wireless data transmission may be mapped to a physical carrier of the subset of physical carriers. The mapping may be carried out using a predetermined mapping scheme shared between the device performing the method 1800 and a device configured to receive the wireless data transmission transmitted by the device performing the method 1800. The operation(s) at block 1830 may in some cases be performed using the carrier management module 1015, 1065, 1105, 1490, 1560, 1641, and/or 1681 described with reference to FIGS. 10A, 10B, 11, 14, 15, and/or 16, and/or the virtual-to-physical carrier mapping module 1085 and/or 1135 described with reference to FIGS. 10B and/or 11.

At block 1835, a CUBS or CRS may be transmitted for each of the physical carriers to which a virtual carrier is mapped (e.g., for a number of physical carriers that is equal to the number of virtual carriers). The operation(s) at block 1835 may in some cases be performed using the carrier management module 1015, 1065, 1105, 1490, 1560, 1641, and/or 1681 described with reference to FIGS. 10A, 10B, 11, 14, 15, and/or 16, and/or the carrier reservation module 1150 described with reference to FIG. 11.

At block 1840, the wireless data transmission may be prepared for transmission. In some cases, preparing the wireless data transmission for transmission may include, for each virtual carrier, inserting an identifier associated with the virtual carrier in a carrier identification field (CIF) of one of the physical carriers.

At block 1845, the wireless data transmission may be transmitted over the virtual carriers associated with the wireless data transmission. The method 1800 may then continue at block 1860, where a wait may be incurred until the method 1800 is repeated for a next transmission interval of the shared spectrum.

The operation(s) at block 1840 and/or block 1845 may in some cases be performed using the data transmission/reception module 1090 and/or 1110 described with reference to FIGS. 10B and/or 11.

When it is determined at block 1825 that the bandwidth of the subset of physical carriers for which the CCA was successful is less than the bandwidth of the wireless data transmission, the method 1800 may continue at block 1850. At block 1850, it may be determined whether the bandwidth of the subset of physical carriers for which the CCA was successful is greater than or equal to a bandwidth of at least one of the virtual carriers associated with the wireless data transmission (e.g., the bandwidth of a primary virtual carrier). In some cases, the determination may be made by determining whether the number of physical carriers in the subset of physical carriers for which the CCA was successful is greater than or equal to one. The operation(s) at block 1850 may in some cases be performed using the carrier management module 1015, 1065, 1105, 1490, 1560, 1641, and/or 1681 described with reference to FIGS. 10A, 10B, 11, 14, 15, and/or 16, and/or the virtual-to-physical carrier mapping module 1085 and/or 1135 described with reference to FIGS. 10B and/or 11.

When it is determined at block 1850 that the bandwidth of the subset of physical carriers for which the CCA was successful is greater than or equal to a bandwidth of at least one of the virtual carriers associated with the wireless data transmission, the method 1800 may continue at block 1855. At block 1855, each of at least one virtual carrier associated with the wireless data transmission may be mapped to a respective physical carrier of the subset of physical carriers. However, the method 1800 may refrain from mapping at least one other virtual carrier to a physical carrier of the subset of physical carriers. The mapping may be carried out using a predetermined mapping scheme shared between the device performing the method 1800 and a device configured to receive a wireless data transmission transmitted by the device performing the method 1800. In some cases, a determination to refrain from mapping a particular virtual carrier (or carriers) to a physical carrier of the subset of physical carriers may be based on a priority of the unmapped virtual carrier with respect to a priority of the mapped virtual carrier(s). For example, in some cases, a primary virtual carrier may be mapped to a respective physical carrier before any other virtual carrier is mapped to a respective physical carrier. The operation(s) at block 1855 may in some cases be performed using the carrier management module 1015, 1065, 1105, 1490, 1560, 1641, and/or 1681 described with reference to FIGS. 10A, 10B, 11, 14, 15, and/or 16, and/or the partial transmission mapping sub-module 1140 described with reference to FIG. 11.

After performing the mapping at block 1855, processing may continue to blocks 1835, 1840, 1845, and 1860. The blocks 1835, 1840, 1845, and 1860 include operations which may be performed as described supra.

When it is determined at block 1850 that the bandwidth of the subset of physical carriers for which the CCA was successful is less than the bandwidth of even one virtual carrier associated the wireless data transmission, the method 1800 may continue at block 1860. At block 1860, a wait may be incurred until the method 1800 is repeated for a next transmission interval of the shared spectrum.

The method 1800 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 1800 (including the mapping undertaken at block 1830 and/or 1855) may be performed on a frame-by-frame basis.

Thus, the method 1800 may provide for wireless communications. It should be noted that the method 1800 is just one implementation and that the operations of the method 1800 may be rearranged or otherwise modified such that other implementations are possible.

Figure 19:
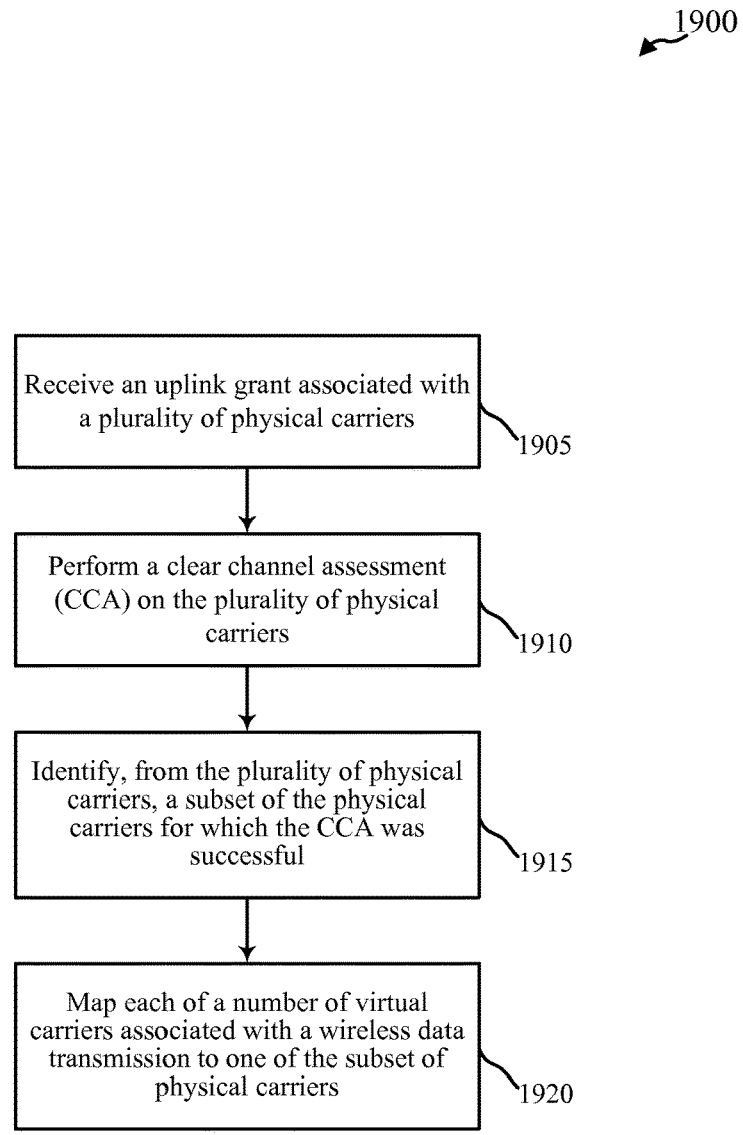

FIG. 19 is a flow chart illustrating an example of a method 1900 for wireless communications. For clarity, the method 1900 is described below with reference to a transmitting device, which transmitting device may be one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 16. In one embodiment, a device such as an eNB or UE 105, 115, 205, 215, 505, 515, 1005, 1055, 1405, 1515, 1605, and/or 1615 may execute one or more sets of codes to control the functional elements of the device to perform the functions described below.

At block 1905, an uplink grant may be received for a number of virtual carriers associated with a wireless data transmission. The uplink grant may identify a plurality of physical carriers associated with a CCA, wherein the CCA may be performed by a device performing the method 1900. The number of physical carriers identified in the UL grant may be a number of physical carriers that is greater than the number of virtual carriers. The operation(s) at block 1905 may in some cases be performed using the carrier management module 1015, 1065, 1105, 1490, 1560, 1641, and/or 1681 described with reference to FIGS. 10A, 10B, 11, 14, 15, and/or 16, and/or the physical carrier identification module 1080 and/or 1125 described with reference to FIGS. 10B and/or 11.

At block 1910, a CCA may be performed on each of the plurality of physical carriers identified in the uplink grant at block 1905. The operation(s) at block 1905 may in some cases be performed using the carrier management module 1015, 1065, 1105, 1490, 1560, 1641, and/or 1681 described with reference to FIGS. 10A, 10B, 11, 14, 15, and/or 16, and/or the CCA module 1075 and/or 1115 described with reference to FIGS. 10B and/or 11.

At block 1915, and from the plurality of physical carriers on which the CCA was performed at block 1910, a subset of the physical carriers for which the CCA was successful may be identified. The subset may include one or more or all of the physical carriers on which the CCA was performed. The operation(s) at block 1915 may in some cases be performed using the carrier management module 1015, 1065, 1105, 1490, 1560, 1641, and/or 1681 described with reference to FIGS. 10A, 10B, 11, 14, 15, and/or 16, and/or the physical carrier identification module 1080 and/or 1125 described with reference to FIGS. 10B and/or 11.

At block 1920, each of the virtual carriers associated with the wireless data transmission may be mapped to one of the subset of physical carriers. The mapping may be carried out using a predetermined mapping scheme shared between the device performing the method 1900 and a device configured to receive the wireless data transmission transmitted by the device performing the method 1900 (e.g., the eNB that provided the uplink grant). The operation(s) at block 1920 may in some cases be performed using the carrier management module 1015, 1065, 1105, 1490, 1560, 1641, and/or 1681 described with reference to FIGS. 10A, 10B, 11, 14, 15, and/or 16, and/or the virtual-to-physical carrier mapping module 1085 and/or 1135 described with reference to FIGS. 10B and/or 11.

The method 1900 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 1900 (including the mapping undertaken at block 1920) may be performed on a frame-by-frame basis.

Thus, the method 1900 may provide for wireless communications. It should be noted that the method 1900 is just one implementation and that the operations of the method 1900 may be rearranged or otherwise modified such that other implementations are possible.

Figure 20:
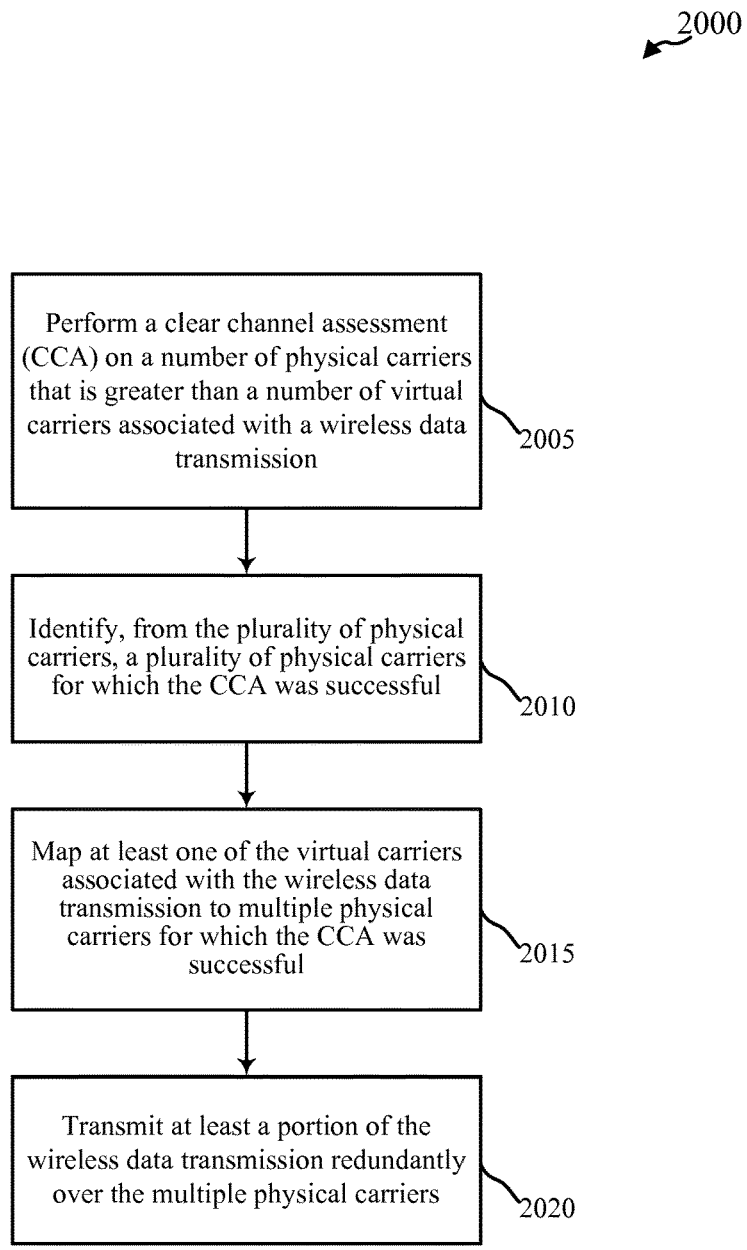

FIG. 20 is a flow chart illustrating an example of a method 2000 for wireless communications. For clarity, the method 2000 is described below with reference to a transmitting device, which transmitting device may be one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 16. In one embodiment, a device such as an eNB or UE 105, 115, 205, 215, 505, 515, 1005, 1055, 1405, 1515, 1605, and/or 1615 may execute one or more sets of codes to control the functional elements of the device to perform the functions described below.

At block 2005, a CCA may be performed on a plurality of physical carriers that is greater than a number of virtual carriers associated with a wireless data transmission. The operation(s) at block 2005 may in some cases be performed using the carrier management module 1015, 1065, 1105, 1490, 1560, 1641, and/or 1681 described with reference to FIGS. 10A, 10B, 11, 14, 15, and/or 16, and/or the CCA module 1075 and/or 1115 described with reference to FIGS. 10B and/or 11.

At block 2010, and from the plurality of physical carriers on which the CCA was performed at block 2005, a plurality of physical carriers for which the CCA was successful may be identified. The operation(s) at block 2010 may in some cases be performed using the carrier management module 1015, 1065, 1105, 1490, 1560, 1641, and/or 1681 described with reference to FIGS. 10A, 10B, 11, 14, 15, and/or 16, and/or the physical carrier identification module 1080 and/or 1125 described with reference to FIGS. 10B and/or 11.

At block 2015, each of the virtual carriers associated with the wireless data transmission may be mapped to one of the subset of physical carriers. The mapping may be carried out using a predetermined mapping scheme shared between the device performing the method 2000 and a device configured to receive the wireless data transmission transmitted by the device performing the method 2000. In some cases, and upon determining that the number of physical carriers for which the CCA was successful is greater than the number of virtual carriers, each of a number of virtual carriers may be mapped to multiple physical carriers (e.g., one virtual carrier may be mapped to multiple physical carriers, or one virtual carrier may be mapped to a first set of multiple physical carriers and another virtual carrier may be mapped to a second set of multiple physical carriers, etc.). The operation(s) at block 2015 may in some cases be performed using the carrier management module 1015, 1065, 1105, 1490, 1560, 1641, and/or 1681 described with reference to FIGS. 10A, 10B, 11, 14, 15, and/or 16, and/or the virtual-to-physical carrier mapping module 1085 and/or 1135 described with reference to FIGS. 10B and/or 11.

At block 2020, at least a portion of the wireless data transmission may be redundantly transmitted over multiple physical carriers (i.e., at least a portion of the wireless data transmission may include a redundant transmission). The operation(s) at block 2020 may in some cases be performed using the data transmission/reception module 1090 and/or 1110 described with reference to FIGS. 10B and/or 11.

The method 2000 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 2000 (including the mapping undertaken at block 2015) may be performed on a frame-by-frame basis.

Thus, the method 2000 may provide for wireless communications. It should be noted that the method 2000 is just one implementation and that the operations of the method 2000 may be rearranged or otherwise modified such that other implementations are possible.

Figure 21:
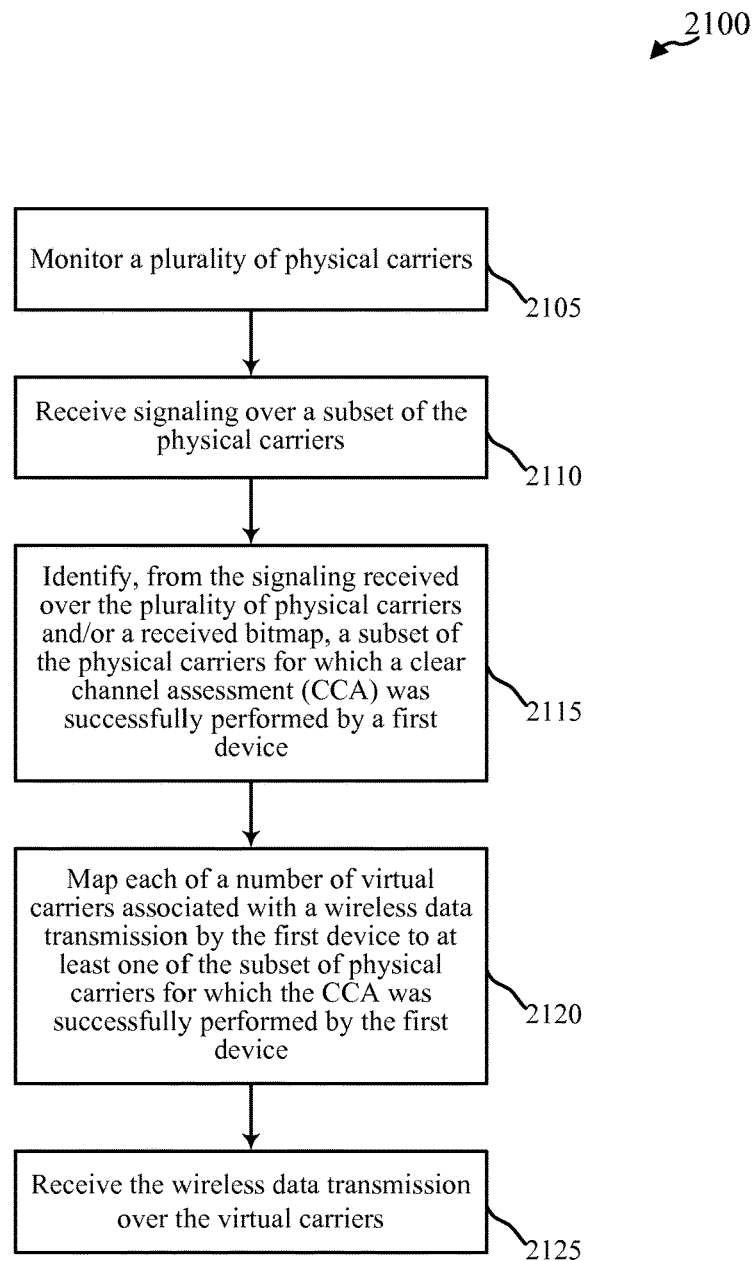

FIG. 21 is a flow chart illustrating an example of a method 2100 for wireless communications. For clarity, the method 2100 is described below with reference to a receiving device, which receiving device may be one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 16. In one embodiment, a device such as an eNB or UE 105, 115, 205, 215, 505, 515, 1005, 1055, 1405, 1515, 1605, and/or 1615 may execute one or more sets of codes to control the functional elements of the device to perform the functions described below.

At block 2105, a plurality of physical carriers may be monitored, prior to a wireless data transmission by a transmitting device (e.g., a first device) and/or prior to reception of the wireless data transmission by a device (e.g., a second device) performing the method 2100. In some embodiments, the second device may receive a bitmap from the first device, which bitmap identifies a set of one or more physical carriers to be monitored by the second device. The bitmap may in some cases be received over a control channel of a licensed spectrum. The operation(s) at block 2105 may in some cases be performed using the carrier management module 1015, 1065, 1105, 1490, 1560, 1641, and/or 1681 described with reference to FIGS. 10A, 10B, 12, 14, 15, and/or 16, the physical carrier identification module 1080 and/or 1215 described with reference to FIGS. 10B and/or 12, and/or the monitoring sub-module 1220 described with reference to FIG. 12.

At block 2110, signaling from the transmitting device may be received over one or more of the monitored physical carriers. The signaling may be received prior to the wireless data transmission by the transmitting device and/or prior to reception of the wireless data transmission by the device performing the method 2100. In some cases, the signaling may include a CUBS or CRS received from the transmitting device over one or more of the monitored physical carriers. The operation(s) at block 2110 may in some cases be performed using the carrier management module 1015, 1065, 1105, 1490, 1560, 1641, and/or 1681 described with reference to FIGS. 10A, 10B, 12, 14, 15, and/or 16, the physical carrier identification module 1080 and/or 1215 described with reference to FIGS. 10B and/or 12, and/or the signaling reception and analysis sub-module 1225 described with reference to FIG. 12.

At block 2115, a subset of physical carriers for which a CCA was successfully performed by the transmitting device may be identified. The subset of physical carriers may be identified based on the signaling received from the transmitting device and/or the bitmap received from the transmitting device. For example, the presence of signaling on a monitored one of the physical carriers may indicate that the transmitting device successfully performed a CCA for the monitored one of the physical carriers. Additionally or alternately, a bitmap received from the transmitting device may indicate a set of one or more physical carriers for which the transmitting device successfully performed a CCA. The operation(s) at block 2115 may in some cases be performed using the carrier management module 1015, 1065, 1105, 1490, 1560, 1641, and/or 1681 described with reference to FIGS. 10A, 10B, 11, 14, 15, and/or 16, and/or the physical carrier identification module 1080 and/or 1125 described with reference to FIGS. 10B and/or 11.

At block 2120, each of a number of virtual carriers associated with a wireless data transmission may be mapped to one of the subset of physical carriers identified at block 2115. The mapping may be carried out using a predetermined mapping scheme shared between the transmitting device and the device performing the method 2100. In some cases, a virtual carrier may be mapped to multiple physical carriers (e.g., when at least a portion of the wireless data transmission includes a redundant transmission). The operation(s) at block 2120 may in some cases be performed using the carrier management module 1015, 1065, 1205, 1490, 1560, 1641, and/or 1681 described with reference to FIGS. 10A, 10B, 12, 14, 15, and/or 16, and/or the virtual-to-physical carrier mapping module 1085 and/or 1235 described with reference to FIGS. 10B and/or 12.

At block 2125, the wireless data transmission may be received over the identified subset of physical carriers. The operation(s) at block 2125 may in some cases be performed using the data transmission/reception module 1090 and/or 1210 described with reference to FIGS. 10B and/or 12.

The method 2100 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 2100 (including the mapping undertaken at block 2120) may be performed on a frame-by-frame basis.

Thus, the method 2100 may provide for wireless communications. It should be noted that the method 2100 is just one implementation and that the operations of the method 2100 may be rearranged or otherwise modified such that other implementations are possible.

Figure 22:
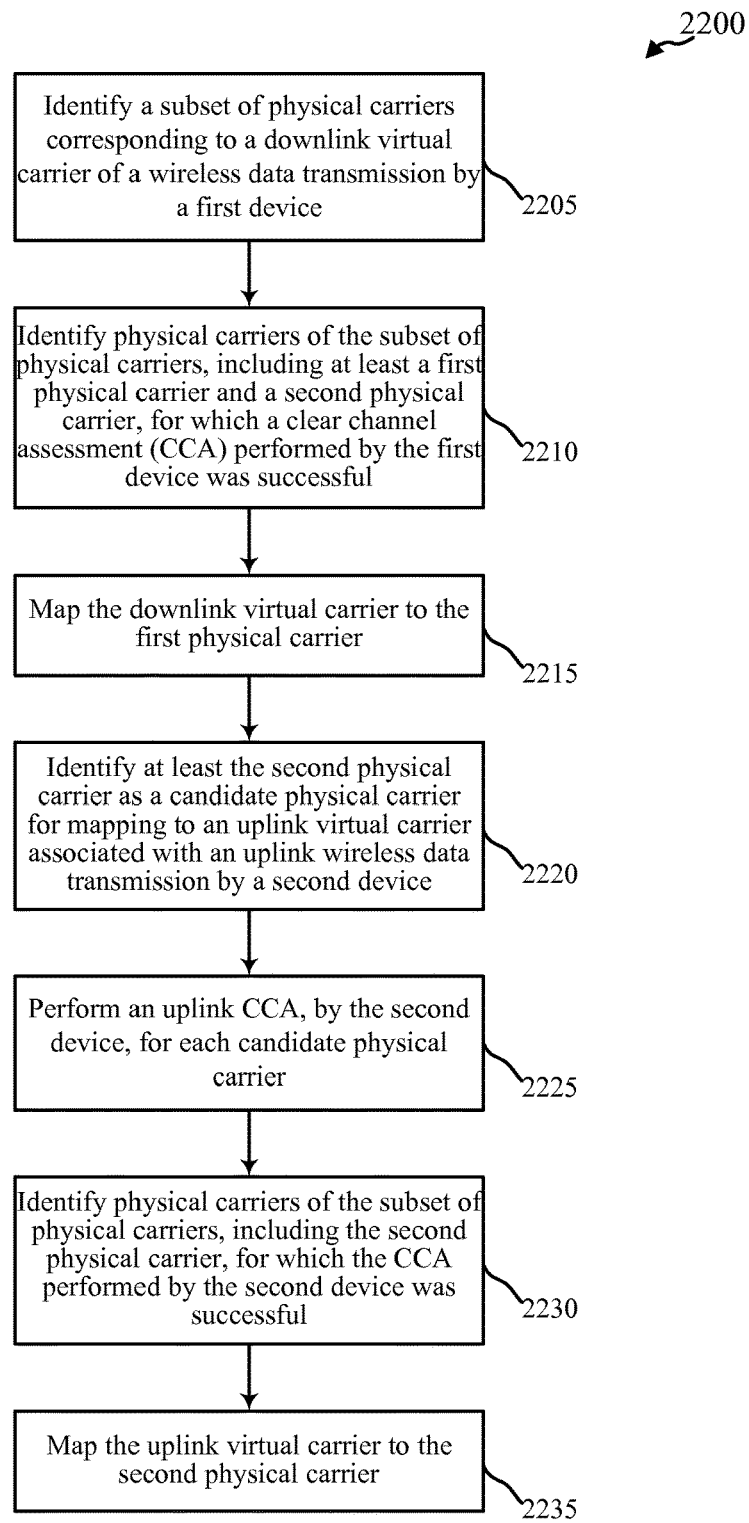

FIG. 22 is a flow chart illustrating an example of a method 2200 for wireless communications. For clarity, the method 2200 is described below with reference to one of the devices 535, 1005, and/or 1055 described with reference to FIGS. 5,

10A, and/or 10B, one of the eNBs 105, 205, 505, 1405, and/or 1605 described with reference to FIGS. 1, 2A, 2B, 5, 14, and/or 16, and/or one of the UEs 115, 215, 515, and/or 1615 described with reference to FIGS. 1, 2A, 2B, 5, 15, and/or 17. In one embodiment, a device such as an eNB 105, 205, 505, 1005, 1405, and/or 1605 or UE 115, 215, 515, 1055, 1515, and/or 1615 may execute one or more sets of codes to control the functional elements of the device to perform the functions described below.

At block 2205, a subset of physical carriers corresponding to a downlink virtual carrier of a wireless data transmission by a first device (e.g., an eNB) may be identified. In some examples, a UE may receive RRC signaling (e.g., an RRC message) identifying the subset of physical carriers corresponding to the downlink virtual carrier. The operation(s) at block 2205 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the physical carrier subset identification sub-module 1325 described with reference to FIG. 13.

At block 2210, physical carriers, of the subset of physical carriers, for which a CCA performed by the first device was successful may be identified. The physical carriers may include a plurality of physical carriers, including at least a first physical carrier and a second physical carrier, in the subset of physical carriers corresponding to the downlink virtual carrier of the wireless data transmission by the first device. The operation(s) at block 2210 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the successful CCA determination sub-module 1330 described with reference to FIG. 13.

At block 2215, the downlink virtual carrier associated with the wireless data transmission by the first device may be mapped to the first physical carrier in the subset of physical carriers corresponding to the downlink virtual carrier. The operation(s) at block 2215 may in some cases be performed using the carrier management module 1015, 1065, 1105, 1205, 1305, 1560, and/or 1681 described with reference to FIGS. 10A, 10B, 11, 12, 13, 15, and/or 16, and/or the virtual-to-physical carrier mapping module 1085, 1135, 1235, and/or 1335 described with reference to FIGS. 10B, 11, 12, and/or 13.

At block 2220, at least the second physical carrier of the subset of physical carriers may be identified as a candidate physical carrier for mapping to an uplink virtual carrier associated with an uplink wireless data transmission by a second device. Other physical carriers in the subset of physical carriers, for which the CCA performed by the first device was successful, may also be identified as candidate physical carriers for mapping to the uplink virtual carrier. In some cases, the first physical carrier in the subset of physical carriers may not be identified as a candidate physical carrier for mapping to the uplink virtual carrier. The operation(s) at block 2220 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the uplink-to-downlink carrier mapping sub-module 1350 described with reference to FIG. 13.

At block 2225, an uplink CCA may be performed by the second device for each candidate physical carrier identified at block 2220. The operation(s) at block 2225 may in some cases be performed using the carrier management module 1015, 1065, 1105, 1205, 1305, 1560, and/or 1681 described with reference to FIGS. 10A, 10B, 11, 12, 13, 15, and/or 16, and/or the CCA module 1075, 1115, and/or 1355 described with reference to FIGS. 10B, 11, and/or 13.

At block 2230, physical carriers for which the CCA performed by the second device was successful may be identified. The physical carriers may include the second physical carrier in the subset of physical carriers corresponding to the downlink virtual carrier of the wireless data transmission by the first device. The operation(s) at block 2230 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the successful CCA determination sub-module 1330 described with reference to FIG. 13.

At block 2235, the uplink virtual carrier associated with the uplink wireless data transmission by the second device may be mapped the second physical carrier in the subset of physical carriers corresponding to the downlink virtual carrier. The operation(s) at block 2235 may in some cases be performed using the carrier management module 1015, 1065, 1105, 1205, 1305, 1560, and/or 1681 described with reference to FIGS. 10A, 10B, 11, 12, 13, 15, and/or 16, and/or the virtual-to-physical carrier mapping module 1085, 1135, 1235, and/or 1335 described with reference to FIGS. 10B, 11, 12, and/or 13.

In some embodiments, the method 2200 may be performed by the second device (e.g., a UE).

The method 2200 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 2200 (including the mappings undertaken at block 2215 and 2235) may be performed on a frame-by-frame basis.

Thus, the method 2200 may provide for wireless communications. It should be noted that the method 2200 is just one implementation and that the operations of the method 2200 may be rearranged or otherwise modified such that other implementations are possible.

Figure 23:
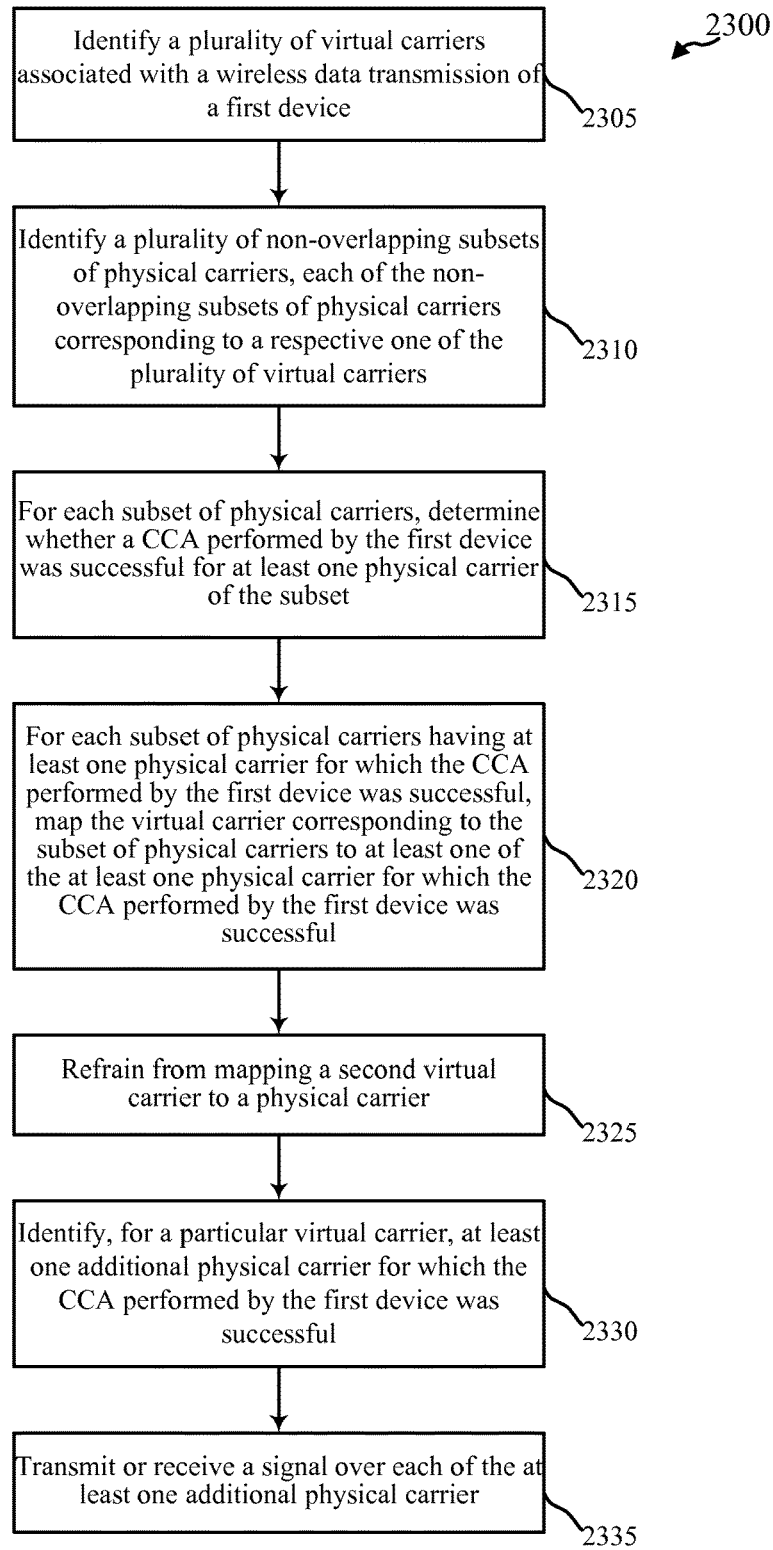

FIG. 23 is a flow chart illustrating an example of a method 2300 for wireless communications. For clarity, the method 2300 is described below with reference to one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 17. In one embodiment, a device such as an eNB 105, 205, 505, 1005, 1405, and/or 1605 or UE 115, 215, 515, 1055, 1515, and/or 1615 may execute one or more sets of codes to control the functional elements of the device to perform the functions described below.

At block 2305, a plurality of virtual carriers associated with a wireless data transmission of a first device may be identified or determined. The operation(s) at block 2305 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the virtual carrier identification module 1120, 1230, and/or 1315 described with reference to FIGS. 11, 12, and/or 13.

At block 2310, a plurality of non-overlapping subsets of physical carriers may be identified. Each of the non-overlapping subsets of physical carriers may correspond to a respective one of the plurality of virtual carriers associated with the wireless data transmission by the first device. The operation(s) at block 2310 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the physical carrier identification module 1080, 1125, 1215, and/or 1320 described with reference to FIGS. 10B, 11, 12, and/or 13, and/or the physical carrier subset identification sub-module 1325 described with reference to FIG. 13.

At block 2315, and for each subset of physical carriers, it may be determined whether a CCA performed by the first device was successful for at least one physical carrier of the subset of physical carriers. The operation(s) at block 2315 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the physical carrier identification module 1080, 1125, 1215, and/or 1320 described with reference to FIGS. 10B, 11, 12, and/or 13, and/or the successful CCA determination sub-module 1330 described with reference to FIG. 13.

At block 2320, and for each subset of physical carriers having at least one physical carrier for which the CCA performed by the first device was successful, the virtual carrier corresponding to the subset of physical carriers may be mapped to at least one of the at least one physical carrier for which the CCA performed by the first device was successful (e.g., a first virtual carrier may be mapped to a physical carrier for which the CCA performed by the first device was successful, but only if the physical carrier is a member of a subset of physical carriers that corresponds to the first virtual carrier). In some embodiments, a virtual carrier corresponding to a subset of physical carriers may be mapped to redundant physical carriers for which the CCA performed by the first device was successful. The operation(s) at block 2320 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the virtual-to-physical carrier mapping module 1085, 1135, 1235, and/or 1335 described with reference to FIGS. 10B, 11, 12, and/or 13.

At block 2325, and in some embodiments, the plurality of virtual carriers associated with the wireless data transmission may include a second virtual carrier, and the method 2300 may refrain from mapping the second virtual carrier to a physical carrier based on a determination that the CCA performed by the first device was unsuccessful for the physical carriers in the subset of physical carriers corresponding to the second virtual carrier. The operation(s) at block 2325 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the virtual-to-physical carrier mapping module 1085, 1135, 1235, and/or 1335 described with reference to FIGS. 10B, 11, 12, and/or 13.

At block 2330, and in some embodiments, at least one additional physical carrier for which the CCA performed by the first device was successful may be identified for a particular virtual carrier (e.g., at least one additional physical carrier for which the CCA performed by the first device was successful, other than a physical carrier to which a virtual carrier is mapped, may be identified). At block 2335, a signal may be transmitted or received over each of the at least one additional physical carrier. When the method 2300 is performed by an eNB, for example, the signal transmitted over each of the at least one additional physical carrier may include a CUBS and/or a CSI-RS, or the signal received over each of the at least one additional physical carrier may include an SRS and/or a CET (including a CET including an SRS). When the method 2300 is performed by a UE, for example, the signal transmitted over each of the at least one additional physical carrier may include an SRS and/or a CET (including a CET including an SRS), or the signal received over each of the at least one additional physical carrier may include a CUBS and/or a CSI-RS. A CET may also be transmitted (in the case of a UE) and/or received (in the case of an eNB) over any physical carrier, and in some cases each physical carrier (or each physical carrier not mapped to a virtual carrier), regardless of whether CCA is successfully performed for the physical carrier. The operation(s) at block 2330 and/or 2335 may in some cases be performed using the carrier management module 1015, 1065, 1105, 1205, 1305, 1490, 1560, 1641, and/or 1681 described with reference to FIGS. 10A, 10B, 11, 12, 13, 14, 15, and/or 16, and/or the physical carrier signaling module 1340 described with reference to FIG. 13.

In some embodiments, the method 2300 may be performed by a transmitting device that may transit the wireless data transmission over the virtual carrier. In other embodiments, the method 2300 may be performed by a receiving device that may receive the wireless data transmission over the virtual carrier. In either case, the transmitting device or receiving device may in some cases be one of the eNBs or UEs 105, 115, 205, 215, 505, 515, 535, 1005, 1055, 1405, 1515, 1605, and/or 1615 described with reference to FIGS. 1, 2A, 2B, 5, 10A, 10B, 14, 15, and/or 16.

The method 2300 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 2300 (including the mapping undertaken at block 2320) may be performed on a frame-by-frame basis.

Thus, the method 2300 may provide for wireless communications. It should be noted that the method 2300 is just one implementation and that the operations of the method 2300 may be rearranged or otherwise modified such that other implementations are possible.

Figure 24:
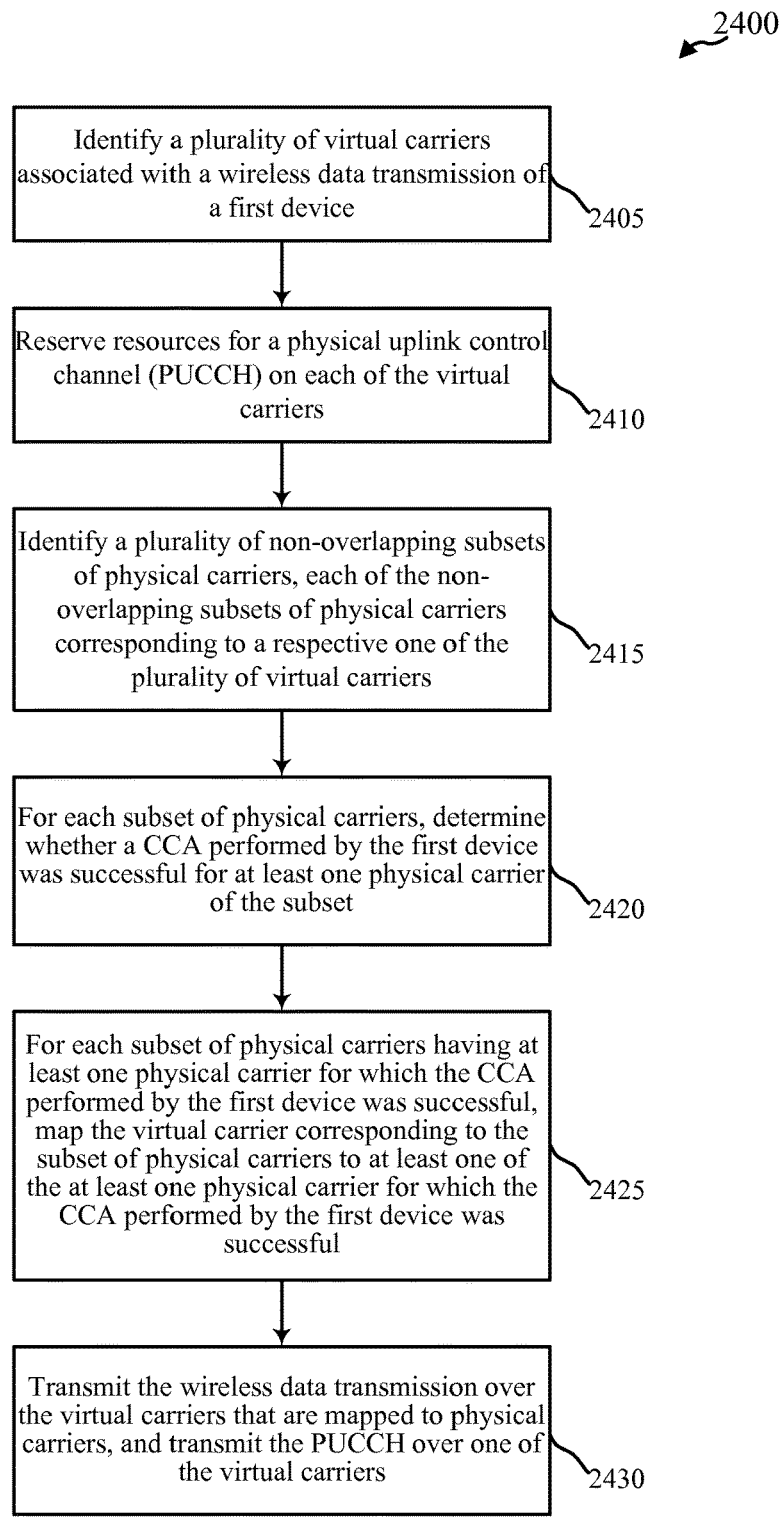

FIG. 24 is a flow chart illustrating an example of a method 2400 for wireless communications. For clarity, the method 2400 is described below with reference to one of the devices 1005, and/or 1055 described with reference to FIGS. 5, 10A, and/or 10B, and/or one of the UEs 115, 215, 515, 1515, and/or 1615 described with reference to FIGS. 1, 2A, 2B, 5, 15, and/or 17. In one embodiment, a device such as a UE 115, 215, 515, 1055, 1515, and/or 1615 may execute one or more sets of codes to control the functional elements of the device to perform the functions described below.

At block 2405, a plurality of virtual carriers associated with a wireless data transmission by a first device may be identified or determined. In some embodiments, each of the virtual carriers may be associated with an index (e.g., the virtual carriers may be numbered from 0 to N). The operation(s) at block 2405 may in some cases be performed using the carrier management module 1015, 1065, 1105, 1205, 1305, 1560, and/or 1681 described with reference to FIGS. 10A, 10B, 11, 12, 13, 15, and/or 16, and/or the virtual carrier identification module 1120, 1230, and/or 1315 described with reference to FIGS. 11, 12, and/or 13.

At block 2410, resources may be reserved for a physical uplink control channel (PUCCH) on each of the virtual carriers. By way of example, the resources may in some cases include resources for a scheduling request (SR), resources for acknowledgements and non-acknowledgements (ACKs/NACKs) of received transmissions, and resources for periodic channel quality information (CQI) reports)). In some cases, a physical uplink shared channel (PUSCH) may not be transmitted over the reserved resources, regardless of whether the reserved resources are used for transmitting a PUCCH. In some cases, the reserved resources may include interlaced resource blocks. The operation(s) at block 2410 may in some cases be performed using the carrier management module 1015, 1065, 1105, 1205, 1305, 1560, and/or 1681 described with reference to FIGS. 10A, 10B, 11, 12, 13, 15, and/or 16, and/or the PUCCH resource reservation module 1345 described with reference to FIGS. 11, 12, and/or 13.

At block 2415, a plurality of non-overlapping subsets of physical carriers may be identified. Each of the non-overlapping subsets of physical carriers may correspond to a respective one of a plurality of virtual carriers associated with a wireless data transmission. The operation(s) at block 2415 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the physical carrier subset identification sub-module 1325 described with reference to FIG. 13.

At block 2420, and for each subset of physical carriers, it may be determined whether a CCA performed by a first device was successful for at least one physical carrier of the subset of physical carriers. The operation(s) at block 2420 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the successful CCA determination sub-module 1330 described with reference to FIG. 13.

At block 2425, and for each subset of physical carriers having at least one physical carrier for which the CCA performed by the first device was successful, the virtual carrier corresponding to the subset of physical carriers may be mapped to at least one of the at least one physical carrier for which the CCA performed by the first device was successful (e.g., a first virtual carrier may be mapped to a physical carrier for which the CCA performed by the first device was successful, but only if the physical carrier is a member of a subset of physical carriers that corresponds to the first virtual carrier). In some embodiments, a virtual carrier corresponding to a subset of physical carriers may be mapped to redundant physical carriers for which the CCA performed by the first device was successful. The operation(s) at block 2425 may in some cases be performed using the carrier management module 1015, 1065, 1105, 1205, 1305, 1560, and/or 1681 described with reference to FIGS. 10A, 10B, 11, 12, 13, 15, and/or 16, and/or the virtual-to-physical carrier mapping module 1085, 1135, 1235, and/or 1335 described with reference to FIGS. 10B, 11, 12, and/or 13.

At block 2430, the wireless data transmission may be transmitted over the virtual carriers that are mapped to physical carriers. In some embodiments, the PUCCH may be transmitted over one of the virtual carriers that is mapped to one of the physical carriers for which the CCA performed by the first device was successful. In some embodiments, the PUCCH may be transmitted over one of the virtual carriers (mapped to one of the physical carriers for which the CCA performed by the first device was successful) having a lowest index. In other embodiments, the PUCCH may be transmitted over a virtual carrier that is randomly selected (e.g., pseudo-randomly selected). The random selection may be based at least in part on an index generated by a random number generator, which random number generator may in some cases be initialized by RRC signaling. The virtual carrier used to transmit the PUCCH may change from frame to frame. The operation(s) at block 2430 may in some cases be performed using the data transmission/reception module 1090, 1110, and/or 1310 described with reference to FIGS. 10B, 11, and/or 13.

In some embodiments, the method 2400 may be performed by a transmitting device such as one of the UEs 115, 215, 515, 1005, 1055, 1515, and/or 1615 described with reference to FIGS. 1, 2A, 2B, 5, 10A, 10B, 15, and/or 16.

The method 2400 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 2400 (including the mapping undertaken at block 2425) may be performed on a frame-by-frame basis.

Thus, the method 2400 may provide for wireless communications. It should be noted that the method 2400 is just one implementation and that the operations of the method 2400 may be rearranged or otherwise modified such that other implementations are possible.

Figure 25:
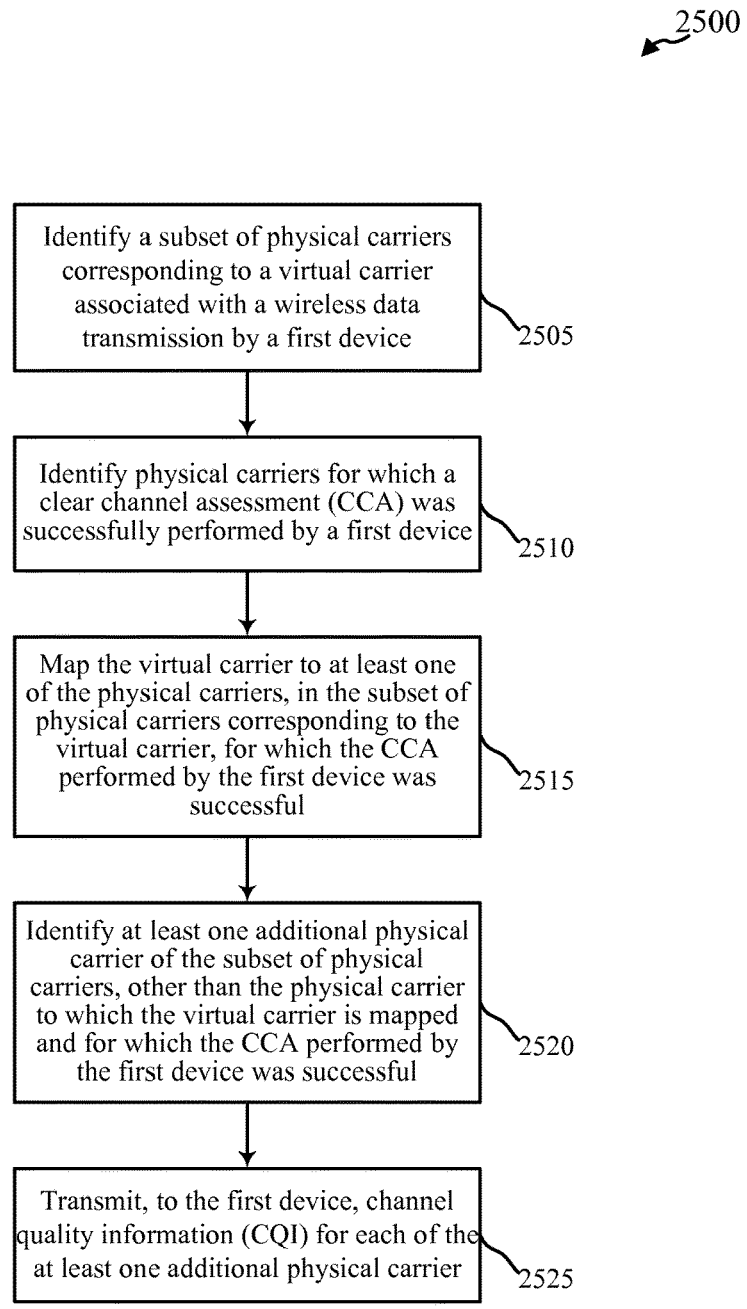

FIG. 25 is a flow chart illustrating an example of a method 2500 for wireless communications. For clarity, the method 2500 is described below with reference to one of the devices 535, 1005, and/or 1055 described with reference to FIGS. 5, 10A, and/or 10B, one of the eNBs 105, 205, 505, 1405, and/or 1605 described with reference to FIGS. 1, 2A, 2B, 5, 14, and/or 16, and/or one of the UEs 115, 215, 515, 1515, and/or 1615 described with reference to FIGS. 1, 2A, 2B, 5, 15, and/or 17. In one embodiment, a device such as a UE 115, 215, 515, 1055, 1515, and/or 1615 may execute one or more sets of codes to control the functional elements of the device to perform the functions described below.

At block 2505, a subset of physical carriers corresponding to a virtual carrier of a wireless data transmission by a first device (e.g., an eNB) may be identified. The operation(s) at block 2505 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the physical carrier subset identification sub-module 1325 described with reference to FIG. 13.

At block 2510, physical carriers for which a CCA performed by a first device was successful may be identified. The physical carriers may include a plurality of physical carriers in the subset of physical carriers. The operation(s) at block 2510 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier identification module 1080, 1125, 1215, and/or 1320 described with reference to FIGS. 10B, 11, 12, and/or 13, and/or the successful CCA determination sub-module 1330 described with reference to FIG. 13.

At block 2515, the virtual carrier associated with the wireless data transmission by the first device may be mapped to at least one of the physical carriers, in the subset of physical carriers corresponding to the virtual carrier, for which the CCA performed by the first device was successful. The operation(s) at block 2515 may in some cases be performed using the carrier management module 1015, 1065, 1105, 1205, 1305, 1560, and/or 1681 described with reference to FIGS. 10A, 10B, 11, 12, 13, 15, and/or 16, and/or the virtual-to-physical carrier mapping module 1085, 1135, 1235, and/or 1335 described with reference to FIGS. 10B, 11, 12, and/or 13.

At block 2520, at least one additional physical carrier of the subset of physical carriers, other than the physical carrier to which the virtual carrier is mapped and for which the CCA performed by the first device was successful, may be identified. At block 2525, channel quality information (CQI) for each of the at least one additional physical carrier may be transmitted to the first device. The operation(s) at block 2520 and/or 2525 may in some cases be performed using the carrier management module 1015, 1065, 1105, 1205, 1305, 1560, and/or 1681 described with reference to FIGS. 10A, 10B, 11, 12, 13, 15, and/or 16, and/or the physical carrier signaling module 1340 described with reference to FIG. 13.

In some embodiments, the method 2500 may be performed by a second device (e.g., a UE) that may receive the wireless data transmission, or at least part of the wireless data transmission, over the virtual carrier.

In some embodiments, the method 2500 may include receiving, from the first device at the second device, signaling (e.g., CUBS and/or a CRS) and/or a bitmap. The signaling and/or the bitmap may be used by the second device to identify the one of the physical carriers to which the virtual carrier is mapped and/or the at least one additional physical carrier for which the CCA performed by the first device was successful.

The method 2500 may be repeated for each of a number of transmission intervals over a shared spectrum (e.g., a shared licensed spectrum such as an LTE/LTE-A spectrum or a shared unlicensed spectrum such as a WLAN spectrum). In some cases, a transmission interval may be a radio frame, and the method 2500 (including the mapping undertaken at block 2515) may be performed on a frame-by-frame basis.

Thus, the method 2500 may provide for wireless communications. It should be noted that the method 2500 is just one implementation and that the operations of the method 2500 may be rearranged or otherwise modified such that other implementations are possible.

In some cases, aspects of the methods 1700, 1800, 1900, 2000, 2100, 2200, 2300, 2400, and/or 2500 described with reference to FIGS. 17, 18, 19, 20, 21, 22, 23, 24, and/or 25 may be combined.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   encoding data using a set of one or more virtual carriers, wherein the set of one or more virtual carriers is associated with a wireless data transmission by a first device and is a proxy for a variable set of one or more physical carriers, each physical carrier being associated with a different frequency range;
   selecting, by the first device, a number of physical carriers associated with a clear channel assessment (CCA) based on a number of virtual carriers in the set of one or more virtual carriers associated with the wireless data transmission by the first device;
   performing a CCA by the first device on the selected number of physical carriers; wherein the selected number of physical carriers is greater than the number of virtual carriers in the set of one or more virtual carriers associated with the wireless data transmission by the first device;
   identifying one of the physical carriers for which the CCA performed by the first device was successful; and
   mapping a first virtual carrier of the virtual carriers associated with the wireless data transmission by the first device to the identified one of the physical carriers for which the CCA performed by the first device was successful.

2. The method of claim 1, further comprising:
   transmitting, by the first device, the wireless data transmission to a second device over the one of the physical carriers.

3. The method of claim 1, further comprising:
   transmitting, by the first device, signaling to a second device, wherein the signaling identifies the one of the physical carriers for which the CCA was successful.

4. The method of claim 3, further comprising:
   monitoring the physical carriers prior to the wireless data transmission by the first device; wherein the signaling from the first device is transmitted over the one of the physical carriers prior to the wireless data transmission.

5. The method of claim 4, wherein the signaling comprises a channel usage beacon signal (CUBS).

6. The method of claim 3, wherein the signaling comprises a reference signal.

7. The method of claim 1, further comprising:
   transmitting, by the first device, a bitmap to a second device, wherein the bitmap identifies the one of the physical carriers for which the CCA was successful.

8. The method of claim 7, wherein the bitmap is communicated over an unlicensed spectrum.

9. The method of claim 1, further comprising:
   refraining from mapping at least a second virtual carrier of the set of one or more virtual carriers based on a determination that the number of the physical carriers for which the CCA was successful is less than the number of virtual carriers; and
   transmitting, by the first device, a channel usage beacon signal (CUBS) for the number of the physical carriers that is equal to or less than the number of virtual carriers.

10. The method of claim 1, further comprising:
    transmitting, by the first device, at least a portion of the wireless data transmission redundantly over multiple of the physical carriers based on a determination that the number of the physical carriers for which the CCA was successful is greater than the number of virtual carriers.

11. The method of claim 1, further comprising:
    determining to refrain from mapping a second virtual carrier of the set of one or more virtual carriers based on a priority of the second virtual carrier with respect to a priority of the first virtual carrier.

12. The method of claim 1, further comprising:
    receiving, by the first device, an uplink grant for the first virtual carrier, the uplink grant comprising the physical carriers associated with the CCA by the first device.

13. The method of claim 1, further comprising:
    selecting the physical carriers associated with the CCA based on channel strength measurements of the physical carriers.

14. The method of claim 13, wherein selecting the physical carriers associated with the CCA is based on an age of channel strength measurements for at least a portion of the physical carriers associated with the CCA.

15. The method of claim 13, wherein selecting the physical carriers associated with the CCA is based on a determination of whether the physical carriers are capable of supporting at least one of:
    a modulation and coding scheme associated with the wireless data transmission, a rank associated with the wireless data transmission, or a transport block size associated with the wireless data transmission.

16. The method of claim 1, further comprising:
    identifying a subset of the physical carriers for which the CCA by the first device was successful; and
    mapping each of the virtual carriers to one of the physical carriers of the subset based on a predetermined mapping scheme shared between the first device and a second device configured to receive the wireless data transmission.

17. The method of claim 1, further comprising:
    transmitting, in a carrier identification field (CIF) of the one of the physical carriers, an identifier associated with the first virtual carrier.

18. The method of claim 1, wherein the first virtual carrier comprises a downlink virtual carrier and the CCA performed by the first device is a downlink CCA, and wherein identifying the one of the physical carriers for which the CCA performed by the first device was successful comprises identifying the one of the physical carriers for which the CCA performed by the first device was successful as a first physical carrier in a subset of physical carriers corresponding to the downlink virtual carrier, the method further comprising:
identifying at least a second physical carrier in the subset of physical carriers corresponding to the downlink virtual carrier, the second physical carrier being another physical carrier for which the CCA performed by the first device was successful, as a candidate physical carrier for mapping to an uplink virtual carrier associated with an uplink wireless data transmission by a second device.

19. The method of claim 18, further comprising:
receiving radio resource control (RRC) signaling identifying the subset of physical carriers corresponding to the downlink virtual carrier.

20. The method of claim 18, further comprising:
performing an uplink CCA for each candidate physical carrier;
identifying the second physical carrier as a physical carrier for which the uplink CCA was successful; and
mapping the uplink virtual carrier associated with the uplink wireless data transmission to the second physical carrier.

21. The method of claim 1, further comprising:
identifying a plurality of non-overlapping subsets of physical carriers, wherein each of the non-overlapping subsets of physical carriers corresponds to a respective one of the virtual carriers;
determining, for each subset of physical carriers, whether the CCA performed by the first device was successful for at least one physical carrier of the subset of physical carriers; and
for each subset of physical carriers having at least one physical carrier for which the CCA performed by the first device was successful, mapping the virtual carrier corresponding to the subset of physical carriers to at least one of the at least one physical carrier for which the CCA performed by the first device was successful.

22. The method of claim 21, wherein the set of one or more virtual carriers associated with the wireless data transmission comprises a second virtual carrier, the method further comprising:
refraining from mapping at least the second virtual carrier to a physical carrier based on a determination that the CCA performed by the first device was unsuccessful for the physical carriers in the subset of physical carriers corresponding to the second virtual carrier.

23. The method of claim 21, further comprising:
reserving resources for a physical uplink control channel (PUCCH) on each of the virtual carriers; and
transmitting the PUCCH over one of the virtual carriers mapped to one of the physical carriers for which the CCA performed by the first device was successful.

24. The method of claim 23, wherein each of the virtual carriers is associated with an index, and wherein transmitting the PUCCH on one of the virtual carriers mapped to one of the physical carriers for which the CCA performed by the first device was successful comprises:
transmitting the PUCCH over one of the virtual carriers, wherein selecting one of the virtual carriers is based on at least one of a lowest index or random selection.

25. The method of claim 23, further comprising:
receiving radio resource control (RRC) signaling comprising an initialization for a random number generator used for randomly selecting the one of the virtual carriers over which the PUCCH is transmitted.

26. The method of claim 21, further comprising:
identifying, from one of the subsets of physical carriers corresponding to the first virtual carrier, at least one additional physical carrier for which the CCA performed by the first device was successful; and
transmitting a sounding reference signal (SRS), by the first device, over each of the at least one additional physical carrier.

27. The method of claim 21, further comprising:
transmitting a CCA exempt transmission (CET), by the first device, over at least one of the physical carriers in at least one of the subsets of physical carriers.

28. The method of claim 21, further comprising:
identifying, from one of the subsets of physical carriers corresponding to the first virtual carrier, at least one additional physical carrier for which the CCA performed by the first device was successful; and
transmitting at least one of a channel usage beacon signal (CUBS) and a channel state information reference signal (CSI-RS), by the first device, over each of the at least one additional physical carrier.

29. The method of claim 1, further comprising:
identifying a subset of physical carriers corresponding to the first virtual carrier, the subset of physical carriers comprising the one of the physical carriers to which the first virtual carrier is mapped and at least one additional physical carrier;
identifying, from the at least one additional physical carrier, at least one additional physical carrier for which the CCA performed by the first device was successful; and
receiving, by the first device, channel quality information (CQI) for each of the one of the physical carriers to which the first virtual carrier is mapped and the at least one additional physical carrier for which the CCA performed by the first device was successful.

30. The method of claim 29, further comprising:
transmitting, by the first device, signaling to a second device, wherein the signaling identifies the one of the physical carriers to which the first virtual carrier is mapped and the at least one additional physical carrier for which the CCA performed by the first device was successful.

31. The method of claim 30, further comprising:
transmitting, by the first device, a bitmap to the second device, wherein the bitmap identifies the one of the physical carriers to which the first virtual carrier is mapped and the at least one additional physical carrier for which the CCA performed by the first device was successful.

32. The method of claim 1, further comprising:
transmitting, by the first device, a physical uplink control channel (PUCCH) of the wireless data transmission over interlaced resource blocks of the identified one of the physical carriers.

33. An apparatus for wireless communication, comprising:
means for encoding data using a set of one or more virtual carriers, wherein the set of one or more virtual carriers is associated with a wireless data transmission by a first device and is a proxy for a variable set of one or more physical carriers, each physical carrier being associated with a different frequency range;
means for selecting, by the first device, a number of physical carriers associated with a clear channel assessment (CCA) based on a number of virtual carriers in the set of one or more virtual carriers associated with the wireless data transmission by the first device;

means for performing a CCA by the first device on the selected number of physical carriers, wherein the selected number of physical carriers is greater than the number of virtual carriers in the set of one or more virtual carriers associated with the wireless data transmission by the first device;

means for identifying one of the physical carriers for which the CCA performed by the first device was successful; and means for mapping a first virtual carrier of the virtual carriers associated with the wireless data transmission by the first device to the identified one of the physical carriers for which the CCA performed by the first device was successful.

34. The apparatus of claim 33, further comprising:
means for transmitting, by the first device, the wireless data transmission to a second device over the one of the physical carriers.

35. The apparatus of claim 33, further comprising:
means for transmitting, by the first device, signaling to a second device, wherein the signaling identifies the one of the physical carriers for which the CCA was successful.

36. The apparatus of claim 35, further comprising:
means for monitoring the physical carriers prior to the wireless data transmission by the first device; wherein the signaling from the first device is transmitted over the one of the physical carriers prior to the wireless data transmission.

37. The apparatus of claim 36, wherein the signaling comprises a channel usage beacon signal (CUBS).

38. The apparatus of claim 35, wherein the signaling comprises a reference signal.

39. An apparatus for wireless communications, comprising:
a processor; and
memory coupled to the processor, wherein the processor is configured to:
encode data using a set of one or more virtual carriers, wherein the set of one or more virtual carriers is associated with a wireless data transmission by a first device and is a proxy for a variable set of one or more physical carriers, each physical carrier being associated with a different frequency range;
select, by the first device, a number of physical carriers associated with a clear channel assessment (CCA) based on a number of virtual carriers in the set of one or more virtual carriers associated with the wireless data transmission by the first device;
perform CCA by the first device on the selected number of physical carriers; wherein the selected number of physical carriers is greater than the number of virtual carriers in the set of one or more virtual carriers associated with the wireless data transmission by the first device;
identify one of the physical carriers for which the CCA performed by the first device was successful; and
map a first virtual carrier of the virtual carriers associated with the wireless data transmission by the first device to the identified one of the physical carriers for which the CCA performed by the first device was successful.

40. The apparatus of claim 39, wherein the processor is configured to:
transmit, by the first device, the wireless data transmission to a second device over the one of the physical carriers.

41. The apparatus of claim 39, wherein the processor is configured to:
transmit, by the first device, signaling to a second device, wherein the signaling identifies the one of the physical carriers for which the CCA was successful.

42. The apparatus of claim 39, wherein the processor is configured to:
transmit, by the first device, a bitmap to a second device, wherein the bitmap identifies the one of the physical carriers for which the CCA was successful.

43. The apparatus of claim 42, wherein the bitmap is communicated over an unlicensed spectrum.

44. The apparatus of claim 39, wherein the processor is configured to:
transmit, by the first device, a channel usage beacon signal (CUBS) for the number of the physical carriers that is equal to or less than the number of virtual carriers.

45. A non-transitory computer-readable medium for storing instructions executable by a processor, comprising:
instructions to encode data using a set of one or more virtual carriers, wherein the set of one or more virtual carriers is associated with a wireless data transmission by a first device and is a proxy for a variable set of one or more physical carriers, each physical carrier being associated with a different frequency range;
instructions to select, by the first device, a number of physical carriers associated with a clear channel assessment (CCA) based on a number of virtual carriers in the set of one or more virtual carriers associated with the wireless data transmission by the first device;
instructions to perform a CCA by the first device on the selected number of physical carriers; wherein the selected number of physical carriers is greater than the number of virtual carriers in the set of one or more virtual carriers associated with the wireless data transmission by the first device;
instructions to identify one of the physical carriers for which the CCA was successful; and
instructions to map a first virtual carrier of the virtual carriers associated with the wireless data transmission by the first device to the identified one of the physical carriers for which the CCA performed by the first device was successful.

46. The non-transitory computer-readable medium of claim 45, further comprising:
instructions to transmit the wireless data transmission to a second device over the one of the physical carriers.

* * * * *